United States Patent
Kumar Agrawal et al.

(10) Patent No.: US 12,111,698 B1
(45) Date of Patent: Oct. 8, 2024

(54) ELECTRONIC DEVICES WITH TRANSLATING FLEXIBLE DISPLAYS AND CORRESPONDING METHODS FOR AUTOMATIC TRANSLATION WHEN OPERATING AS A CONTROLLER FOR ANOTHER ELECTRONIC DEVICE

(71) Applicant: Motorola Mobility LLC, Chicago, IL (US)

(72) Inventors: Amit Kumar Agrawal, Bangalore (IN); Shuaib Puzhakkal Kavalathara, Malappuram (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/123,303

(22) Filed: Mar. 19, 2023

(51) Int. Cl.
　　*G06F 1/16*　　(2006.01)
　　*G06F 3/14*　　(2006.01)

(52) U.S. Cl.
　　CPC .......... *G06F 1/1652* (2013.01); *G06F 3/1454* (2013.01)

(58) Field of Classification Search
　　CPC .................................................... G06F 1/1652
　　See application file for complete search history.

(56) References Cited

U.S. PATENT DOCUMENTS

| | | | |
|---|---|---|---|
| 11,526,198 | B1 | 12/2022 | Kanas |
| 2018/0018929 | A1* | 1/2018 | Xun ....................... G06F 1/1626 |
| 2018/0262812 | A1* | 9/2018 | Chai .................. H04N 21/4383 |
| 2020/0004297 | A1 | 1/2020 | Rekapalli |
| 2022/0060660 | A1 | 2/2022 | Chou |
| 2022/0368784 | A1 | 11/2022 | Koh |
| 2023/0090109 | A1* | 3/2023 | Kosonen ............... G06F 1/1652 |

FOREIGN PATENT DOCUMENTS

| | | |
|---|---|---|
| CN | 108064371 | 5/2018 |
| CN | 105247853 | 8/2018 |
| CN | 113741853 | 12/2021 |
| CN | 113778297 | 12/2021 |
| CN | 114968002 | 8/2022 |
| CN | 115809033 | 3/2023 |

(Continued)

OTHER PUBLICATIONS

"PCT Search Report", International Application No. PCT/CN2023/103699; Filed Jun. 29, 2023; Mailed Nov. 16, 2023.

(Continued)

*Primary Examiner* — Chun-Nan Lin
(74) *Attorney, Agent, or Firm* — Philip H. Burrus, IV

(57) ABSTRACT

An electronic device includes a device housing and a blade assembly carrying a flexible display and configured to translate around the device housing between an extended position, a retracted position, and a peek position. The electronic device includes one or more processors and a communication device operable with the one or more processors. When the communication device is in communication with a content presentation companion device operating as a primary display for the electronic device, the one or more processors determine a front-facing area amount required to present a controller user interface on a front-facing portion of the flexible display and cause the blade assembly to transition to a position defined by the front-facing area amount.

20 Claims, 23 Drawing Sheets

(56) References Cited

FOREIGN PATENT DOCUMENTS

| | | |
|---|---|---|
| JP | 3727966 | 12/2005 |
| KR | 20200075809 | 6/2020 |
| WO | 202109870 4 | 5/2021 |

OTHER PUBLICATIONS

"Samsung Help Page—Anynet+", Viewed online https://www.samsung.com/au/support/tv-audio-video/what-is-anynet-plus/; Last Update Sep. 15, 2023.
Katzmaier, David , "LG Display's crazy 65-inch OLED TV can roll up like a poster", Published Jan. 9, 2018; Available online at https://www.cnet.com/tech/home-entertainment/lg-display-crazy-65-inch-oled-tv-can-roll-up-like-a-poster-ces-2018/.
Keller, Joseph , "Should I use Game Mode on my LG 27UD88?", Gaming Mode LG Monitors; Published Dec. 21, 2018; https://www.imore.com/should-i-use-game-mode-my-lg-27ud88.
Kumar Agrawal, et al., "Electronic Devices and Corresponding Methods for Identifying a Content Presentation Companion Device Gaming Mode of Operation", Application as Filed; U.S. Appl. No. 18/195,227, filed May 9, 2023.
Matthes, Jonah , "What is HDMI EDID? Everything You Need to Know!", Published Feb. 24, 2022; available online at https://thehometheaterdiy.com/hdmi-edid/.
Venkata, et al., "Electronic Devices with Translating Flexible Display and Corresponding Methods", Application as Filed; U.S. Appl. No. 18/116,091, filed Mar. 1, 2023.
Osorio, Ricardo , "Non-Final Office Action", U.S. Appl. No. 18/225,506; Filed Jul. 24, 2023; Mailed Mar. 28, 2024.

\* cited by examiner

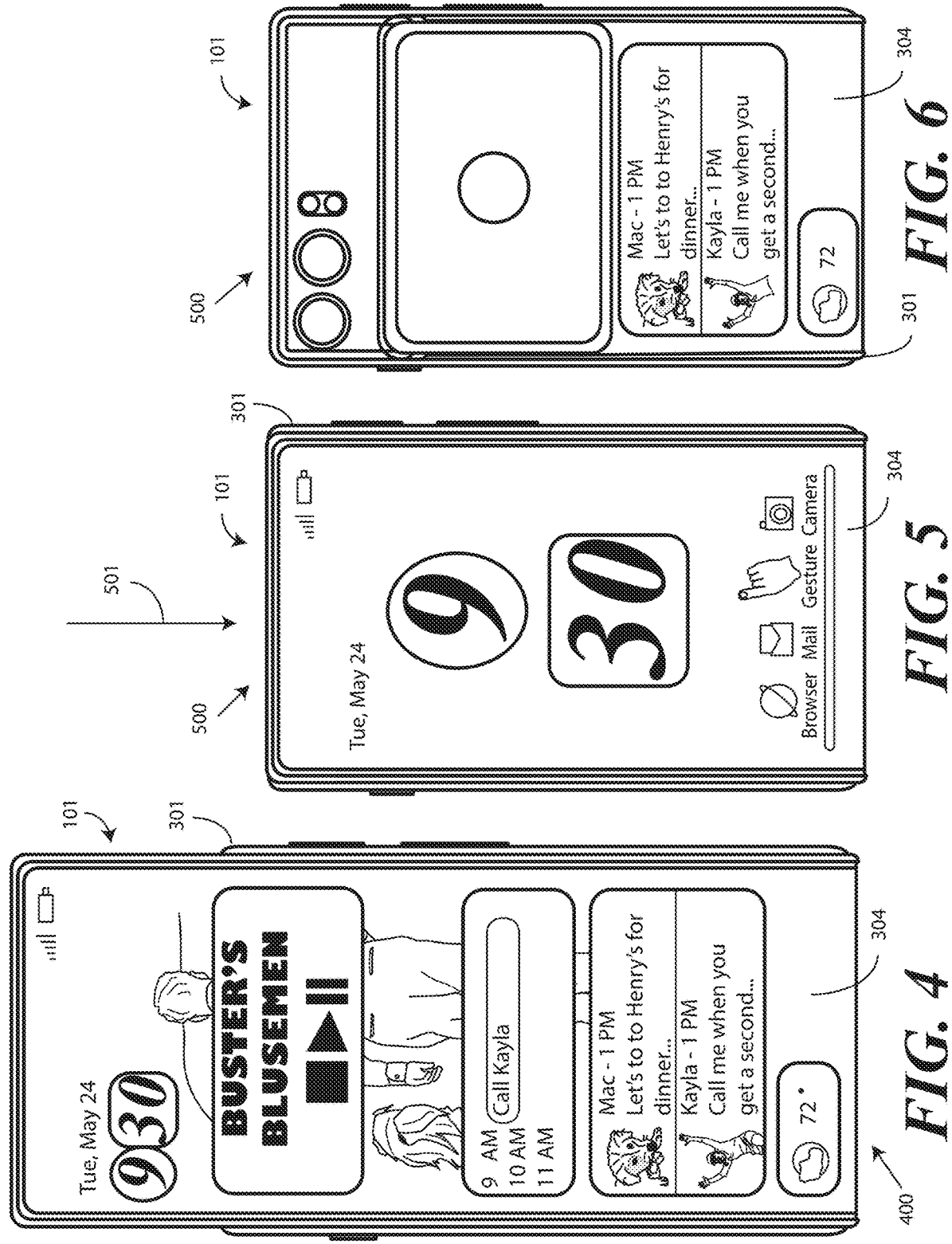

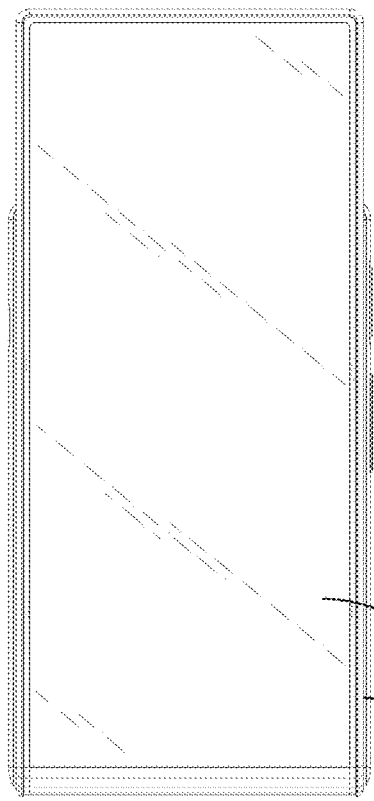 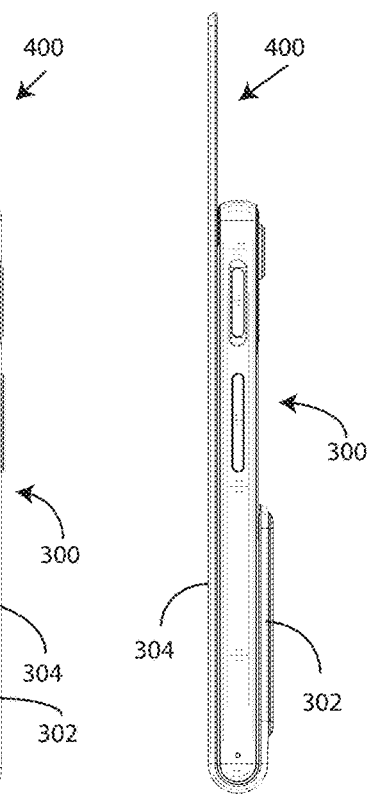 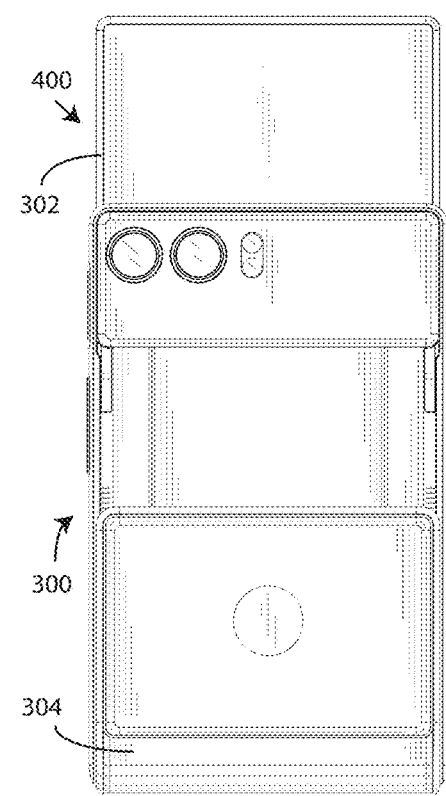
*FIG. 17*     *FIG. 18*     *FIG. 19*
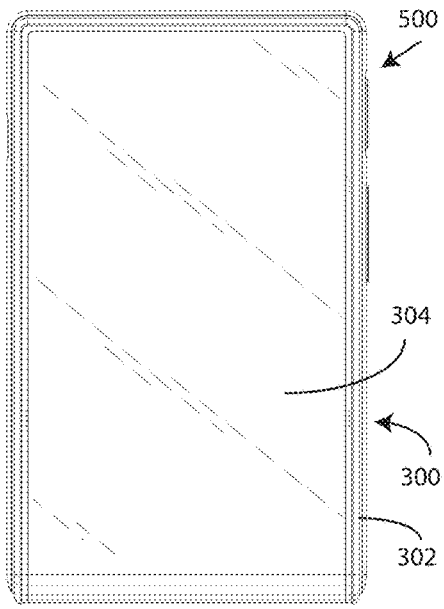 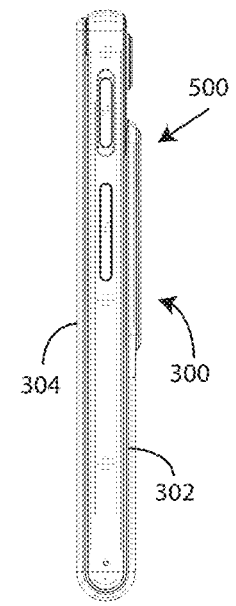 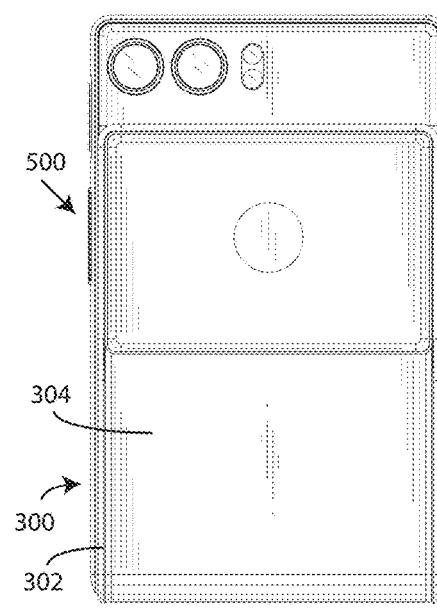
*FIG. 20*     *FIG. 21*     *FIG. 22*

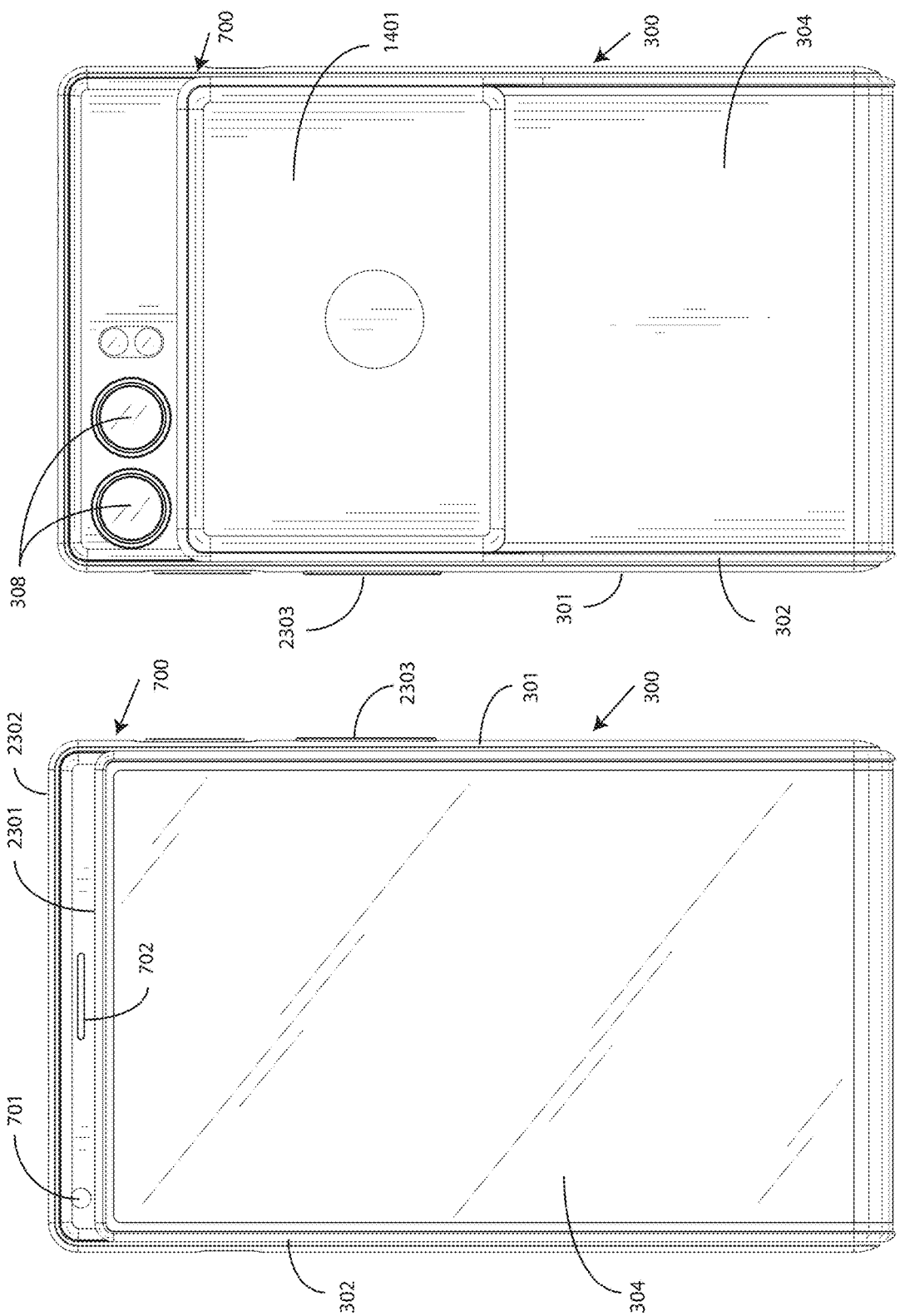

ic device in accordance with one or more embodiments of the disclosure.

ELECTRONIC DEVICES WITH TRANSLATING FLEXIBLE DISPLAYS AND CORRESPONDING METHODS FOR AUTOMATIC TRANSLATION WHEN OPERATING AS A CONTROLLER FOR ANOTHER ELECTRONIC DEVICE

BACKGROUND

Technical Field

This disclosure relates generally to electronic devices, and more particularly to electronic devices having flexible displays.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device that not only provides a compact geometric form factor but that allows for the use of a larger display surface area as well.

BRIEF DESCRIPTION OF THE DRAWINGS

FIG. 4 illustrates one explanatory electronic device having a translating display moved to a first sliding position where portions of the translating display extend distally away from the device housing of the electronic device.

FIG. 5 illustrates the explanatory electronic device of FIG. 4 with the translating display moved to a second sliding position where the translating display wraps around, and abuts, the device housing of the electronic device.

FIG. 6 illustrates the electronic device of FIG. 5 from the rear.

FIG. 17 illustrates a front elevation view of one explanatory electronic device in accordance with one or more embodiments of the disclosure with the blade assembly in an extended position.

FIG. 18 illustrates a left side elevation view of one explanatory electronic device in accordance with one or more embodiments of the disclosure with the blade assembly in an extended position.

FIG. 19 illustrates a rear elevation view of one explanatory electronic device in accordance with one or more embodiments of the disclosure with the blade assembly in an extended position.

FIG. 20 illustrates a front elevation view of one explanatory electronic device in accordance with one or more embodiments of the disclosure with the blade assembly in a retracted position.

FIG. 21 illustrates a left elevation view of one explanatory electronic device in accordance with one or more embodiments of the disclosure with the blade assembly in a retracted position.

FIG. 22 illustrates a rear elevation view of one explanatory electronic device in accordance with one or more embodiments of the disclosure with the blade assembly in a retracted position.

FIG. 23 illustrates a front elevation view of one explanatory electronic device in accordance with one or more embodiments of the disclosure with the blade assembly in a peek position revealing a front facing image capture device.

FIG. 24 illustrates a rear elevation view of one explanatory electronic device in accordance with one or more embodiments of the disclosure with the blade assembly in a peek position revealing a front facing image capture device.

Figure 1:
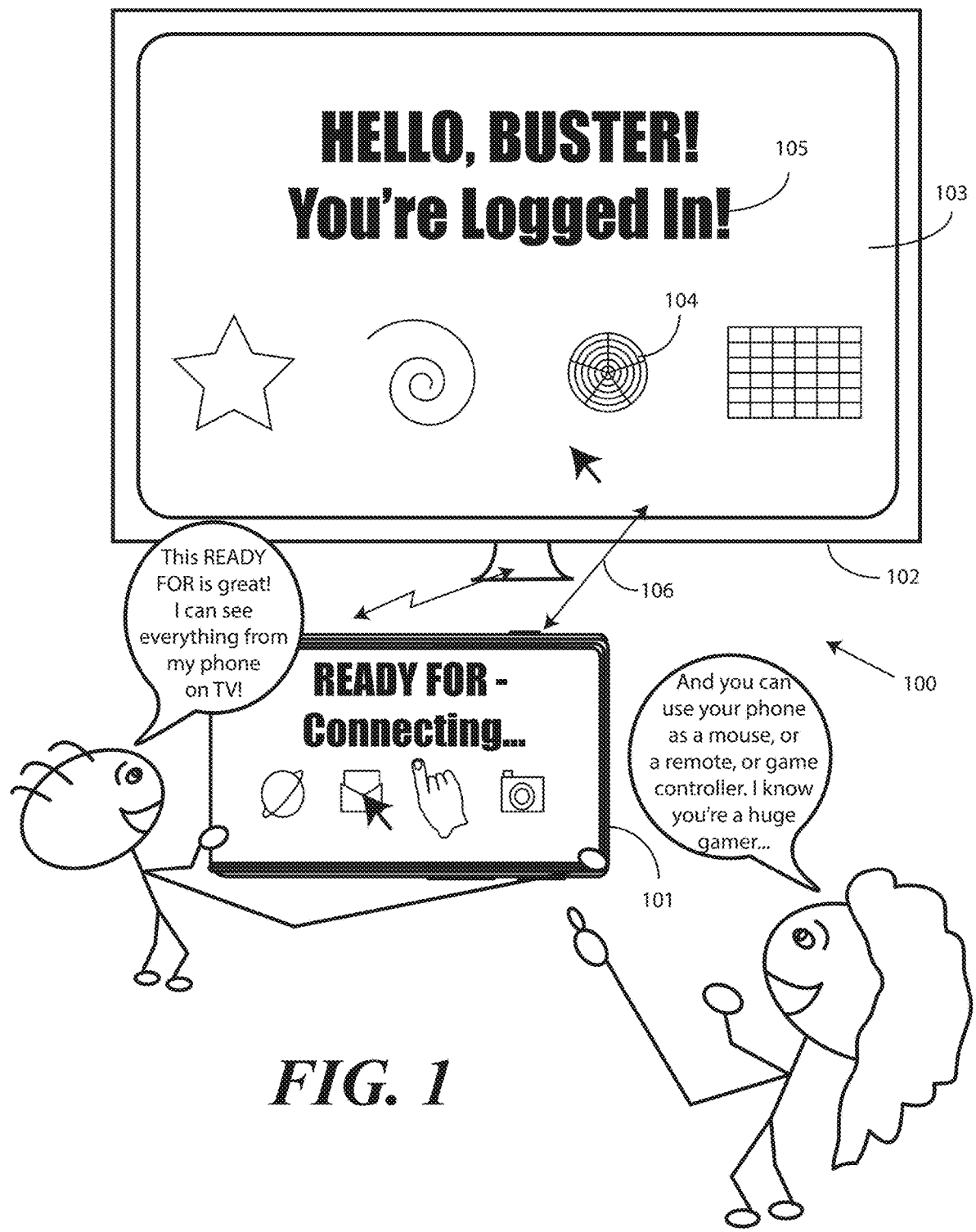
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, when a communication device is electronically communicating with a content presentation companion device, determining a front-facing area of a flexible display carried by a blade assembly that can translate around a device housing between an extended position where the blade assembly extends beyond an edge of the device housing and a retracted position where a major surface of the blade assembly abuts a major surface of the device housing without extending beyond the edge of the device housing that is required for a controller user interface used to control content being presented on the content presentation companion device and causing the blade assembly to transition to a position where a front-facing portion of the flexible display spans the front-facing area. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of generating methods and devices with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a single device housing. In one or more embodiments, a flexible display is then incorporated into a "blade" assembly that wraps around this single device housing. In one or more embodiments, the blade assembly does this by coupling to a translation mechanism attached to the single device housing.

The translation mechanism is operable to transition the blade assembly around the surfaces of the device housing between an extended position where a blade of the blade assembly extends distally from the device housing, a retracted position where the blade assembly abuts the device housing with the flexible display wrapping around the surfaces of the device housing, a "peek" position where movement of the translation mechanism causes the blade assembly to reveal an image capture device situated beneath the blade assembly on the front of the single device housing, and positions in between.

Illustrating by example, in one explanatory embodiment, the blade assembly slides around the single device housing such that the blade slides away from the single device housing to change an overall length of the flexible display appearing on the front of the electronic device. In other embodiments, the blade assembly can slide in an opposite direction around the single device housing to a retracted position with similar amounts of the flexible display visible on the front side of the electronic device and the rear side of the electronic device.

Accordingly, in one or more embodiments an electronic device includes a single device housing with a blade assembly coupled to two major surfaces of the single device housing and wrapping around at least one minor surface of the electronic device where the translation mechanism is positioned such that the blade assembly can slide around, and relative to, the single device housing between a retracted position, an extended position, and a peek position revealing a front-facing image capture device.

In one or more embodiments, the flexible display is coupled to the blade assembly. In one or more embodiments, the flexible display is also surrounded by a silicone border that is co-molded onto a blade substrate and that protects the side edges of the flexible display. In one or more embodiments, the blade assembly engages at least one rotor of the translation mechanism that is situated at an end of the single device housing. When a translation mechanism situated in the single device housing drives elements coupled to the blade assembly, the flexible display wraps around the rotor and moves to extend the blade of the blade assembly further from, or back toward, the single device housing.

In one or more embodiments, one end of the flexible display is fixedly coupled to the blade assembly. Meanwhile, the other end of the flexible display is coupled to the tensioner via a flexible substrate that extends beyond the terminal edges of the flexible display. In one or more embodiments, this flexible substrate is a stainless-steel substrate, although other materials can be used.

Illustrating by example, in one or more embodiments the flexible substrate of the flexible display is longer along its major axis than is the flexible display in at least one dimension. Accordingly, at least a first end of the flexible substrate extends distally beyond at least one terminal end of the flexible display. This allows the first end of the flexible substrate to be rigidly coupled to a tensioner. In one or more embodiments, adhesive is used to couple one end of the flexible display to the blade assembly, while one or more fasteners are used to couple the second end of the flexible display to the tensioner, which is carried by the blade assembly.

In one or more embodiments, the translation mechanism comprises an actuator that causes a portion of the blade assembly abutting a first major surface of the single device housing and another portion of the blade assembly abutting a second major surface of the single device housing to slide symmetrically in opposite directions along the single device housing when the blade assembly transitions between the extended position, the retracted position, and the peek position.

In one or more embodiments, one or more processors of the electronic device cause the blade assembly to automatically translate to the appropriate size required for the front-facing portion of the flexible display to accommodate a controller user interface when the electronic device is operating as a controller for a content presentation companion device. Illustrating by example, when a communication device of the electronic device is electronically communicating with a content presentation companion device that is operating as a primary display for the electronic device, one or more processors of the electronic device can determine a front-facing area amount required to present a controller user interface on a front-facing portion of the flexible display. Thereafter, the one or more processors can cause the blade assembly to transition to a position defined by the front-facing area amount such that the controller user interface can be presented while maintaining the electronic device in the most compact state that still allows for the presentation of the controller user interface. Advantageously, this causes the overall electronic device to become more compact, lending itself better to navigability when being used as a control device for another electronic device.

In one or more embodiments, when the content presentation companion device is operating as a primary display for the electronic device one or more processors of the electronic device cause a communication device to present content on the content presentation companion device. Thus, while the electronic device has its own display, when the content presentation companion device is operating as a primary display for the electronic device the content is received by the electronic device, and instead of being presented on its own display, is instead redirected to the display of the content presentation companion device. This advantageously frees up the display of the electronic device to present a controller user interface that can be used to control the content being delivered by the electronic device to the content presentation companion device and presented on the display of the content presentation companion device/

In one or more embodiments, the one or more processors of the electronic device determine a front-facing area amount of the flexible display required for the presentation of eth controller user interface operable to control the content being presented on the content presentation companion device. In one or more embodiments, the one or more processors then automatically cause a blade assembly carrying the flexible display to slide around the device housing sufficiently to reveal the front-facing area amount of the flexible display. The one or more processors can then present the controller user interface on the front-facing portion of the flexible display without any extra space or areas of the front-facing portion that are not required for the controller user interface being present. This keeps the electronic device compact while still presenting the full controller user interface on the front-facing portion of the flexible display.

In one or more embodiments, one or more processors of the electronic device detriment that the communication device of the electronic device is connected to an external display capable of displaying content that would otherwise be presented on the display of the electronic device. Such a device is referred to herein as a "content presentation companion device." Since the electronic device comprises a device housing and a blade assembly supporting a flexible display that is slidable around the device housing between an extended position where the blade assembly extends beyond an edge of the device housing and a retracted position where a major surface of the blade assembly abuts a mojo surface of the device housing without extending beyond the edge of the device housing, the one or more processors of the electronic device can initiate a configuration session for configuring a controller mode of operation for enabling the device to implement a controller user interface for interacting with content generated at the electronic device and communicated to the content presentation companion device.

In one or more embodiments, the one or more processors can identify one or more applications to be used to imitate the application launch event for a controller trigger and configure the controller mode logic based on the identified applications. In response to configuring the controller mode logic, in one or more embodiments the one or more processors dynamically resize the front-facing portion of the flexible display by causing the blade assembly to translate to an optimal position to fit the controller user interface thus configured. Thus, if the controller user interface is that of an air mouse, in one or more embodiments the electronic device will be in a more compact form factor than, for example, when the controller user interface is a super track pad or game controller. In those latter cases, the blade assembly may be transitioned toward the extended position. Likewise, a different size may be required to optimally surface a virtual game controller or television remote control. Examples of each will be described below. Other examples of controller user interfaces will be obvious to those of ordinary skill in the art having the benefit of this disclosure.

Advantageously, embodiments of the disclosure provide an improved sliding mechanism for a flexible display integrated into a blade assembly in a sliding electronic device having a single device housing that eliminates the need to manually transition the blade assembly to accommodate a given controller user interface. In one or more embodiments, the one or more processors cause the blade assembly to move by actuating a translation mechanism. The translation mechanism is equipped with an actuator that causes the blade assembly to translate around the device housing.

The actuator of the translation mechanism can take a variety of forms. In some embodiments, the actuator can comprise a dual-shaft motor. The dual shaft motor can be threaded to move translators of the translation mechanism in equal and opposite directions in one or more embodiments. In other embodiments, the dual-shaft motor can be coupled to at least one timing belt.

In another embodiment, the actuator comprises a first drive screw and a second drive screw. These drive screws can be coupled together by a gear assembly. When a first portion of the blade assembly is coupled to a translator positioned around the first drive screw, and a second portion of the blade assembly is coupled to another translator positioned around the second drive screw, actuation of either causes the first portion of the blade assembly abutting a first major surface of the single device housing and the second portion of the blade assembly abutting a second major surface of the single device housing to move symmetrically in opposite directions as the first drive screw and the second drive screw rotate.

In still other embodiments, the actuator comprises a first rack, a second rack, and a pinion. The first rack can be coupled to the first portion of the blade assembly while the second rack can be coupled to the second portion of the blade assembly. When the pinion engages both the first rack or the second rack, actuation of either causes the first portion of the blade assembly abutting a first major surface of the single device housing and the second portion of the blade assembly abutting a second major surface of the single device housing to move symmetrically in opposite directions as the first rack and second rack do the same. Other configurations of the actuator will be described below. Still others will be obvious to those of ordinary skill in the art having the benefit of this disclosure.

In one or more embodiments, the blade assembly is coupled to the translator of the translation mechanism. When the translator is actuated, a first portion of the blade assembly abutting a first major surface of the single device housing and a second portion of the blade assembly abutting a second major surface of the single device housing move symmetrically in opposite directions.

Advantageously, embodiments of the disclosure provide an improved sliding mechanism for a flexible display in an electronic device. Flexible display and rotor sliding assemblies configured in accordance with embodiments of the disclosure maintain a flat upper portion of a J-shape defined by a flexible display and/or blade assembly while preserving the operability and functionality of the flexible display during sliding operations.

Embodiments of the disclosure contemplate that in such an electronic device having a translating display, the user generally needs to manually select whether the display is transitioned to the extended position, the retracted position, or the peek position. Illustrating by example, the user might have to press a button once to cause the translating display to transition to the extended position and twice to cause the translating display to transition to the retracted position. A "long press" of the button may be required to cause the translating display to transition to the peek position, and so forth.

This manual actuation requires the user to take a manual action to change the state of the electronic device. Additionally, this requirement potentially delays the usability of the electronic device in the new state due to the time taken to manually "inject" the trigger causing transition of the translating display by pressing the button.

Advantageously, embodiments of the disclosure provide systems and methods that automatically and pre-emptively move the translating display as a function of the size of the particular controller user interface required to control content being presented on a content presentation companion device. Other advantages will be described below. Still others will be obvious to those of ordinary skill in the art having the benefit of this disclosure.

Turning now to FIG. 1, illustrated therein is one explanatory system 100 configured in accordance with one or more embodiments of the disclosure illustrating an electronic device 101 operating in conjunction with a content presentation companion device 102 in accordance with one or more embodiments of the disclosure. In FIG. 1, the electronic device 101 and the content presentation companion device 102 operate in tandem as a system, with the electronic device 101 providing the processing power to generate and/or receive content that could be presented on the display of the electronic device 101, but that is instead redirected for presentation on the content presentation companion device 102 while the content presentation companion device 102 serves as the primary display device for the electronic device 101.

As shown in FIG. 1, the electronic device 101 is electronically in communication with the content presentation companion device 102. When the electronic device 101 is electronically in communication with the content presentation companion device 102, this allows the electronic device 101 to use the larger display 103 of the content presentation companion device 102 to present content. Illustrating by example, in one or more embodiments the electronic device 101 can operate in a "content redirection" mode by presenting content such as movies, videos, images, and even a traditional computer user interface, that are generated or received by the electronic device 101 and are redirected to the display 103 of the content presentation companion device 102.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 101 and the content presentation companion device 102, the processing power of the electronic device 101 can be leveraged to deliver this content to the content presentation companion device 102 for presentation of that content on the display 103 of the content presentation companion device 102. This allows a user to watch television, play video games, work on homework or office work, video call friends and family, or perform other tasks using the one or more processors of the electronic device 101 combined with the large display 103 of the content presentation companion device 102.

Using a content redirection feature, a small electronic device 101 such as the smartphone shown in FIG. 1 can connect to connect to a content presentation companion device 102 such as a larger monitor, television, or other device having a larger screen. Using the content redirection feature, users can wirelessly stream video content from the electronic device 101 to the larger display 103 of the content presentation companion device 102 with no loss in performance. Resolution of the images 104 on the content presentation companion device 102 can be as high as 4K with frame rates that present the content 105 without flicker or distortion. In the illustrative embodiment of FIG. 1, neither a cable nor a docking station is required to use the content redirection feature.

When using the content redirection feature, the electronic device 101 can function as a mouse, trackpad, or other control device while the content 105 is being presented on the content presentation companion device 102. The content redirection feature can be used for presenting pictures, videos, television shows, or movies on the larger display 103 of a content presentation companion device 102 while a controller user interface used to control the content is presented locally on the display of the electronic device 101. Additionally, the controller user interface presented on the electronic device 101 can be used to control gaming applications, video conferences, and other content presentation tasks.

Embodiments of the disclosure advantageously provide a more intelligent system that dynamically enhances the feature set offered by the electronic device 101 by causing the electronic device 101 to deliver content to the content presentation companion device 102 while at the same time serving as a controller for the content presentation companion device 102. When a controller user interface is presented on the display of the electronic device 101, a user can deliver user input to the controller user interface to control the content being presented on the content presentation companion device 102. For instance, in one or more embodiments a user interface feature being presented on the content presentation companion device 102 can be adjusted using a controller user interface that is presented on a display of the electronic device 101.

Before turning to the user interface enhancements and how they are provided a deeper look into the hardware of the electronic device 101 and the content presentation companion device 102 will be provided. Beginning with the content presentation companion device 102, and turning now to FIG. 2, illustrated therein is one explanatory content presentation companion device 102 configured in accordance with one or more embodiments of the disclosure.

Figure 2:
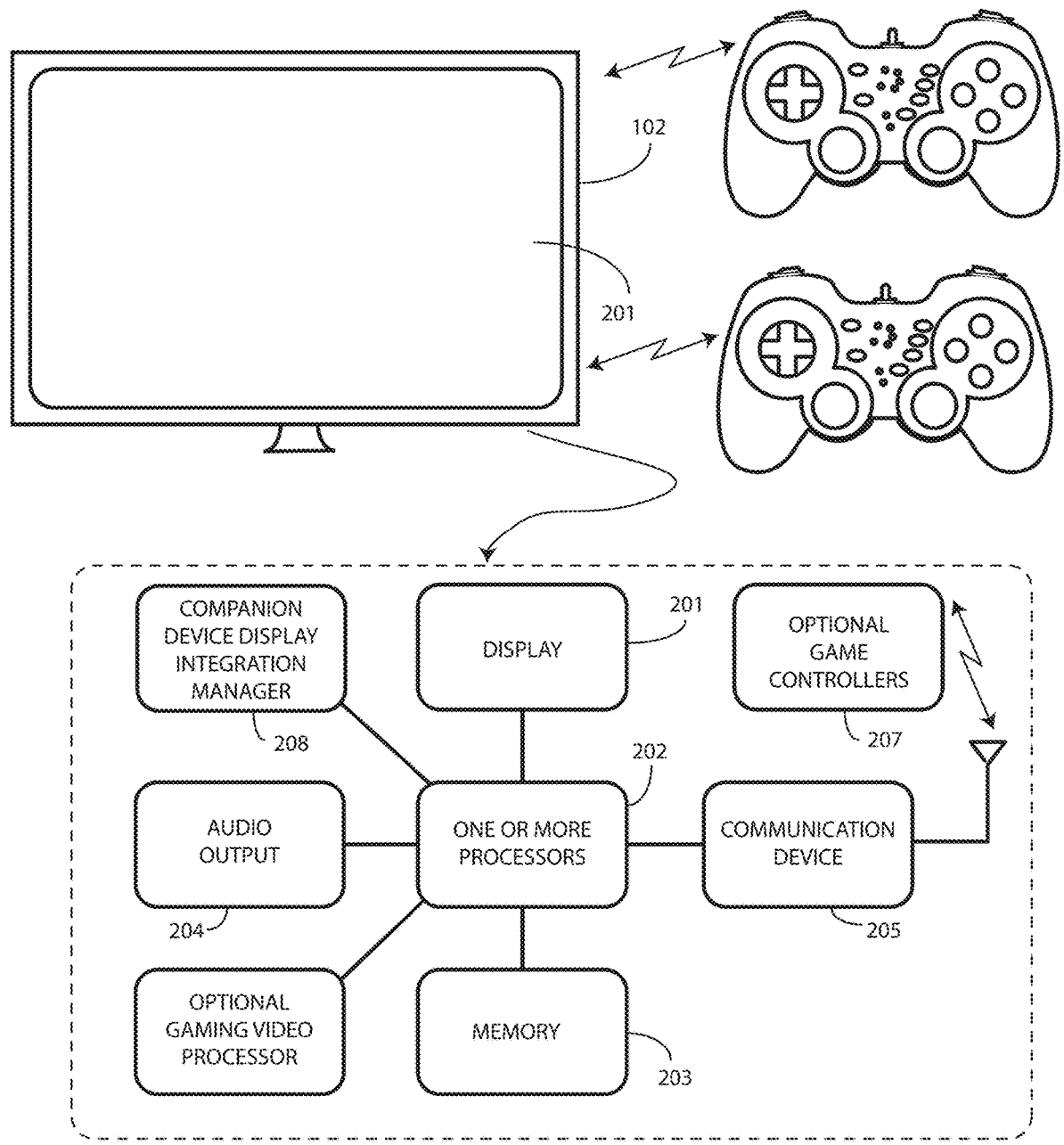
FIG. 2 illustrates one explanatory content presentation companion device in accordance with one or more embodiments of the disclosure.

Illustrated in FIG. 2 is one explanatory content presentation companion device 102 in accordance with one or more embodiments of the disclosure. In this illustrative embodiment, the content presentation companion device 102 comprises a color video monitor. In other embodiments, the content presentation companion device 102 can take other forms. Illustrating by example, the content presentation companion device 102 can be a television, a computer display, a laptop display, a tablet computer, gaming console that includes one or more game controllers 207, or a projector projecting content onto a screen. Other examples of content presentation companion devices will be obvious to those of ordinary skill in the art having the benefit of this disclosure. Regardless of configuration, in one or more embodiments the content presentation companion device 102 includes one or more processors 202, a display 201, a memory 203, an audio output 204, and a communication device 205 capable of wired or wireless communication with an electronic device such as the electronic device (101) of FIG. 1.

In one or more embodiments, when coupled by a wireless connection to such an electronic device (101), the content presentation companion device 102 can function as a primary display for the electronic device (101). The electronic device (101) can receive content from a terrestrial broadcast network, cable television network, Internet streaming service, or combinations thereof, and redirect this content to the content presentation companion device 102 using the content presentation companion device integration manager 208 since its display 201 is larger than the display of the electronic device (101). Effectively, the electronic device (101) is the source of content that could be presented on the display of the electronic device (101) but that is instead redirected to the content presentation companion device 102. This allows people within the environment of the electronic device (101) or content presentation companion device 102 to more easily see the content. In one or more embodiments, content flows from the electronic device (101) to the content presentation companion device 102 through the communication device 205.

Figure 3:
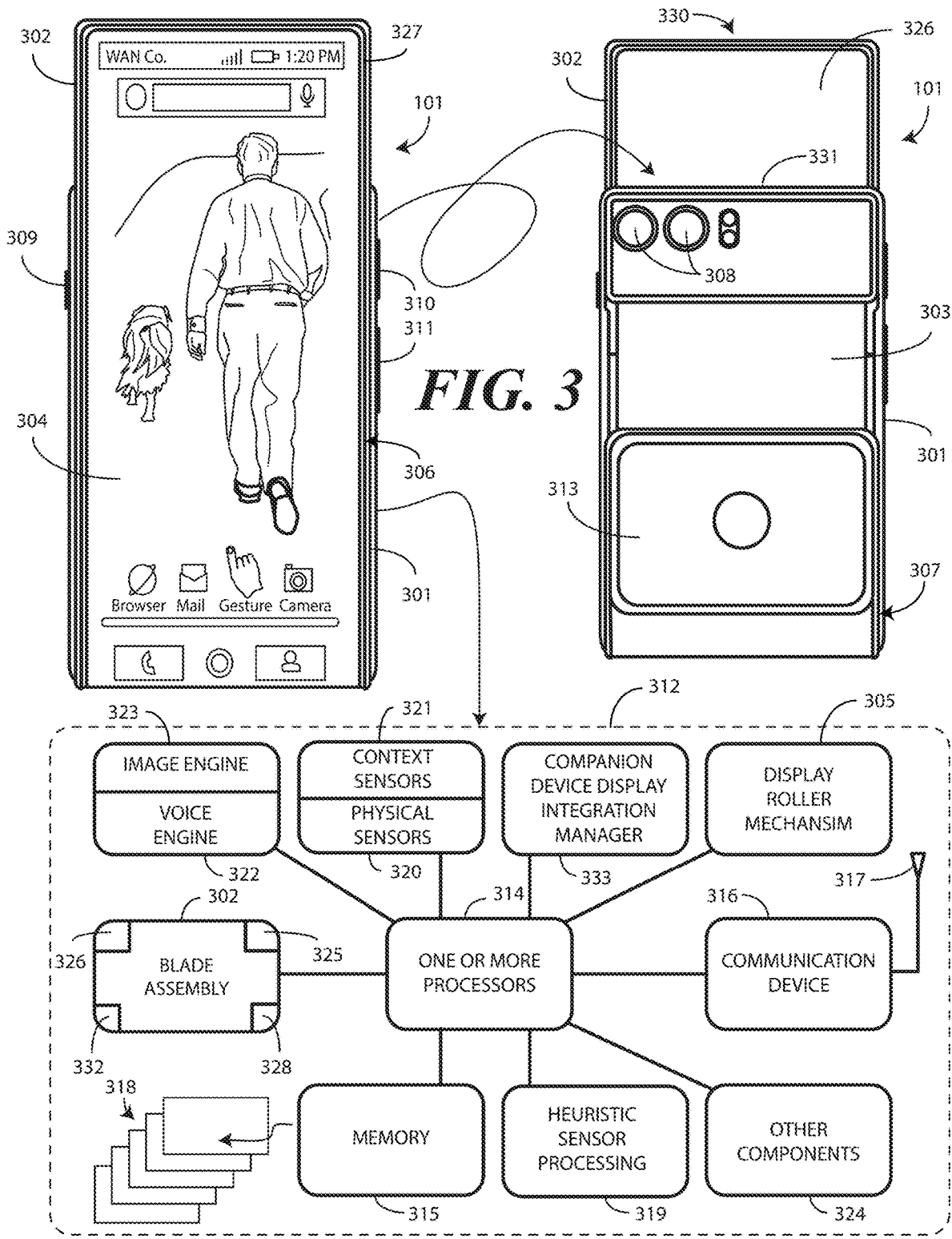
FIG. 3 illustrates one explanatory electronic device in accordance with one or more embodiments of the disclosure.

Turning now to FIG. 3, illustrated therein is one explanatory electronic device 101 configured in accordance with one or more embodiments of the disclosure. The electronic device 101 of FIG. 1 is a portable electronic device. For illustrative purposes, the electronic device 101 is shown as a smartphone. However, the electronic device 101 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 101 includes a single device housing 301. In one or more embodiments, a blade assembly 302 carrying a flexible display 304 wraps around the single device housing 301. As will be described in more detail below, in one or more embodiments the blade assembly 302 is configured to "slide" along the first major surface (covered by the flexible display in the front view of the electronic device 101 on the left side of FIG. 3) of the single device housing 301 and second major surface 303 situated on the rear side of the single device housing 301.

In one or more embodiments the single device housing 301 is manufactured from a rigid material such as a rigid thermoplastic, metal, or composite material, although other materials can be used. Illustrating by example, in one illustrative embodiment the single device housing 301 is manufactured from aluminum. Still other constructs will be obvious to those of ordinary skill in the art having the benefit of this disclosure.

In the illustrative embodiment of FIG. 3, the blade assembly 302 carries the flexible display 304. The flexible display 304 can optionally be touch-sensitive. Users can deliver user input to the flexible display 304 of such an embodiment by delivering touch input from a finger, stylus, or other objects disposed proximately with the flexible display 304.

In one embodiment, the flexible display 304 is configured as an organic light emitting diode (OLED) display fabricated on a flexible plastic substrate. The blade assembly 302 is fabricated on a flexible substrate as well. This allows the blade assembly 302 and flexible display 304 to deform around a display roller mechanism 305 when a first portion 306 of the blade assembly 302 abutting a first major surface of the single device housing 301 and a second portion 307 of the blade assembly 302 abutting a second major surface 303 of the single device housing 301 move symmetrically in opposite directions around the single device housing 301. In one or more embodiments, the blade assembly 302 and flexible display 304 are both constructed on flexible metal substrates can allow each to bend with various bending radii around the display roller mechanism 305.

In one or more embodiments the flexible display 304 may be formed from multiple layers of flexible material such as flexible sheets of polymer or other materials. In this illustrative embodiment, the flexible display 304 is fixedly coupled to the blade assembly 302, which wraps around the display roller mechanism 305.

Features can be incorporated into the single device housing 301. Examples of such features include one or more cameras or image capture devices or an optional speaker port. In this illustrative embodiment, user interface components 309,310,311, which may be buttons, fingerprint sensors, or touch sensitive surfaces, can also be disposed along the surfaces of the single device housing 301. Any of these features are shown being disposed on the side surfaces of the electronic device 101 could be located elsewhere. In other embodiments, these features may be omitted.

A block diagram schematic 312 of the electronic device 101 is also shown in FIG. 3. The block diagram schematic 312 includes one or more electronic components that can be coupled to a printed circuit board assembly disposed within the single device housing 301. Alternatively, the electronic components may be carried by the blade assembly 302. Illustrating by example, in one or more embodiments electronic components can be positioned beneath a "backpack" 313 carried by the blade assembly 302.

The components of the block diagram schematic 312 can be electrically coupled together by conductors or a bus disposed along one or more printed circuit boards. For example, some components of the block diagram schematic 312 can be configured as a first electronic circuit fixedly situated within the single device housing 301, while other components of the block diagram schematic 312 can be configured as a second electronic circuit carried by the blade assembly 302 in the backpack 313. A flexible substrate can then extend from the first electronic circuit in the single device housing 301 to the second electronic circuit carried by the blade assembly 302 in the backpack 313 to electrically couple the first electronic circuit to the second electronic circuit.

The illustrative block diagram schematic 312 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

In one or more embodiments, the electronic device 101 includes one or more processors 314. In one embodiment, the one or more processors 314 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 101. Each of the application processor and the auxiliary processor(s) can be configured to process and execute executable software code to perform the various functions of the electronic device 101. A storage device, such as memory 315, can optionally store the executable software code used by the one or more processors 314 during operation.

In one embodiment, the one or more processors 314 are responsible for running the operating system environment of the electronic device 101. The operating system environment can include a kernel and one or more drivers, and an application service layer, and an application layer. The operating system environment can be configured as executable code operating on one or more processors or control circuits of the electronic device 101. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In this illustrative embodiment, the electronic device 101 also includes a communication device 316 that can be configured for wired or wireless communication with one or more other devices or networks. The networks can include a wide area network, a local area network, and/or personal area network. The communication device 316 may also utilize wireless technology for communication, such as, but are not limited to, peer-to-peer or ad hoc communications such as HomeRF, Bluetooth and IEEE 802.11, and other forms of wireless communication such as infrared technology. The communication device 316 can include wireless communication circuitry, one of a receiver, a transmitter, or transceiver, and one or more antennas 317.

In one embodiment, the one or more processors 314 can be responsible for performing the primary functions of the electronic device 101. For example, in one embodiment the one or more processors 314 comprise one or more circuits operable with one or more user interface devices, which can include the flexible display 304, to present, images, video, or other presentation information to a user. The executable software code used by the one or more processors 314 can be configured as one or more modules 318 that are operable with the one or more processors 314. Such modules 318 can store instructions, control algorithms, logic steps, and so forth.

In one embodiment, the one or more processors 314 are responsible for running the operating system environment of the electronic device 101. The operating system environment can include a kernel and one or more drivers, and an application service layer, and an application layer. The operating system environment can be configured as executable code operating on one or more processors or control circuits of the electronic device 101. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 314 may generate commands or execute control operations based on information received from the various sensors of the electronic device 101. As shown in FIG. 1, these sensors can be categorized into physical sensors 320 and context sensors 321.

Generally speaking, physical sensors 320 include sensors configured to sense or determine physical parameters indicative of conditions in an environment about the electronic device 101. Illustrating by example, the physical sensors 320 can include devices for determining information such as motion, acceleration, orientation, proximity to people and other objects, lighting, capturing images, and so forth. The physical sensors 320 can include various combinations of microphones, location detectors, temperature sensors, barometers, proximity sensor components, proximity detector components, wellness sensors, touch sensors, cameras, audio capture devices, and so forth. Many examples of physical sensors 320 will be described below with reference to FIG. 8. Others will be obvious to those of ordinary skill in the art having the benefit of this disclosure.

By contrast, the context sensors 321 do not measure physical conditions or parameters. Instead, they infer context from data of the electronic device. Illustrating by example, when a physical sensor 320 includes a camera or intelligent imager, the context sensors 321 can use data captured in images to infer contextual cues. An emotional detector may be operable to analyze data from a captured image to determine an emotional state. The emotional detector may identify facial gestures such as a smile or raised eyebrow to infer a person's silently communicated emotional state, e.g., joy, anger, frustration, and so forth. Other context sensors 321 may analyze other data to infer context, including calendar events, user profiles, device operating states, energy storage within a battery, application data, data from third parties such as web services and social media servers, alarms, time of day, behaviors a user repeats, and other factors.

The context sensors 321 can be configured as either hardware components, or alternatively as combinations of hardware components and software components. The context sensors 321 can be configured to collect and analyze non-physical parametric data.

Figure 8:
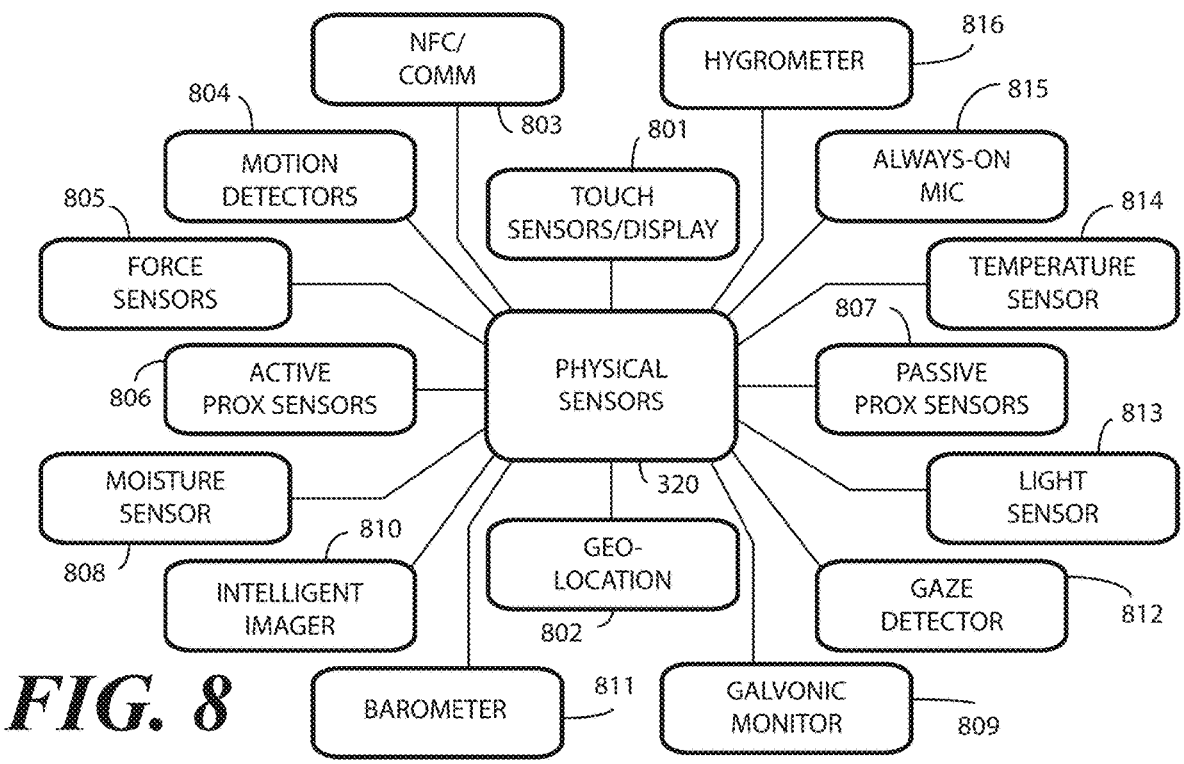
FIG. 8 illustrates one or more explanatory physical sensors suitable for use, alone or in combination, in an electronic device in accordance with one or more embodiments of the disclosure.
Figure 9:
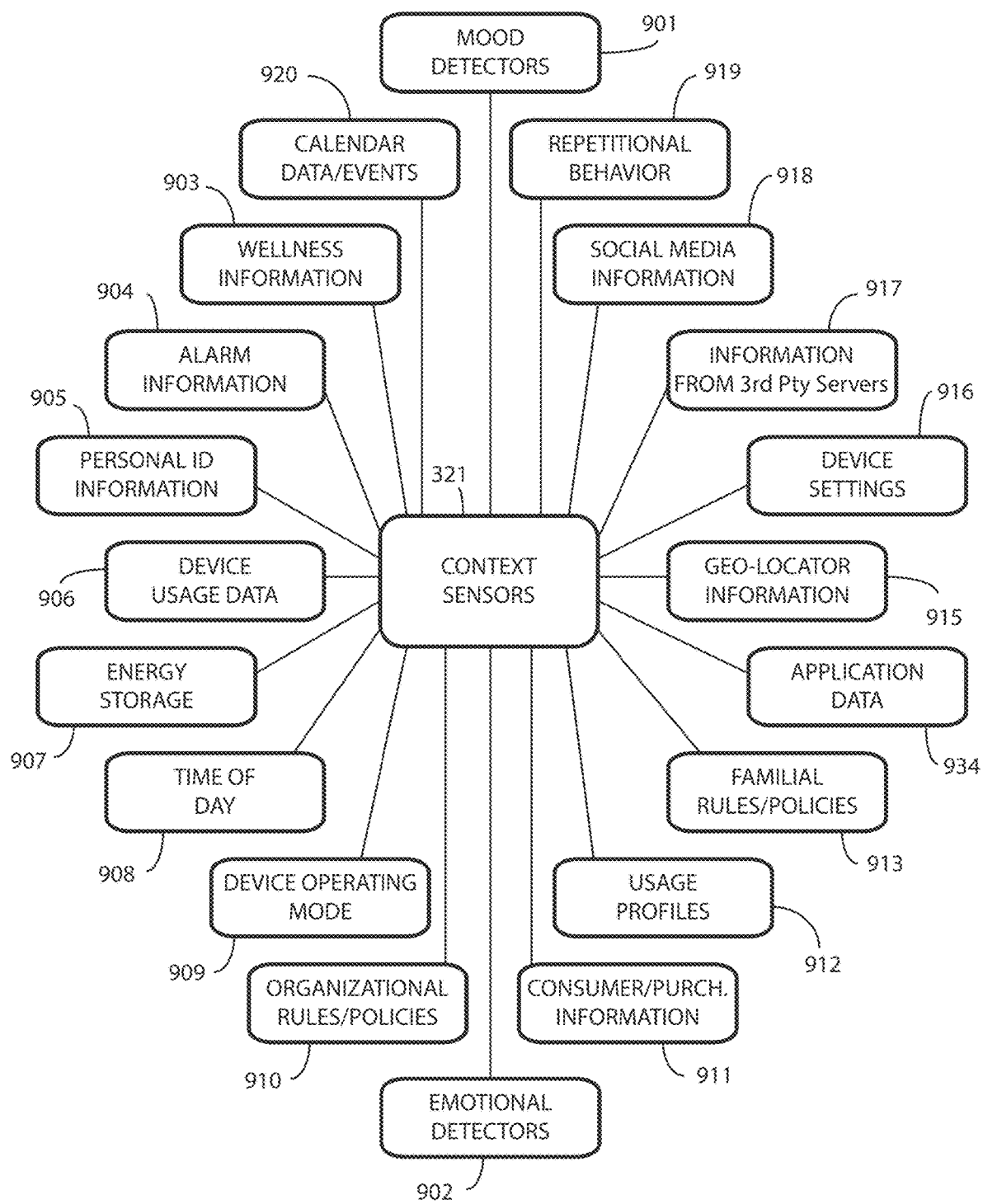
FIG. 9 illustrates one or more explanatory context sensors suitable for use, alone or in combination, in an electronic device in accordance with one or more embodiments of the disclosure.

Examples of the physical sensors 320 and the context sensors 321 are shown in FIGS. 8 and 9. These examples are illustrative only, as other physical sensors 320 and context sensors 321 will be obvious to those of ordinary skill in the art having the benefit of this disclosure.

Turning briefly to FIG. 8, illustrated therein are various examples of the physical sensors 320. In one or more embodiments, the physical sensors 320 sense or determine physical parameters indicative of conditions in an environment about an electronic device. FIG. 8 illustrates several examples physical sensors 320. It should be noted that those shown in FIG. 8 are not comprehensive, as others will be obvious to those of ordinary skill in the art having the benefit of this disclosure. Additionally, it should be noted that the various physical sensors 320 shown in FIG. 8 could be used alone or in combination. Accordingly, many electronic devices will employ only subsets of the physical sensors 320 shown in FIG. 8, with the particular subset chosen being defined by device application.

A first example of a physical sensor 320 is a touch sensor 801. The touch sensor 801 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors (314), to detect an object in close proximity with—or touching—the surface of the display or the housing of an electronic device by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a physical sensor 320 is a geo-locator that serves as a location detector 802. In one embodiment, location detector 802 is operable to determine location data when an image is captured from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, and other similar satellite positioning systems. The location detector 802 can make location determinations autonomously or with assistance from terrestrial base stations, for example those associated with a cellular communication network or other ground-based network, or as part of a Differential Global Positioning System (DGPS), as is well known by those having ordinary skill in the art. The location detector 802 may also be able to determine location by locating or triangulating terrestrial base stations of a traditional cellular network, or from other local area networks, such as Wi-Fi networks.

Another physical sensor 320 is a near field communication circuit 803. The near field communication circuit 803 can be included for communication with local area networks to receive information regarding the context of the environment in which an electronic device is located. Illustrating by example, the near field communication circuit 803 may obtain information such as weather information and location information. If, for example, a user is at a museum, they may be standing near an exhibit that can be identified with near field communication. This identification can indicate that the electronic device is both indoors and at a museum. Accordingly, if the user requests additional information about an artist or a painting, there is a higher probability that the question is a device command asking the one or more processors (314) to search for than information with a web browser. Alternatively, the near field communication circuit 803 can be used to receive contextual information from kiosks and other electronic devices. The near field communication circuit 803 can also be used to obtain image or other data from social media networks. Examples of suitable near field communication circuits include Bluetooth communication circuits, IEEE 801.11 communication circuits, infrared communication circuits, magnetic field modulation circuits, and Wi-Fi circuits.

Another example of a physical sensor 320 is the motion detector 804. Illustrating by example, an accelerometer, gyroscopes, or other device can be used as a motion detector 804 in an electronic device. Using an accelerometer as an example, an accelerometer can be included to detect motion of the electronic device. Additionally, the accelerometer can be used to sense some of the gestures of the user, such as one talking with their hands, running, or walking.

The motion detector 804 can also be used to determine the spatial orientation of an electronic device as well in three-dimensional space by detecting a gravitational direction. In addition to, or instead of, an accelerometer, an electronic compass can be included to detect the spatial orientation of the electronic device relative to the earth's magnetic field. Similarly, one or more gyroscopes can be included to detect rotational motion of the electronic device.

Another example of a physical sensor 320 is a force sensor 805. The force sensor can take various forms. For example, in one embodiment, the force sensor comprises resistive switches or a force switch array configured to detect contact with either the display or the housing of an electronic device. The array of resistive switches can function as a force-sensing layer, in that when contact is made with either the surface of the display or the housing of the electronic device, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. In yet another embodiment, piezoelectric sensors can be configured to sense force as well. For example, where coupled with the lens of the display, the piezoelectric sensors can be configured to detect an amount of displacement of the lens to determine force. The piezoelectric sensors can also be configured to determine force of contact against the housing of the electronic device rather than the display.

Another example of physical sensors 320 includes proximity sensors. The proximity sensors fall in to one of two camps: active proximity sensors and "passive" proximity sensors. These are shown as proximity detector components 806 and proximity sensor components 807 in FIG. 8. Either the proximity detector components 806 or the proximity sensor components 807 can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components 807 comprise a signal receiver to receive signals from objects external to the housing of an electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components 807 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components 807 are sometimes referred to as a "passive IR system" due to the fact that the person is the active transmitter. Accordingly, the proximity sensor component 807 requires no transmitter since objects disposed external to the housing deliver emissions that are received by the infrared receiver. As no transmitter is required, each proximity sensor component 807 can operate at a very low power level.

In one embodiment, the signal receiver of each proximity sensor component 807 can operate at various sensitivity levels so as to cause the at least one proximity sensor component 807 to be operable to receive the infrared emissions from different distances. For example, the one or more processors (314) can cause each proximity sensor component 807 to operate at a first "effective" sensitivity so as to receive infrared emissions from a first distance. Similarly, the one or more processors (314) can cause each proximity sensor component 807 to operate at a second sensitivity, which is less than the first sensitivity, so as to receive infrared emissions from a second distance, which is less than the first distance. The sensitivity change can be made by causing the one or more processors (314) to interpret readings from the proximity sensor component 807 differently.

By contrast, proximity detector components 806 include a signal emitter and a corresponding signal receiver. While each proximity detector component 806 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 806 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component 806 can be an infrared proximity sensor set that uses a signal emitter that transmits a beam of infrared light that reflects from a nearby object and is received by a corresponding signal receiver. Proximity detector components 806 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

Another example of a physical sensor is a moisture detector 808. A moisture detector 808 can be configured to detect the amount of moisture on or about the display or the housing of the electronic device. This can indicate various forms of context. Sometimes, it can indicate rain or drizzle in the environment about the electronic device. Accordingly, if a user is frantically asking "Call a cab!" the fact that moisture is present may increase the likelihood that this ask is a device command. The moisture detector 808 can be realized in the form of an impedance sensor that measures impedance between electrodes. As moisture can be due to external conditions, e.g., rain, or user conditions, perspiration, the moisture detector 808 can function in tandem with ISFETS configured to measure pH or amounts of NaOH in the moisture or a galvanic sensor 809 to determine not only the amount of moisture, but whether the moisture is due to external factors, perspiration, or combinations thereof.

An intelligent imager 810, configured as an imager or image capture device, can be configured to capture an image of an object and determine whether the object matches predetermined criteria. For example, the intelligent imager 810 operate as an identification module configured with optical recognition such as include image recognition, character recognition, visual recognition, facial recognition, color recognition, shape recognition and the like. Advantageously, the intelligent imager 810 can be used as a facial recognition device to determine the identity of one or more persons detected about an electronic device.

For example, in one embodiment when the one or more proximity sensor components 807 detect a person, the intelligent imager 810 can capture a photograph of that person. The intelligent imager 810 can then compare the image to a reference file stored in memory (315), to confirm beyond a threshold authenticity probability that the person's face sufficiently matches the reference file. Beneficially, optical recognition allows the one or more processors (314) to execute control operations only when one of the persons detected about the electronic device are sufficiently identified as the owner of the electronic device.

In addition to capturing photographs, the intelligent imager 810 can function in other ways as well. For example, in some embodiments the intelligent imager 810 can capture multiple successive pictures to capture more information that can be used to determine social cues. Alternatively, the intelligent imager 810 can capture or video frames, with or without accompanying metadata such as motion vectors. This additional information captured by the intelligent imager 810 can be used to detect richer social cues that may be inferred from the captured data.

A barometer 811 can sense changes in air pressure due to environmental and/or weather changes. In one embodiment, the barometer 811 includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

A gaze detector 812 can comprise sensors for detecting the user's gaze point. The gaze detector 812 can optionally include sensors for detecting the alignment of a user's head in three-dimensional space. Electronic signals can then be delivered from the sensors to the gaze detection processing for computing the direction of user's gaze in three-dimensional space. The gaze detector 812 can further be configured to detect a gaze cone corresponding to the detected gaze direction, which is a field of view within which the user may easily see without diverting their eyes or head from the detected gaze direction. The gaze detector 812 can be configured to alternately estimate gaze direction by inputting to the gaze detection processing images representing a photograph of a selected area near or around the eyes. It will be clear to those of ordinary skill in the art having the benefit of this disclosure that these techniques are explanatory only, as other modes of detecting gaze direction can be substituted in the gaze detector 812 of FIG. 8.

A light sensor 813 can detect changes in optical intensity, color, light, or shadow in the environment of an electronic device. This can be used to make inferences about context such as weather or other cues. For example, if the light sensor 813 detects low-light conditions in the middle of the day when the location detector 802 indicates that the electronic device is outside, this can be due to cloudy conditions, fog, or haze. An infrared sensor can be used in conjunction with, or in place of, the light sensor 813. The infrared sensor can be configured to detect thermal emissions from an environment about an electronic device. Where, for example, the infrared sensor detects heat on a warm day, but the light sensor detects low-light conditions, this can indicate that the electronic device is in a room where the air conditioning is not properly set. Similarly, a temperature sensor 814 can be configured to monitor temperature about an electronic device.

The physical sensors 320 can also include an audio capture device 815. In one embodiment, the audio capture device 815 includes one or more microphones to receive acoustic input. While the one or more microphones can be used to sense voice input, voice commands, and other audio input, in some embodiments they can be used as environmental sensors to sense environmental sounds such as rain, wind, and so forth.

In one embodiment, the one or more microphones include a single microphone. However, in other embodiments, the one or more microphones can include two or more microphones. Where multiple microphones are included, they can be used for selective beam steering to, for instance, determine from which direction a sound emanated. Illustrating by example, a first microphone can be located on a first side of the electronic device for receiving audio input from a first direction, while a second microphone can be placed on a second side of the electronic device for receiving audio input from a second direction. The one or more processors (314) can then select between the first microphone and the second microphone to beam steer audio reception toward the user. Alternatively, the one or more processors (314) can process and combine the signals from two or more microphones to perform beam steering.

In one embodiment, the audio capture device 815 comprises an "always ON" audio capture device. As such, the audio capture device 815 is able to capture audio input at any time that an electronic device is operational. As noted above, in one or more embodiments, the one or more processors, which can include a digital signal processor, can identify whether one or more device commands are present in the audio input captured by the audio capture device 815.

One further example of the physical sensors 320 is a hygrometer 816. The hygrometer 816 can be used to detect humidity, which can indicate that a user is outdoors or is perspiring. As noted above, the illustrative physical sensors of FIG. 8 are not comprehensive. Numerous others could be added. For example, a wind-speed monitor could be included to detect wind. Accordingly, the physical sensors 320 of FIG. 8 are illustrative only, as numerous others will be obvious to those of ordinary skill in the art having the benefit of this disclosure.

Turning briefly now to FIG. 9, illustrated therein are various examples of context sensors 321. As with FIG. 8, the examples shown in FIG. 9 do not constitute a comprehensive list. Numerous other context sensors 321 will be obvious to those of ordinary skill in the art having the benefit of this disclosure.

In one embodiment, a mood detector 901 can infer a person's mood based upon contextual information received from the physical sensors (320). For example, if the intelligent imager (701) captures a picture, multiple successive pictures, video, or other information from which a person can be identified as the owner of the electronic device, and she is crying in the picture, multiple successive pictures, video, or other information, the mood detector 901 can infer that she is either happy or sad. Similarly, if the audio capture device captures a user's voice and the user is yelling or cursing, the mood detector 901 can infer that the user is likely angry or upset.

The emotional detector 902 can function in a similar manner to infer a person's emotional state from contextual information received from the physical sensors (320). Illustrating by example, if the intelligent imager (701) captures a picture, multiple successive pictures, video, or other information relating to of the owner of an electronic device, the emotional detector 902 can infer their silently communicated emotional state, e.g., joy, anger, frustration, and so forth. This can be inferred from, for example, facial gestures such as a raised eyebrow, grin, or other feature. In one or more embodiments, such emotional cues can indicate the user is intending to issue a command to the electronic device. Alternatively, emotion can be detected from voice inflections, or words used. If someone screams, "I am mad at you," there are likely negative emotional issues involved, for example.

Calendar information and events 920 can be used to detect social cues. If, for example, a calendar event indicates that a birthday party is occurring, this can imply festive and jovial social cues. However, if a funeral is occurring, it is unlikely that a user will be issuing device commands to an electronic device as funerals tend to be quiet affairs.

Wellness information 903 can be used to detect social cues. If, for example, wellness information 903 indicates that a person's heart rate is high, and they are perspiring, and the location information 915 indicates that a person is in an alley of a city, and the time-of-day information 908 indicates that its 3 AM, the person may be under duress. Accordingly, the command "Call 911" is highly likely to be a device command.

Alarm information 904 can be used to detect social cues. If an alarm has just sounded at 6:00 AM, the command "snooze" is likely to be a device command. Personal identification information 905 can be used to detect social cues as well. If a person is a diabetic, and wellness sensors show them to be clammy and sweaty, this could be due to low insulin. Accordingly, the command "Call 911" is highly likely to be a device command.

Device usage data 906 can indicate social cues. If a person is searching the web, and an incoming call is received, the command "decline" is likely to be a device command. Energy storage 907 within an electronic device can be used to indicate a social cue. Device operating mode information 909 can be used in a similar fashion. When energy storage drops to, for example, ten percent, the command "shut down all non-critical apps" is likely to be a device command.

Consumer purchase information 911 can certainly indicate social cues. If, for example, a person is a sommelier and frequently purchases wine, when viewing a web browser and finding a bottle of '82 Lafite for under $1000, the command "buy that wine now" is likely to be a device command.

Device usage profiles 912 can be used to infer social cues as well. If, for example, a person never uses an electronic device between 10:00 PM and 6:00 AM due to the fact that they are sleeping, if they happen to talk in their sleep and say, "order a pizza—I'm starving," this is not likely to be a device command.

Organizations can have formal rules and policies 910, such as meetings cannot last more than an hour without a break, one must take a lunch break between noon and 2:00 PM, and brainstorming sessions occur every morning between 9:00 and 10:00 AM. Similarly, families can have similar rules and policies 913, such as dinner occurs between 6:00 and 7:00 PM. This information can be used to infer social cues such as whether a person is likely to be in conversation with other people. When this is the case, spoken questions are less likely to be device commands. By contrast, when a user is likely to be alone, spoken commands are more likely to be device commands.

Application data 934 can indicate social cues. If a person frequently interacts with word processing applications during the day, the commands "cut", and "paste" are more likely to be device commands that they would for someone who instead plays video games with flying birds. Device settings 916 can indicate social cues as well. If a user sets their electronic device to alarm clock mode, it may be likely that they are sleeping and are not issuing device commands.

Social media 918 in formation can indicate social cues. For example, in one embodiment information relating to multi-modal social cues from an environment about the electronic device can be inferred from retrieving information from a social media server. For example, real time searches, which may be a keyword search, image search, or other search, of social media services can find images, posts, and comments relating to a location determined by the location information 915. Images posted on a social media service server that were taken at the same location may reveal multi-modal social cues. Alternatively, commentary regarding the location may imply social cues. Information from third party servers 917 can be used in this manner as well.

One further example of the context sensors 321 is repetitive behavior information 919. If, for example, a person always stops at a coffee shop between 8:00 and 8:15 AM on their way to work, the command, "Pay for the coffee," is likely to be a device command. As with FIG. 8 above, the physical sensors of FIG. 8 do not constitute a comprehensive list. Context sensors 321 can be any type of device that infers context from data of the electronic device. The context sensors 321 can be configured as either hardware components, or alternatively as combinations of hardware components and software components. The context sensors 321 can analyze information to, for example, not only detect the user, but also to determine the social cues and emotional effect of other people in the vicinity of the electronic device, thereby further informing inferences about the user's intent and what executable control commands are appropriate given this composite social context.

The context sensors 321 can be configured to collect and analyze non-physical parametric data. While some are shown in FIG. 9, numerous others could be added. Accordingly, the context sensors 321 of FIG. 9 are illustrative only, as numerous others will be obvious to those of ordinary skill in the art having the benefit of this disclosure. It should be noted that one or both of the physical sensors (320) or the context sensors 321, when used in combination, can be cascaded in a predefined order to detect a plurality of multi-modal social cues to determine whether the device command is intended for the electronic device.

Turning now back to FIG. 3, in one or more embodiments a heuristic sensor processor 319 can be operable with both the physical sensors 320 and the context sensors 321 to detect, infer, capture, and otherwise determine when multi-modal social cues are occurring in an environment about an electronic device. In one embodiment, the heuristic sensor processor 319 determines, from one or both of the physical sensors 320 or the context sensors 321, assessed contexts and frameworks using adjustable algorithms of context assessment employing information, data, and events. These assessments may be learned through repetitive data analysis. Alternatively, a user may employ the user interface of the electronic device 101 to enter various parameters, constructs, rules, and/or paradigms that instruct or otherwise guide the heuristic sensor processor 319 in detecting multi-modal social cues, emotional states, moods, and other contextual information. The heuristic sensor processor 319 can comprise an artificial neural network or other similar technology in one or more embodiments.

In one or more embodiments, the heuristic sensor processor 319 is operable with the one or more processors 314. In some embodiments, the one or more processors 314 can control the heuristic sensor processor 319. In other embodiments, the heuristic sensor processor 319 can operate independently, delivering information gleaned from detecting multi-modal social cues, emotional states, moods, and other contextual information to the one or more processors 314. The heuristic sensor processor 319 can receive data from one or both of the physical sensors 320 or the context sensors 321. In one or more embodiments, the one or more processors 314 are configured to perform the operations of the heuristic sensor processor 319.

In one or more embodiments, the block diagram schematic 312 includes a voice interface engine 322. The voice interface engine 322 can include hardware, executable code, and speech monitor executable code in one embodiment. The voice interface engine 322 can include, stored in memory 315, basic speech models, trained speech models, or other modules that are used by the voice interface engine 322 to receive and identify voice commands that are received with audio input captured by an audio capture device. In one embodiment, the voice interface engine 322 can include a voice recognition engine. Regardless of the specific implementation utilized in the various embodiments, the voice interface engine 322 can access various speech models to identify speech commands.

In one embodiment, the voice interface engine 322 is configured to implement a voice control feature that allows a user to speak a specific device command to cause the one or more processors 314 to execute a control operation. For example, the user may say, "How tall is the Willis Tower?" This question comprises a device command requesting the one or more processors to retrieve, with the communication device 316, information from a remote server, perhaps across the Internet, to answer the question. Consequently, this device command can cause the one or more processors 314 to access an application module, such as a web browser, to search for the answer and then deliver the answer as audible output via an audio output of the other components 324. In short, in one embodiment the voice interface engine 322 listens for voice commands, processes the commands and, in conjunction with the one or more processors 314, returns an output that is the result of the user's intent.

The block diagram schematic 312 can also include an image/gaze detection-processing engine 323. The image/gaze detection-processing engine 323 can be operable with the physical sensors 320, such as a camera or intelligent imager, to process information to detect a user's gaze point. The image/gaze detection-processing engine 323 can optionally include sensors for detecting the alignment of a user's head in three-dimensional space. Electronic signals can then be delivered from the sensors to the image/gaze detection-processing engine 323 for computing the direction of user's gaze in three-dimensional space. In one or more embodiments, the one or more processors 314 can cause the blade assembly 302 to transition to the peek position when an imager invocation request is received and the image/gaze detection-processing engine 323 determines that ta user is gazing at the front surface of the electronic device 101. The image/gaze detection-processing engine 323 can further be configured to detect a gaze cone corresponding to the detected gaze direction, which is a field of view within which the user may easily see without diverting their eyes or head from the detected gaze direction. This information can also be used to automatically transition the blade assembly 302 relative to the device housing 301. The image/gaze detection-processing engine 323 can be configured to alternately estimate gaze direction by inputting images representing a photograph of a selected area near or around the eyes.

The one or more processors 314 may also generate commands or execute control operations based upon information received from a combination of the physical sensors 320, the context sensors 321, the flexible display 304, the other components 324, and/or the other input devices. Alternatively, the one or more processors 314 can generate commands or execute control operations based upon information received from the one or more sensors or the flexible display 304 alone. Moreover, the one or more processors 314 may process the received information alone or in combination with other data, such as the information stored in the memory 315. As will be explained in more detail below with reference to FIGS. 30-33, this information can be used to automatically transition the blade assembly 302 as a function the type of controller user interface presented on the flexible display 304 of the electronic device 101.

Other components 324 operable with the one or more processors 314 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

As noted above, in one or more embodiments a blade assembly 302 is coupled to the flexible display 304. In contrast to sliding devices that include multiple device housings, the electronic device 101 of FIG. 3 includes a single device housing 301 to which the blade assembly 302 is coupled. The blade assembly 302 is configured as a mechanical chassis that allows the flexible display 304 to translate along a translation surface defined by major and minor surfaces of the single device housing 301. In one or more embodiments, the blade assembly 302 also provides a mechanical support for portions 330 of the flexible display 304 that extend beyond the top edge 331 of the single device housing 301 when the blade assembly 302 and flexible display 304 are in the extended position shown in FIG. 3. When the display roller mechanism 305 actuates, it causes the blade assembly 302 and the flexible display 304 to translate 501 along the rear major surface 303, the bottom minor surface, and the front major surface between the extended position shown in FIG. 4, the retracted position shown in FIG. 5, and the peek position shown in FIG. 7.

The blade assembly 302 can include a blade substrate 325 that includes both flexible portions and rigid portions, and that is positioned between the flexible display 304 and the translation surface defined by the single device housing 301. The blade substrate 325 can also comprise a silicone border 327 that surrounds and protects the edges of the flexible display 304. In one or more embodiments, the blade substrate 325 comprises a steel backer plate with the silicone border 327 co-molded around the perimeter of the steel backer plate. In one or more embodiments, a low-friction dynamic bending laminate stack 328 and blade 326 are positioned between the blade assembly 302 and the translation surfaces defined by the single device housing 301.

In one or more embodiments, the blade substrate 325 is partially rigid and partially flexible. Illustrating by example, portions of the blade substrate 325 that slide along the major surfaces of the single device housing 301 are configured to be substantially rigid, while portions of the blade substrate 325 that pass around the minor surfaces of the single device housing 301 are configured to be flexible so that they can curl around those minor surfaces. In one or more embodiments, some portions of the blade substrate 325 abut the translation surfaces defined by the single device housing 301 while other portions abut the display roller mechanism 305, which is positioned at the bottom minor surface of the single device housing 301 in this illustrative embodiment.

In one or more embodiments, the blade 326 and the low-friction dynamic bending laminate stack 328 are positioned between the blade assembly 302 and the translation surfaces defined by the single device housing 301. The blade 326 supports portions of the blade assembly 302 and flexible display 304 that extend beyond the top edge 331 of the single device housing 301 when the blade assembly 302 is transitioned to the extended position shown in FIG. 3. Since this blade 326 needs to be rigid to support those portions of the blade assembly 302 and the flexible display 304, it is not able to bend around the display roller mechanism 305. To prevent gaps or steps from occurring where the blade 326 terminates, in one or more embodiments a low-friction dynamic bending laminate stack 328 spans the remainder of the blade assembly 302 and abuts the transition surfaces defined by the single device housing 301.

The blade assembly 302 can be fixedly coupled to the flexible display 304 by an adhesive or other coupling mechanisms. Where the blade substrate 332 defines both rigid and flexible portions. The blade substrate 332 can define a first rigid section extending along the major surfaces of the single device housing 301 and a second flexible section extending configured to wrap around the minor surfaces of the single device housing 301 where the display roller mechanism 305 is positioned.

Figure 7:
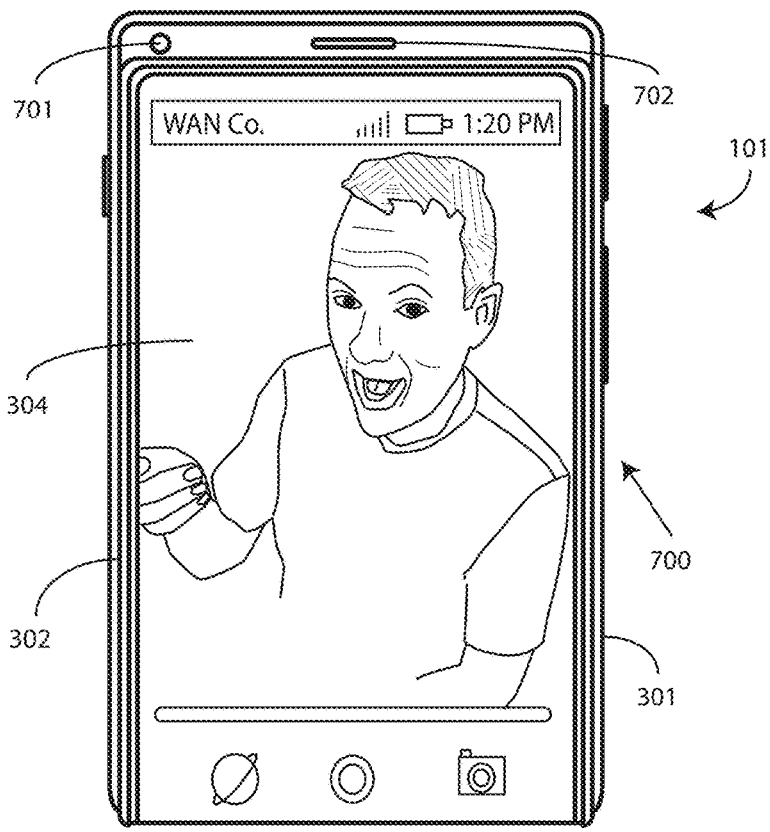
FIG. 7 illustrates the explanatory electronic device of FIG. 4 with the translating display moved to a third sliding position known as the "peek" position that exposes an image capture device positioned under the translating display when the translating display is in the first sliding position or second sliding position.

In one or more embodiments, the blade assembly 302 defines a mechanical assembly providing a slider framework that allows the flexible display 304 to move between the extended position of FIG. 4, the retracted position of FIG. 5, and the peek position of FIG. 7. As used herein, the term "framework" takes the ordinary English definition of a mechanical support structure supporting the other components coupled to the slider framework. These components can include the blade 326, the silicone border 327, and the low-friction dynamic bending laminate stack 328. Other components can be included as well. Illustrating by example, this can include electronic circuits for powering the flexible display 304. In one or more embodiments, it can further include a tensioner that ensures that the flexible display 304 remains flat against the single device housing 301 when translating.

In one or more embodiments, the display roller mechanism 305 that causes a first portion of the blade assembly 302 and the flexible display 304 display (shown on the rear side of the electronic device 101 in FIG. 3) and a second portion of the blade assembly 302 and the flexible display 304 (positioned on the front side of the electronic device 101 in FIG. 3) to slide symmetrically in opposite directions along the translation surfaces defined by the single device housing 301.

Thus, the electronic device 101 of FIG. 3 includes a single device housing 301 with a flexible display 304 incorporated into a blade assembly 302. The blade assembly 302 is then coupled to a translation mechanism defined by the display roller mechanism 305 and situated within the single device housing 301. In the explanatory embodiment of FIG. 3, the display roller mechanism 305 is situated at the bottom edge of the single device housing 301.

In one or more embodiments, the one or more processors 314 cause the blade assembly 302 to transition to the peek position in response to an application operating on the one or more processors 314 invoking an image capture operation and the one or more sensors 320,321 determining that the front-facing imager is oriented toward a user of the electronic device 101.

In one or more embodiments, the electronic device 101 includes a front-facing imager (shown below in FIG. 7) and a rear-facing imager 308. In one or more embodiments, the rear-facing imager 308 is exposed regardless of whether the blade assembly 302 is in the extended position, the retracted position, or the peek position, as shown in FIG. 3. By contrast, the front-facing imager is exposed only when the blade assembly 302 is in the peek position. It is instead concealed when the blade assembly 302 is in the retracted position, the extended position, or positions therebetween, as also shown in FIG. 3.

The one or more sensors 320,321 can determine that the front-facing imager is oriented toward the user in a variety of ways. Illustrating by example, in one or more embodiments the one or more processors 314 cause the rear-facing imager 308 to capture at least one image in response to an application operating on the one or more processors 314 invoking an image capture operation. If that at least one image fails to match a predefined criterion, the one or more processors 314 determine that the front-facing imager is oriented toward the user in one or more embodiments.

The predefined criterion can vary as well. In one or more embodiments, the predefined criterion comprises the at least one image depicting the user looking at the rear-facing imager. In other embodiments, the predefined criterion comprises the at least one depicting a face having a size exceeding a predefined image area threshold. Other predefined criteria will be described below. Still others will be obvious to those of ordinary skill in the art having the benefit of this disclosure.

In other embodiments, the one or more sensors 320,321 determine the front-facing imager is oriented toward the user of the electronic device 101 when the one or more processors 314 cause the rear-facing imager 308 to capture at least one image in response to the application operating on the one or more processors invoking the image capture operation and that at least one image matches a predefined criterion. In one or more embodiments, the predefined criterion comprises the at least one image depicting one or more of a hand, a finger, or an inanimate object. Other predefined criteria will be described below. Still others will be obvious to those of ordinary skill in the art having the benefit of this disclosure.

In other embodiments, as will be described below, translation of the blade assembly 302 can be initiated by the operation of a user interface component 310. Embodiments of the disclosure contemplate that in such an electronic device 101, manual actuation of the user interface component 310 potentially delays the usability of the electronic device 101 in the new state due to the time taken to manually "inject" the trigger causing transition of the blade assembly 302 and flexible display 304 by requiring the actuation of the user interface component 310.

Advantageously, embodiments of the disclosure provide systems and methods that automatically and pre-emptively move the flexible display 304 to the optimal state based upon a selected controller user interface that is to be presented on the flexible display 304 of the electronic device 101, rather than requiring the operation of user interface components 310. Illustrating by example, in one or more embodiments when the communication device 316 is in electronic communication with a content presentation companion device (102), the one or more processors 314 can determine a front-facing area of the flexible display 304 required for a controller user interface used to control content being presented on the content presentation companion device (102) and cause the blade assembly 302 to transition to a position where a front-facing portion of the flexible display 304 spans the front-facing area required for the controller user interface.

Advantageously, embodiments of the disclosure provide intuitive operation of a translating display in an electronic device 101. In cases where automatic translation of the translating display is triggered by the need to present a controller user interface on a front-facing portion of the flexible display 304, no user action is required for the electronic device 101 to take on the most compact form factor that still allows for the presentation of the controller user interface on the front-facing portion of the flexible display 304. The device just automatically changes to the position optimized for the presentation of the controller user interface.

As shown in FIG. 3, the blade assembly 302 is able to slide around the single device housing 301 such that the blade 326 slides away from the single device housing 301 to change the apparent overall length of the flexible display 304 as viewed from the front of the electronic device 101. By contrast, in other states (such as the one shown in FIG. 5) the blade assembly 302 can slide in an opposite direction around the single device housing 301 to a retracted position with similar amounts of the flexible display 304 visible on the front side of the electronic device 101 and the rear side of the electronic device 101.

In FIG. 3, the electronic device 101 includes a single device housing 301 with a blade assembly 302 coupled to two major surfaces of the single device housing 301 and wrapping around at least one minor surface of the electronic device 101 where the display roller mechanism 305 is situated. This allows the blade assembly 302 to slide relative to the single device housing 301 between a retracted position of FIG. 5, the extended position of FIG. 1, and the peek position of FIG. 7 revealing a front-facing image capture device.

A content presentation companion device integration manager 333 is operable to perform content redirection operations. In one or more embodiments, the content presentation companion device integration manager 333 allows the one or more processors 314 of the electronic device 101 to connect to a content presentation companion device such as a larger monitor, television, or other device having a larger screen. The content presentation companion device integration manager 333 then facilitates wireless streaming of content to the larger display of a content presentation companion device.

In one or more embodiments, neither a cable nor a docking station is required for the content presentation companion device integration manager 333 to redirect content to another device. Instead, the content presentation companion device integration manager 333 employs the communication device 316 and the one or more antennas 317 to transmit content to a content presentation companion device.

The inclusion of the content presentation companion device integration manager 333 allows the electronic device 101 to be used as a mouse, trackpad, or other control device while content is being presented on the content presentation companion device. The content presentation companion device integration manager 333 can be used for presenting pictures, videos, television shows, or movies on the larger display of a content presentation companion device. Additionally, the content presentation companion device integration manager 333 can facilitate gaming, video conferences, and other content presentation tasks using the display of a content presentation companion device as well.

It is to be understood that in both FIG. 2 and FIG. 3, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 2 or FIG. 3, or may include a combination of two or more components or a division of a particular component into two or more separate components, and still be within the scope of the present disclosure.

Turning now to FIG. 4, illustrated therein is the electronic device 101 in the extended position 400 that was also shown in FIG. 1. In the extended position 400, the blade (326) slides outward and away from the single device housing 301, thereby revealing more and more portions of the flexible display 304. In such a configuration, the portions of flexible display 304 passing around the display roller mechanism (305) elongated into a flat position as they pass along the translation surface defined by the front of the single device housing 301.

Turning now to FIGS. 5-6, illustrated therein is the electronic device 101 with the flexible display 304 in the retracted position 500. FIG. 3 illustrates the front side of the electronic device 101, while FIG. 6 illustrates the rear side.

In this state, blade (326) slides back toward, and then along, the translation surface defined by the single device housing 301. This causes the apparent overall length of the flexible display 304 to get shorter as more and more portions of the flexible display 304 pass around the display roller mechanism (305) positioned at the bottom of the single device housing 301 and across the translation surface defined by the rear side of the single device housing 301.

Turning now to FIG. 7, illustrated therein is the electronic device 101 with the flexible display in the peek position 700. When in the peek position, the blade assembly 302 and the flexible display 304 translate past the retracted position (500) of FIG. 5. In one or more embodiments, when this occurs, the blade assembly 302 and the flexible display 304 reveal an image capture device 701 or front-facing imager that is situated beneath, and concealed by, the blade assembly 302 and the flexible display 304 when they are in the retracted position (500) of FIG. 5. In this illustrative embodiment, a loudspeaker 702 is also revealed.

Advantageously, by positioning the image capture device 701 beneath the blade assembly 302 and the flexible display 304 when these components are in either the retracted position (500) of FIGS. 5-6, or the extended position (400) of FIG. 4, a user of the electronic device 101 is assured of privacy due to the fact that the image capture device 701 is not able to see through the blade (326) of the blade assembly 302. Accordingly, even if the electronic device 101 is accessed by a hacker or other nefarious actor, the user can be assured that the image capture device 701 cannot capture images or videos while the blade assembly 302 and flexible display 304 are in the retracted position (500), the extended position (400), or in positions therebetween. Only when the blade assembly 302 and the flexible display 304 transition to the peek position 700, thereby revealing the image capture device 701, can the image capture device 701 capture front-facing images or front-facing videos.

Referring collectively to FIGS. 4-7, it can be seen that the electronic device 101 includes a single device housing with a flexible display 304 incorporated into a blade assembly 302. The blade assembly 302 is coupled to a translation mechanism situated within the single device housing 301.

In response to actuation of a user interface device, one example of which is a button positioned on a side of the single device housing 301, or alternatively automatically in response to the hands of a new user being differently sized than were the hands of a previous user as described below with reference to FIGS. 30-33, the translation mechanism is operable to transition the blade assembly 302 around the surfaces of the single device housing 301 between the extended position 400 where the blade (326) of the blade assembly 302 extends distally from the single device housing 301, the retracted position 300 where the blade assembly 302 abuts the single device housing 301 without extending beyond the edge of the device housing 301 and with the flexible display 304 and blade assembly 302 wrapping around the surfaces of the single device housing 301, the peek position 700 where movement of the translation mechanism causes the blade assembly 302 to reveal the image capture device 701 (and loudspeaker 702 in this example) situated beneath the blade assembly 302 on the front side of the single device housing 301, or even positions therebetween.

Another feature that can be seen in reviewing FIGS. 4-7 collectively is the how the presentation of content changes as a function of the position of the blade assembly 302. Embodiments of the disclosure contemplate that the position of the blade assembly 302 and flexible display 304 relative to the single device housing 301 change the amount of the flexible display 304 that is visible from the front, visible from the rear, and visible in the curved end portions. Said differently, the viewable size of the flexible display 304 from each side of the electronic device 101 will vary as a function of the position of the blade assembly 302 relative to the single device housing 301. Advantageously, embodiments of the disclosure provide applications, methods, and systems that dynamically resize and adjust the interface layouts and content presentations.

This can be accomplished by resizing a primary visible portion, e.g., the front-facing portion shown in FIGS. 4, 5, and 7, of the flexible display 304. Applications can be windowed on this primary area of the flexible display 304, which will resize as the flexible display 304 as it transitions between the extended position 400 of FIG. 4, the retracted position 500 of FIGS. 5-6, and the peek position 700 of FIG. 7.

In FIGS. 4-7, the one or more processors (314) of the electronic device 101 segment the flexible display 304 into three, individual, usable parts. These include the front-facing portion of the flexible display 304 shown in FIGS. 4, 5, and 7, the rear-facing portion of the flexible display 304 shown in FIG. 7, and the curvilinear portion of the flexible display 304 situated at the bottom of the electronic device 101 and wrapping around the rotor, shown in FIGS. 2-7. This curvilinear portion of the flexible display 304 is sometimes referred to as the "roll edge" portion of the display.

In one or more embodiments, each of these usable parts are dynamically remapped as the flexible display 304 changes position relative to the single device housing 301. In one or more embodiments, applications can request a window on the usable portion upon which it intends to present content.

In one or more embodiments, the orientation of the rear-facing portion and the roll edge portion is not the same as that of the front-facing portion when the flexible display 304 translates along the single device housing 301 from the extended position 400 shown in FIG. 4 to the retracted position 500 shown in FIGS. 5-6 or the peek position 700 of FIG. 7. To address this, as can be seen by comparing FIGS. 5-6, in one or more embodiments content presented on the rear-facing portion is rotated by 180-degrees so that its "up" side is the same as the "up" side on the front-facing portion.

In one or more embodiments, the orientation of content presented on the roll edge portion can change based upon the orientation of the electronic device 101. If, for example, the front-facing side is up the orientation of content presented on the roll edge will have a first orientation. By contrast, if the rear-facing side is up, the orientation of that same content presented on the roll edge will have a second orientation that is rotated 180-degrees relative to the first orientation.

In one or more embodiments, any content presented on the front-facing portion of the flexible display 304 is oriented in accordance with user preferences. In one or more embodiments, this front-facing portion is oriented in accordance with the orientation of the electronic device 101 in three-dimensional space.

On the roll edge portion of the translating display, in one or more embodiments this segment is oriented in the same orientation as the front-facing portion when the electronic device 101 is not oriented with the front-facing side facing the negative z-direction in three-dimensional space (it is rotated by 180-degrees when this is the case). In one or more embodiments, the roll edge portion does not obey user preferences for display orientation and auto rotate/device orientation.

In one or more embodiments, content presented on the rear-facing portion of the flexible display 304 is always rotated by 180-degrees relative to content presented on the front-facing portion when the electronic device 101 is being held vertically, as is the case, and as can be seen, in FIGS. 5-6. In one or more embodiments, the rear-facing portion does not obey user preferences for display orientation and auto-rotate/device orientation.

Accordingly, in one or more embodiments one or more processors (314) of the electronic device (101) dynamically remap multiple translating display root segments based upon the position of the flexible display 304 relative to the single device housing 301. The one or more processors 314 can independently manage orientation and rotation on each of the root segments of the flexible display 304, be they the front-facing portion, the rear-facing portion, or the roll edge portion. In one or more embodiments, this management occurs independently based upon which side of the electronic device 101 the segment is currently positioned upon, combined with sensor inputs to identify if the electronic device 101 is face down or face up.

As shown in FIG. 4, the blade assembly 302 is operable to slide around the single device housing 301 such that the blade 326 slides away from the single device housing 301 to change an overall length of the flexible display 304 as viewed from the front of the electronic device 101. As shown in FIGS. 5-6, the blade assembly 302 can slide in an opposite direction around the single device housing 301 to a retracted position 300, optionally in response to another swipe gesture, with similar amounts of the flexible display 304 being visible on the front side of the electronic device 101 and the rear side of the electronic device 101.

Accordingly, in one or more embodiments the electronic device 101 includes a single device housing 301 with a blade assembly 302 coupled to two major surfaces of the single device housing 301 and wrapping around at least one minor surface of the electronic device 101 such that the blade assembly 302 can slide relative to the single device housing 301 between the retracted position 500, the extended position 400, and the peek position 700 revealing a front-facing image capture device 701.

Figure 10:
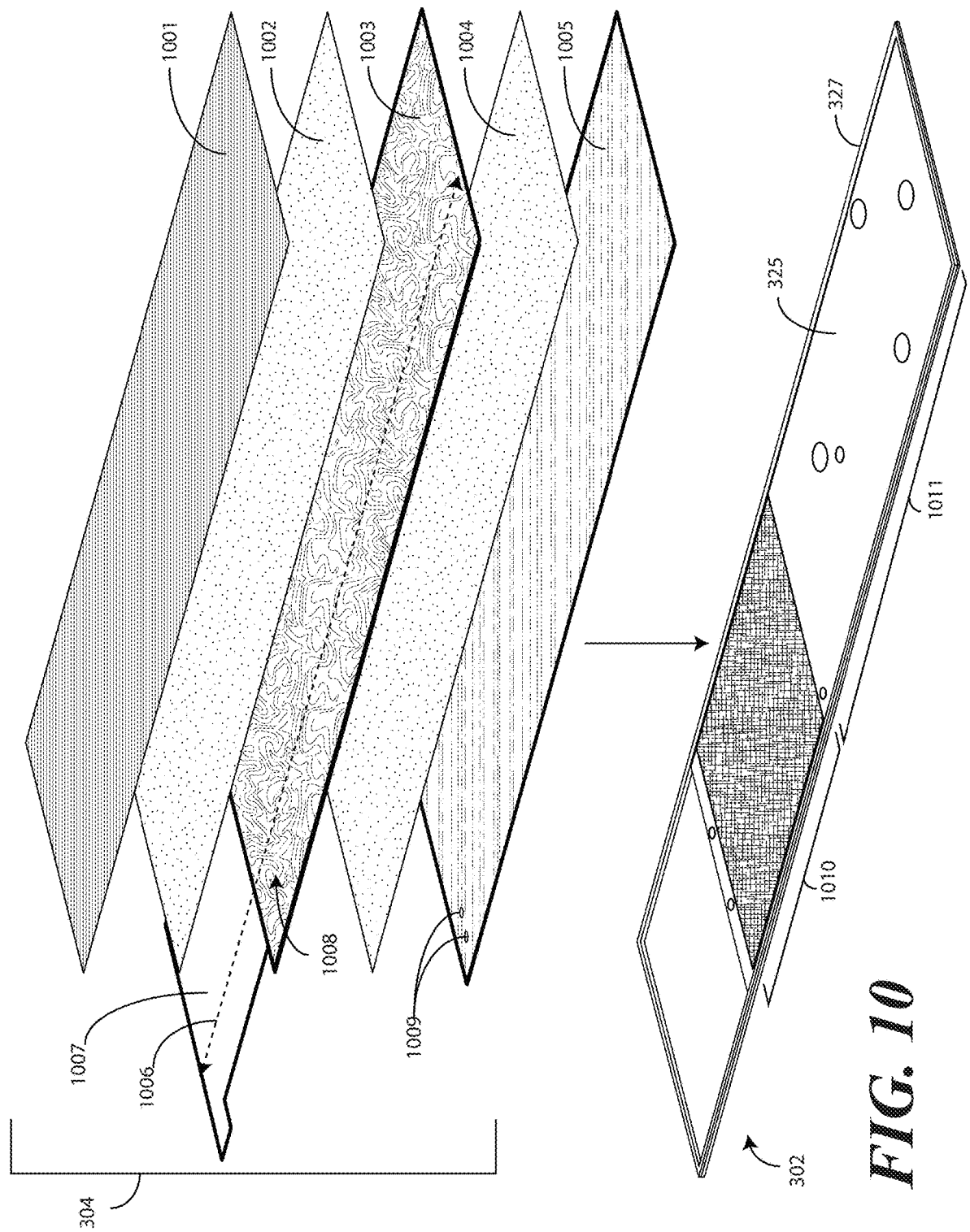
FIG. 10 illustrates portions of one explanatory display assembly in an exploded view in accordance with one or more embodiments of the disclosure.

Turning now to FIG. 10, illustrated therein is the flexible display 304 shown in an exploded view, along with the blade assembly 302. As shown in FIG. 10, in one or more embodiments the flexible display 304 comprises one or more layers that are coupled or laminated together to complete the flexible display 304. In one or more embodiments, these layers comprise a flexible protective cover 1001, a first adhesive layer 1002, a flexible display layer 1003, a second adhesive layer 1004, and a flexible substrate 1005. Other configurations of layers suitable for manufacturing the flexible display 304 will be obvious to those of ordinary skill in the art having the benefit of this disclosure.

Beginning from the top of the layer stack, in one or more embodiments the flexible protective cover 1001 comprises an optically transparent substrate. In one or more embodiments the flexible protective cover 1001 may be manufactured from an optically transparent material such a thin film sheet of a thermoplastic material. Illustrating by example, in one embodiment the flexible protective cover 1001 is manufactured from a layer of optically transparent polyamide having a thickness of about eighty microns. In another embodiment, the flexible protective cover 1001 is manufactured from a layer of optically transparent polycarbonate having a thickness of about eighty microns. Other materials suitable for manufacturing the flexible protective cover 1001 will be obvious to those of ordinary skill in the art having the benefit of this disclosure.

In one or more embodiments the flexible protective cover 1001 functions as a fascia by defining a cover for the flexible display layer 1003. In one or more embodiments the flexible protective cover 1001 is optically transparent, in that light can pass through the flexible protective cover 1001 so that objects behind the flexible protective cover 1001 can be distinctly seen. The flexible protective cover 1001 may optionally include an ultra-violet barrier. Such a barrier can be useful in improving the visibility of flexible display layer 1003 in one or more embodiments.

Beneath the flexible protective cover 1001 is a first adhesive layer 1002. In one or more embodiments, the first adhesive layer 1002 comprises an optically transparent adhesive. The optically transparent adhesive can be applied to two sides of a thin, optically transparent substrate such that the first adhesive layer 1002 functions as an optically transparent layer having optically transparent adhesive on both sides. Where so configured, in one or more embodiments the first adhesive layer 1002 has a thickness of about fifty microns. This optically transparent version of "double-sided tape" can then be spooled and applied between the flexible protective cover 1001 and the flexible display layer 1003 to couple the two together.

In other embodiments the first adhesive layer 1002 will instead be applied between the flexible protective cover 1001 and the flexible display layer 1003 as an optically transparent liquid, gel, as a homogeneous adhesive layer, or in the form of another medium. Where so configured, the first adhesive layer 1002 can optionally be cured by heat, ultraviolet light, or other techniques. Other examples of materials suitable for use as the first adhesive layer 1002 will be obvious to those of ordinary skill in the art having the benefit of this disclosure. In one or more embodiments, the first adhesive layer 1002 mechanically couples the flexible display layer 1003 to the flexible protective cover 1001.

In one or more embodiments, the flexible display layer 1003 is situated between the flexible substrate 1005 and the flexible protective cover 1001. In one or more embodiments, the flexible display layer 003 is longer along a major axis 1006 of the flexible display layer 1003, and thus the flexible display 304 itself, than is the image producing portion 1008 of the flexible display 304. For instance, as shown in FIG. 10 the flexible display layer 1003 includes a T-shaped tongue 1007 that extends beyond the image producing portion 1008 of the flexible display layer 003.

As will be shown in FIG. 12 below, in one or more embodiments electronic circuit components configured to operate the image producing portion 1008 of the flexible display layer 1003, connectors, and other components can be coupled to this T-shaped tongue 1007 in one or more embodiments. Thus, in this illustrative embodiment the T-shaped tongue 1007 extends distally beyond terminal ends of the other layers of the flexible display 304. While the T-shaped tongue 1007 is T-shaped in this illustrative embodiment, it can take other shapes as well as will be obvious to those of ordinary skill in the art having the benefit of this disclosure.

The flexible display layer 1003 can optionally be touch-sensitive. In one or more embodiments, the flexible display layer 1003 is configured as an organic light emitting diode (OLED) display layer. When coupled to the flexible substrate 1005, the flexible display layer 1003 can bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 1003 may be formed from multiple layers of flexible material such as flexible sheets of polymer or other materials. Illustrating by example, the flexible display layer 1003 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 1003 has a thickness of about 130 microns.

In one or more embodiments, to be touch sensitive the flexible display layer 1003 includes a layer including one or more optically transparent electrodes. In one or more embodiments, the flexible display layer 1003 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 1003. Other layers suitable for inclusion with the flexible display layer 1003 will be obvious to those of ordinary skill in the art having the benefit of this disclosure.

In one or more embodiments, the flexible display layer 1003 is coupled to a flexible substrate 1005 by a second adhesive layer 1004. In other embodiments, a layer above the flexible display layer 1003 can be configured with enough stiffness to make the flexible substrate 1005 unnecessary. For example, in an embodiment where the flexible protective cover 1001 is configured with enough stiffness to provide sufficient protection for the flexible display 304 during bending, the flexible substrate 1005 may be omitted.

In one or more embodiments, the flexible substrate 1005 comprises a thin layer of steel. Illustrating by example, in one or more embodiments the flexible substrate 1005 comprises a steel layer with a thickness of about thirty microns. While thin, flexible steel works well in practice, it will be obvious to those of ordinary skill in the art having the benefit of this disclosure that other materials can be used for the flexible substrate 1005 as well. For instance, in another embodiment the flexible substrate 1005 is manufactured from a thin layer of thermoplastic material.

In one or more embodiments, to simplify manufacture, the second adhesive layer 1004 is identical to the first adhesive layer 1002 and comprises an optically transparent adhesive. However, since the second adhesive layer 1004 is coupled between the flexible display layer 1003 and the flexible substrate 1005, i.e., under the flexible display layer 1003, an optically transparent adhesive is not a requirement. The second adhesive layer 1004 could be partially optically transparent or not optically transparent at all in other embodiments.

Regardless of whether the second adhesive layer 1004 is optically transparent, in one or more embodiments the adhesive of the second adhesive layer 1004 is applied to two sides of a thin, flexible substrate. Where so configured, in one or more embodiments the second adhesive layer 1004 has a thickness of about fifty microns. This extremely thin version of "double-sided tape" can then be spooled and applied between the flexible display layer 1003 and the flexible substrate 1005 to couple the two together.

In other embodiments, as with the first adhesive layer 1002, the second adhesive layer 1004 will instead be applied between the flexible display layer 1003 and the flexible substrate as a liquid, gel, as a homogeneous layer, or in the form of another medium. Where so configured, the second adhesive layer 1004 can optionally be cured by heat, ultraviolet light, or other techniques. Other examples of materials suitable for use as the second adhesive layer 1004 will be obvious to those of ordinary skill in the art having the benefit of this disclosure.

In this illustrative embodiment, the flexible display 304 is supported by not only the flexible substrate 1005, but by the blade assembly 302 as well. As previously described, in one or more embodiments the blade assembly 302 includes a blade substrate 325. In one or more embodiments, the blade substrate 325 comprises a layer of steel. In one or more embodiments, the blade substrate 325 is thicker than the flexible substrate 1005. Illustrating by example, in one or more embodiments when the flexible substrate 1005 comprises a steel layer with a thickness of about thirty microns, the blade substrate 325 comprises a layer of steel having a thickness of about one hundred microns.

In one or more embodiments, the blade substrate 325 comprises a rigid, substantially planar support layer. Illustrating by example, the blade substrate 325 can be manufactured from stainless steel in one or more embodiments. In another embodiment, the blade substrate 325 is manufactured from a thin, rigid thermoplastic sheet. Other materials can be used in manufacturing the blade substrate 325 as well. For example, the material nitinol, which is a nickel-titanium alloy, can be used to manufacture the blade substrate 325. Other rigid, substantially planar materials will be obvious to those of ordinary skill in the art having the benefit of this disclosure.

Accordingly, the blade substrate 325 defines another mechanical support for the flexible display 304. In one or more embodiments, the blade substrate 325 is the stiffest layer of the overall assembly of FIG. 10. In one or more embodiments the blade substrate 325 is manufactured from stainless steel with a thickness of about one hundred microns. In another embodiment, the blade substrate 325 is manufactured from a flexible plastic. Other materials from which the blade substrate 325 can be manufactured will be obvious to those of ordinary skill in the art having the benefit of this disclosure. For instance, in another embodiment the blade substrate 325 is manufactured from carbon fiber, and so forth. In one or more embodiments, the blade substrate 325 includes a reinforcing border comprising a thicker layer of material to further protect the flexible display 304 when the blade assembly 302 is in the extended position (400).

In one or more embodiments, the flexible substrate 1005 is slightly longer along a major axis of the flexible substrate 1005 than is the image producing portion 1008 of the flexible display 304. Since the T-shaped tongue 1007 is T-shaped, this allows one or more apertures 1009 to be exposed on either side of the base of the T of the T-shaped tongue 1007. In one or more embodiments, this extra length along the major axis provided by the flexible substrate 1005 allows one or more fasteners to rigidly couple the first end of the flexible substrate 1005 to a tensioner.

Embodiments of the disclosure contemplate that some of the layers comprising the flexible display 304 are stiffer than others. Similarly, other layers of the flexible display 304 are softer than others. For example, where the flexible substrate 1005 is manufactured from a metal, one example of which is stainless steel, this layer is stiffer than either the first adhesive layer 1002 or the second adhesive layer 1004. In one or more embodiments, the stainless steel is stiffer than the flexible display layer 1003 as well. In one or more embodiments, the flexible substrate 1005 is the stiffest layer in the flexible display 304 while the first adhesive layer and the second adhesive layer 1004 are the softest layers of the flexible display 304. The flexible protective cover 1001 and the flexible display layer 1003 have a stiffness that falls between that of the flexible substrate 1005 and the adhesive layers in one or more embodiments.

In one or more embodiments, the various layers of the flexible display 304 are laminated together in a substantially planar configuration. Said differently, in one or more embodiments the flexible substrate 1005 is configured as a substantially planar substrate. The second adhesive layer 1004 can be attached to this substantially planar substrate, with the flexible display layer 1003 then attached to the second adhesive layer 1004. The first adhesive layer 1002 can be attached to the flexible display layer 1003, with the flexible protective cover 1001 attached to the first adhesive layer 1002.

To ensure proper coupling, the resulting flexible display layer 1003 can be cured, such as in an autoclave at a predefined temperature for a predefined duration. Where employed, such curing allows any air bubbles or other imperfections in the various layers to be corrected. In one or more embodiments, since the flexible substrate 1005 is configured as a substantially planar substrate, the resulting flexible display 304 is substantially planar as well.

In one or more embodiments, the blade substrate 325 of the blade assembly 302 includes both a flexible portion 1010 and a rigid portion 1011. Since the blade substrate 325 is manufactured from a metal in one or more embodiments, one example of which is steel having a thickness of one hundred microns, the rigid portion 1011 gets its rigidity from the material from which it is manufactured. If, for example, the blade substrate 325 were manufactured from a thermoplastic material, in one or more embodiments this thermoplastic material would have enough rigidity that the rigid portion 1011 would be rigid. Since the rigid portion 1011 only slides along flat major surfaces of the translation surfaces defined by the single device housing (301), it does not need to bend. Moreover, rigidity helps to protect portions of the flexible display 304 that extend beyond ends of the single device housing (301).

By contrast, the flexible portion 1010 need to wrap around minor faces of the single device housing (301) where the display roller mechanism (305) is situated. Since the flexible portion 1010 is manufactured from the same material as the rigid portion 1011 when the blade substrate 325 is manufactured as a single unitary part, in one or more embodiments it includes a plurality of apertures cut through the blade substrate 325 allowing the material to bend. Illustrating by example, in one or more embodiments where the blade substrate 325 is manufactured from steel, a plurality of chemically or laser etched apertures can allow the flexible portion 1010 to tightly wrap around minor faces of the single device housing (301) where the display roller mechanism (305) is situated.

Thus, in one or more embodiments the blade substrate 325 is partially rigid and partially flexible. Portions of the blade substrate 325 that slide along the major surfaces of the single device housing (301) are configured to be substantially rigid, while portions of the blade substrate 325 that pass around the minor surfaces of the single device housing (301) are configured to be flexible so that they can curl around those minor surfaces.

In one or more embodiments, the blade assembly 302 also includes a silicone border 327 positioned around a perimeter of the blade substrate 325. In one or more embodiments, the silicone border 327 surrounds and protects the edges of the flexible display 304 when the flexible display 304 is attached to the blade substrate 325 of the blade assembly 302. In one or more embodiments, the silicone border 327 is co-molded around the perimeter of the blade substrate 325.

In one or more embodiments, the rigid portion 1011 of the blade substrate 325 can define one or more apertures. These apertures can be used for a variety of purposes. Illustrating by example, some of the apertures can be used to rigidly fasten the blade assembly 302 to a translation mechanism, one example of which was the display roller mechanism (305) of FIG. 3. Additionally, some of the apertures can contain magnets. Hall-effect sensors positioned in the single device housing (301) to which the blade assembly 302 is coupled can then detect the positions of these magnets such that the one or more processors (314) can determine whether the blade assembly 302 and flexible display 304 are in the extended position (400), the retracted position (500), the peek position (700), or somewhere in between.

In one or more embodiments, the flexible display 304 coupled to the blade substrate 325 of the blade assembly 302 within the confines of the silicone border 327. Illustrating by example, in one or more embodiments a first end of the flexible display 304 is adhesively coupled to the rigid portion 1011 of the blade substrate 325 of the blade assembly 302. The other end of the flexible display 304 can then be rigidly coupled to a tensioner by passing fasteners through the apertures 1009 of the flexible substrate.

Figure 11:
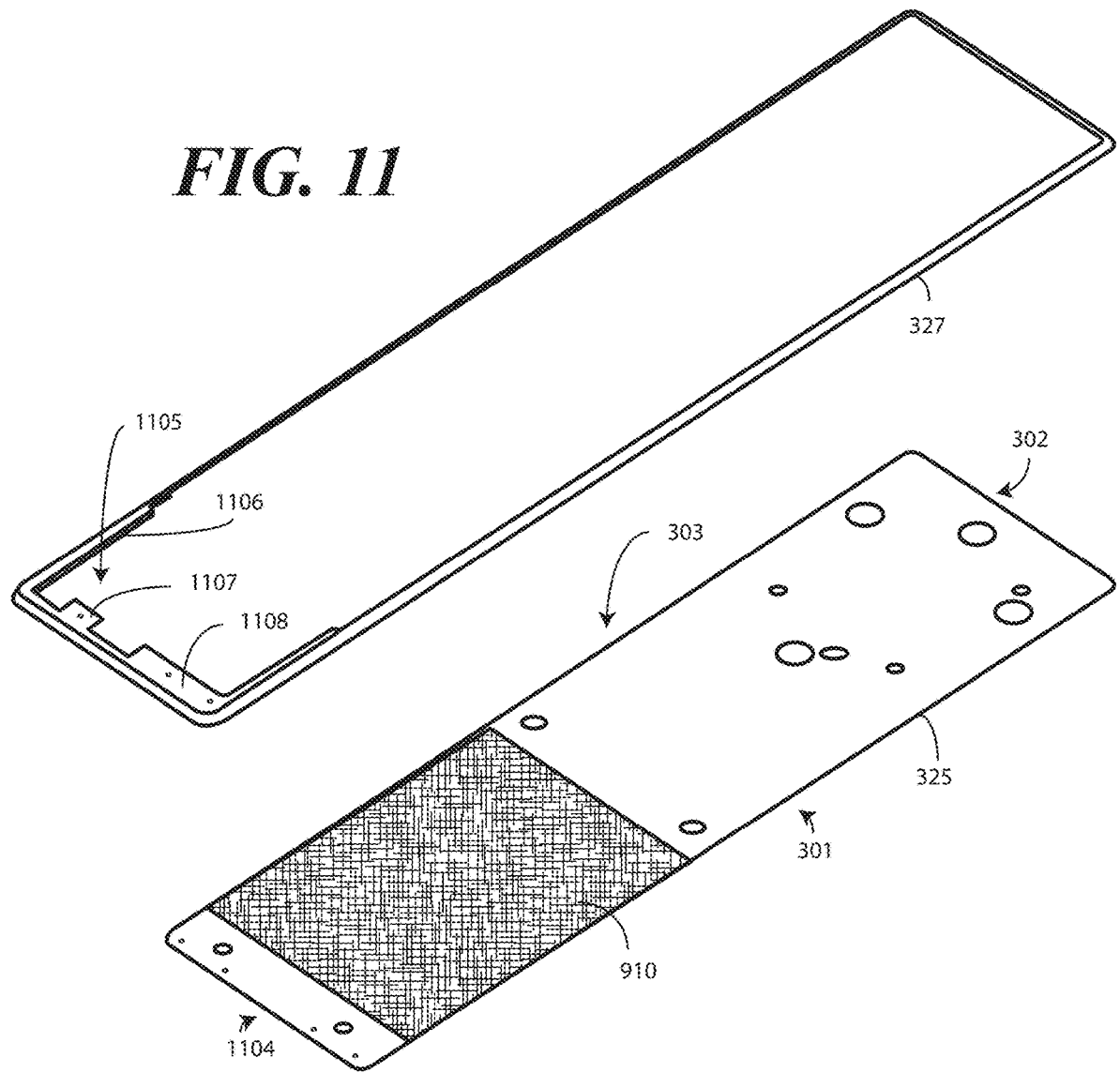
FIG. 11 illustrates portions of one explanatory display assembly in an exploded view in accordance with one or more embodiments of the disclosure.

Turning now to FIG. 11, illustrated therein is the blade substrate 325 and silicone border 327 shown in an exploded view. A shown, the silicone border 327 defines a singular, contiguous, unitary piece of silicone. In the illustrative embodiment of FIG. 11, the silicone border 327 surrounds three sides 1101, 1102, 1103 of the blade substrate 325, and extends beyond minor side 1104 to define a receiving recess 1105 that can accommodate mechanical and electrical components such as electronic circuit components to power and control the flexible display (304) that will situate within the perimeter defined by the silicone border 327, a tensioner to keep the flexible display (304) flat across the flexible portion 910 of the blade substrate 325, flexible circuits, and other components.

In this illustrative embodiment, the portions 1106,1107, 1108 of the silicone border 327 extending beyond the minor side 1104 of the blade substrate 325 surrounding the receiving recess 1105 are thicker than are the other portions of the silicone border 327 that will surround the flexible display (304). This allows for components to be placed within the receiving recess 1105.

Figure 12:
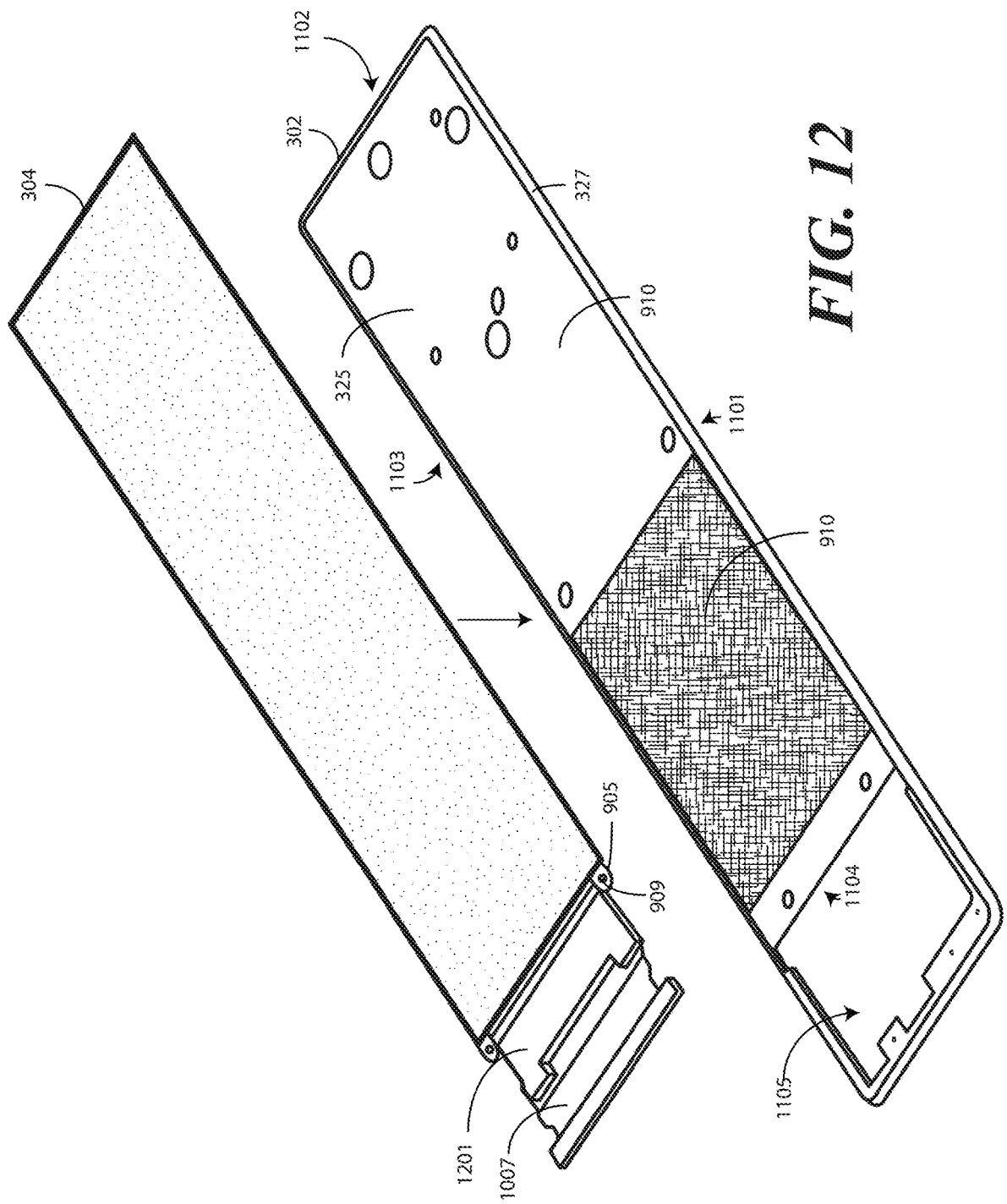
FIG. 12 illustrates one explanatory display assembly in an exploded view in accordance with one or more embodiments of the disclosure.

Turning now to FIG. 12, illustrated therein is the flexible display 304 and the blade assembly 302 with the silicone border 327 over-molded on the blade substrate 325. As shown, the silicone border 327 surrounds three sides 1101, 1102,1103 of the blade substrate 325 and extends beyond minor side 1104 to define a receiving recess 1105 that can accommodate mechanical and electrical components.

Electronic circuits 1201 operable to power and control the flexible display 304 have been coupled to the T-shaped tongue 1007 of the flexible display layer (1003). Additionally, a mechanical connector 1202 has been connected to the top of the T on the T-shaped tongue 1007. In this illustrative embodiment, the flexible substrate 1005 extends beyond a distal end of the flexible display layer (1003) so that the apertures 1009 defined therein can be coupled to a tensioner to ensure that the flexible display 304 stays flat around the flexible portion 1010 of the blade substrate 325 when the flexible portion 1010 of the blade substrate 325 passes around a rotor positioned at the end of a single device housing (301).

The blade assembly 302 can be fixedly coupled to the flexible display 304 in one or more embodiments. Illustrating by example, where the blade substrate 325 defines both a rigid portion 1011 and a flexible portion 1010, in one or more embodiments the flexible display 304 is coupled to the rigid portion 1011 by an adhesive or other coupling mechanism. A tensioner can then be positioned in the receiving recess 1105. In one or more embodiments, the tensioner rigidly couples with fasteners to the apertures 1009 of the flexible substrate 1005 to keep the flexible display 304 flat across the flexible portion 1010, regardless of how the flexible portion 1010 is being bent around the minor surface of a single device housing or its corresponding rotor.

Figure 13:
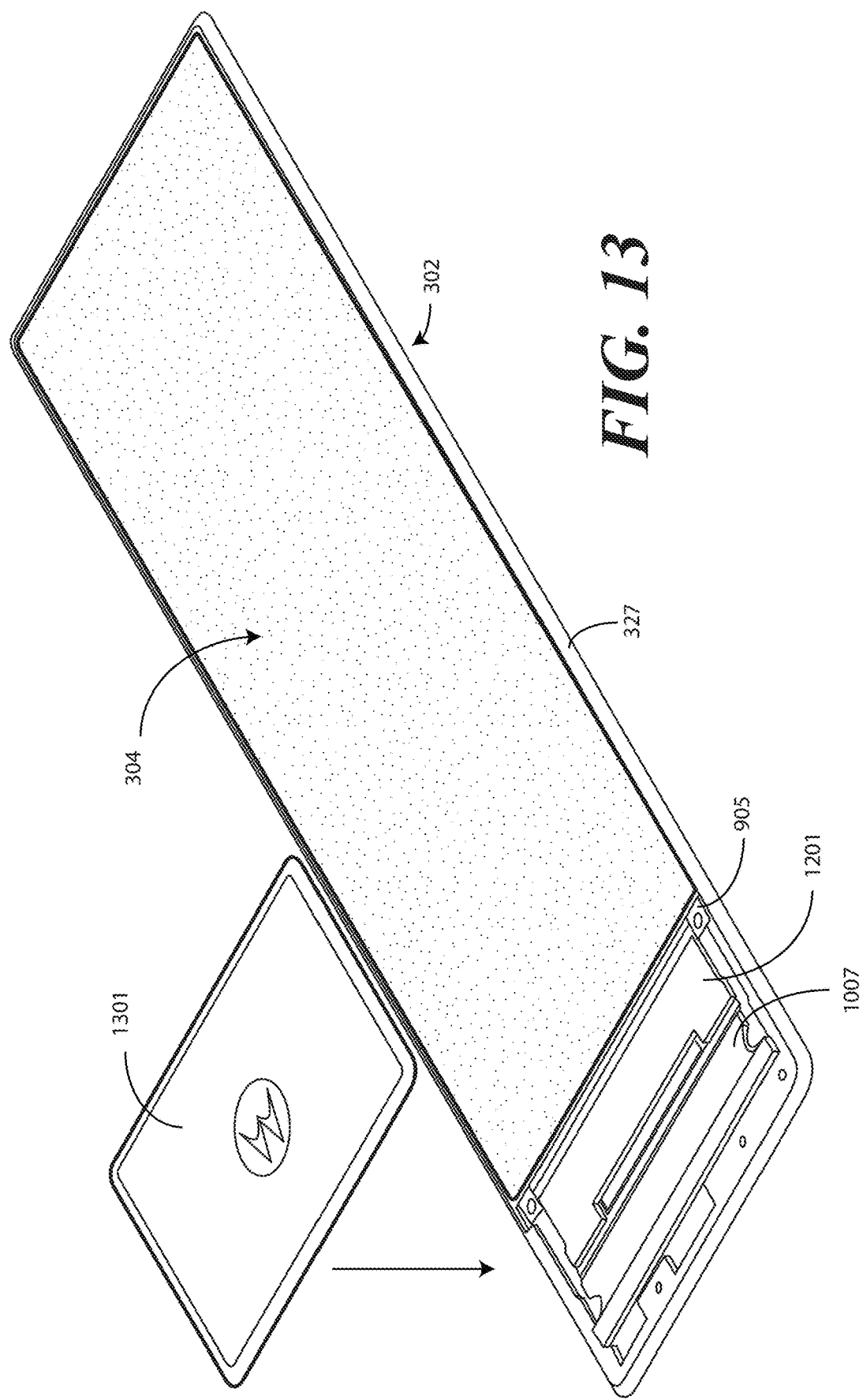
FIG. 13 illustrates explanatory display components in accordance with one or more embodiments of the disclosure.

Turning now to FIG. 13, illustrated therein is the flexible display 304 after being coupled to the blade assembly 302. As shown, the silicone border 327 surrounds the flexible display 304, with the silicone border 327 surrounding and abutting three sides of the flexible display layer.

Figure 14:
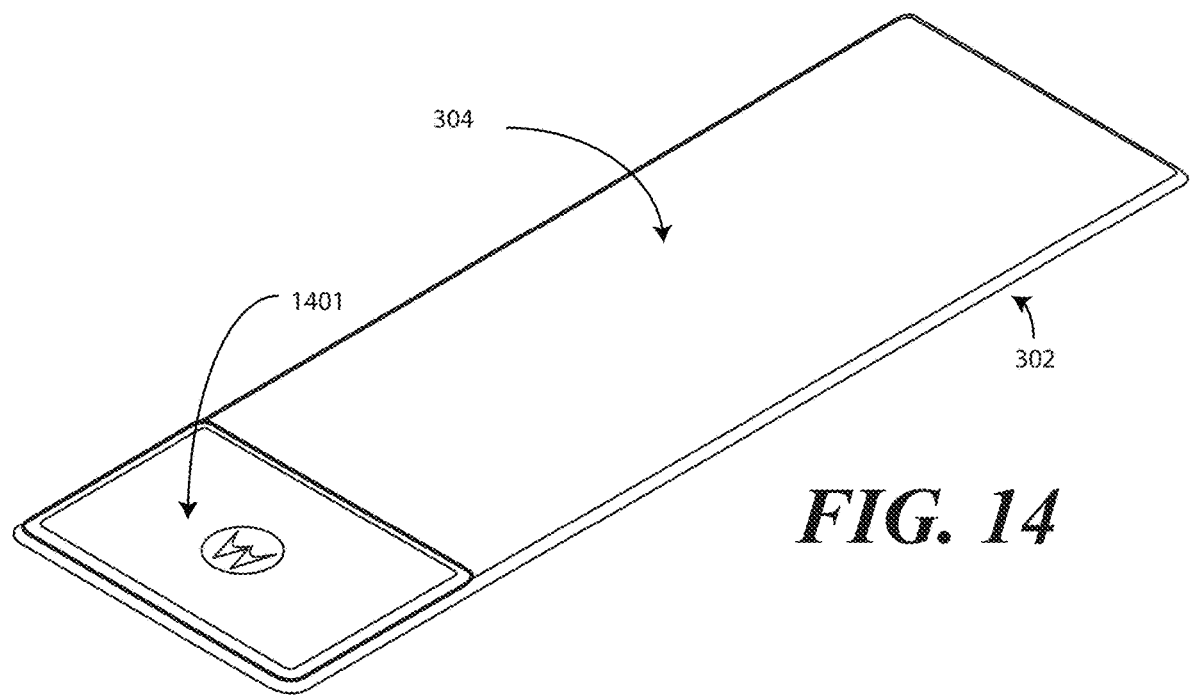
FIG. 14 illustrates one explanatory display assembly in an undeformed state.

A flexible substrate is then connected to the electronic circuits 1201 carried by the T-shaped tongue 1007. Additionally, a tensioner can be coupled to the flexible substrate. Thereafter, a cover 1301 is attached to the silicone border 327 atop the electronic circuits 1201 and other components situated on or around the T-shaped tongue. This portion the blade assembly 302 where the components are stored beneath the cover 1301 is affectionately known as the "backpack." Turning to FIG. 14, illustrated therein is the blade assembly 302 with its backpack 1401 completely configured.

In one or more embodiments, the flexible display 304 and blade assembly 302 are configured to wrap around a minor surface of a device housing where a display roller mechanism is situated. In one or more embodiments, the display roller mechanism includes a rotor that is positioned within a curvilinear section of the flexible display 304 and blade assembly 302. When placed within a device housing of an electronic device, translation of a translation mechanism causes translation of the blade assembly 302, which in turn causes rotation of the rotor. The result is a linear translation of the flexible display 304 and blade assembly 302 across a translation surface of the device housing by drawing the flexible display 304 and the blade assembly 302 around the rotor.

Figure 15:
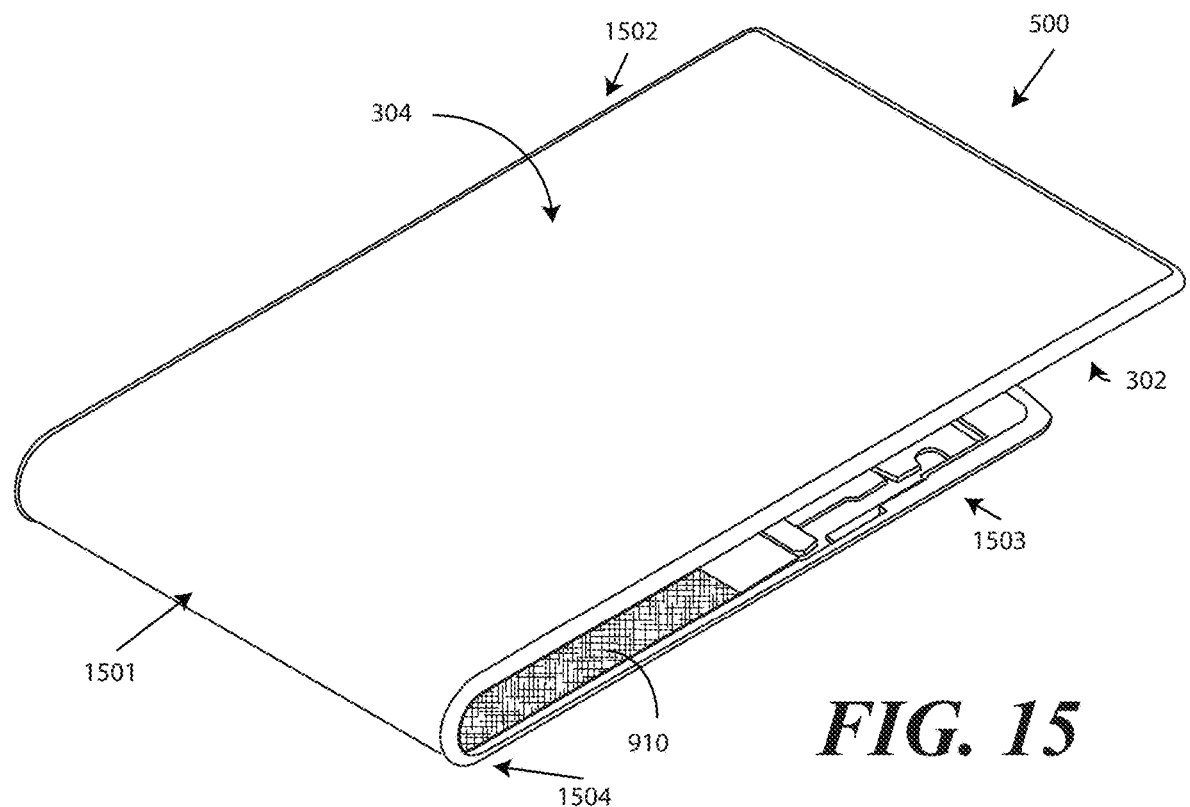
FIG. 15 illustrates the explanatory display assembly of FIG. 14 in a deformed state.
Figure 16:
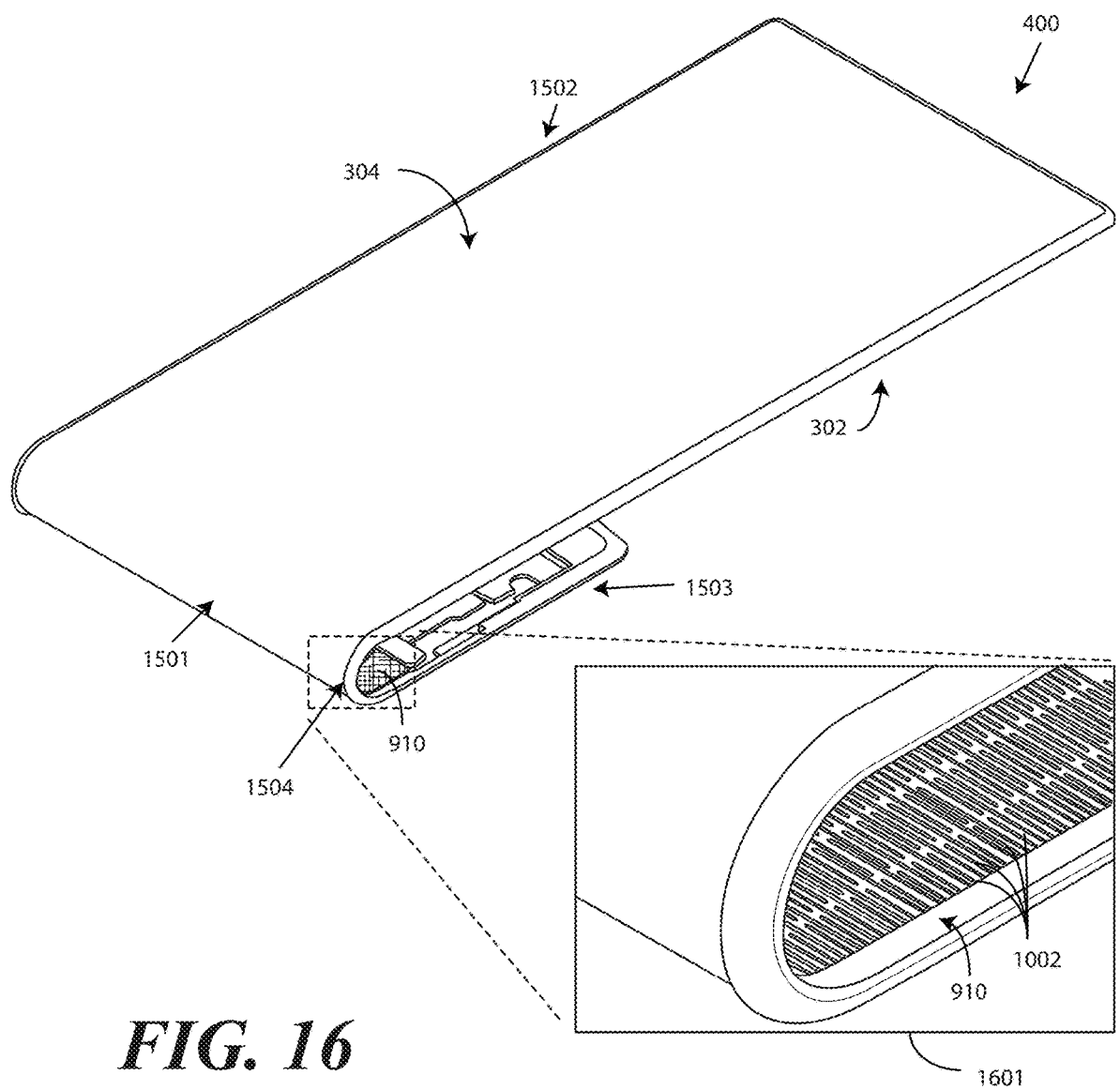
FIG. 16 illustrates the explanatory display assembly of FIG. 14 in another deformed state with an exploded view of a deformable portion of the display assembly shown in a magnified view.

That the blade substrate (325) of the blade assembly 302 includes a flexible portion (1010) allows the blade assembly 302 and flexible display 304 to deform around a device housing, one example of which is the single device housing (301) of FIG. 3. Illustrating by example, turning now to FIGS. 15-16, illustrated therein is the blade assembly 302 and flexible display deformed to create a curvilinear section 1501 and two linear sections 1502,1503. The flexible display 304 and blade assembly 302 are shown as they would be in the retracted position 300 in FIG. 15. The flexible display 304 and the blade assembly 302 are shown as they would be in the extended position 400 in FIG. 16. The enlarged view 1601 of FIG. 16 shows how the apertures defined by the chemical etching of the blade substrate 325 easily allow the blade substrate 325 to bend around the curvilinear section 1501 while maintaining a rigid support structure beneath the flexible display 304 in the two linear sections 1502, 1503.

In one or more embodiments, the first linear section 1502 and the second linear section 1503 are configured to slide between the retracted position 300 of FIG. 15 and the extended position 400 of FIG. 16. The flexible display 304 is coupled to the blade assembly 302 and therefore translates with the blade assembly 302 along a translation surface defined by a device housing of an electronic device.

In one or more embodiments, the linear sections 1502, 1503 of the blade assembly 302 are positioned between the flexible display 304 and the translation surface. A rotor is then positioned within a curvilinear section 1501 of the blade assembly 302. When a translation mechanism causes the linear sections 1502, 1503 of the blade assembly 302 to move across the translation surface defined by the device housing, the rotor rotates with the flexible portion 1010 passing along the rotor while the rotor rotates.

As shown in FIGS. 15-16, in one or more embodiments a cross section of both the blade assembly 302 and the flexible display 304 defines a J-shape with a curved portion of the J-shape, defined by the curvilinear section 1501, configured to wrap around a rotor and an upper portion of the J-shape, defined by linear section 1502, passing across a translation surface defined by a device housing. When the translators of a translation mechanism drive the blade assembly 302, the upper portion of the J-shape becomes longer as the flexible display 304 translates around the rotor with the blade assembly 302 extending further from of the device housing. This can be seen in FIGS. 15-16 by comparing the extended position 400 of FIG. 16 to the retracted position 300 of FIG. 15.

When the translators of the translation mechanism drive the blade assembly 302 in the opposite direction, e.g., driving the blade assembly 302 from the extended position 400 of FIG. 16 to the retracted position 500 of FIG. 15, the upper portion of the J-shape becomes shorter as the reverse operation occurs. Thus, when the translation mechanism drives the blade assembly 302 carrying the flexible display 304, the flexible display 304 deforms at different locations as it wraps and passes around the rotor.

It should be understood that a more traditional "J-shape" is principally defined when the blade assembly 302 is transitioned to the extended position 400 of FIG. 16. Depending upon the length of the blade assembly 302 and flexible display 304, combined with the amount the translation mechanism can cause the blade assembly 302 to slide around the rotor, the J-shape may transition to other shapes as well, including a U-shape where the upper and lower portions of the blade assembly 302 and/or flexible display 304 are substantially symmetrical. Such a U-shape forms when the blade assembly is in the peek position but is substantially formed in the retracted position 500 of FIG. 5. In other embodiments, depending upon construction, the blade assembly 302 may even transition to an inverted J-shape where the upper portion of the blade assembly 302 and/or flexible display 304 is shorter than the lower portion of the blade assembly 302 and/or flexible display 304, and so forth.

In one or more embodiments, the translators and rotor of the translation mechanism not only facilitate the "extension" of the flexible display 304 that occurs during an extending or "rising" operation, but also works to improve the reliability and usability of the flexible display 304 as well. This is true because the rotor defines a service loop 1504 in the curvilinear section 1501 with a relatively large radius compared to the minimum bending radius of the flexible display 304. The service loop 1504 prevents the flexible display 304 from being damaged or developing memory in the curved state occurring as the flexible display 304 defines the curvilinear section 1501 wrapping around the rotor in the extended position 400, retracted position 500, and peek position (700).

Using such a mechanical assembly, the flexible display 304 maintains a flat upper portion of the J-shape defined by the first linear section 1502 when sliding. Additionally, the flexible display 304 wraps tightly around the rotor with the lower portion of the J-shape defined by the second linear section 1503 remaining flat against the lower surface of a device housing as well. The blade assembly 302 and tensioner combination, which are rigidly affixed to the translation mechanism, precludes the flexible display 304 from crumpling or bunching when sliding around the device housing between the extended position 400, the retracted position 500, and the peek position (700). This rigid coupling combined with moving tensioner ensures a straight and true translation of the flexible display 304 across a first major surface of an electronic device, around the rotor of the electronic device positioned at a minor surface of the device housing, and across a second major surface of the electronic device.

In one or more embodiments additional support components can be attached to the blade assembly 302 to one or more of provide additional support for the flexible display 304, ease translation of the blade assembly 302 around a device housing, or combinations thereof.

As noted above, in one or more embodiments a blade assembly 302 is coupled to the flexible display 304. In contrast to sliding devices that include multiple device housings, embodiments of the disclosure provide an electronic device with a sliding display that includes only on device housing. The blade assembly 302 is configured as a mechanical chassis that allows the flexible display 304 to translate along a translation surface defined by major and minor surfaces of the single device housing.

In one or more embodiments, the blade assembly 302 also provides a mechanical support for portions of the flexible display 304 that extend beyond the top edge of the single device housing when the blade assembly 302 and flexible display 304 are in the extended position. The blade assembly 302 can include a blade substrate (325) that is unitary, but that defines both flexible portions and rigid portions. The blade substrate (325) can comprise the silicone border 327 that surrounds and protects the edges of the flexible display 304.

A low-friction dynamic bending laminate stack (328) and blade (326) can be positioned between the blade assembly 302 and the translation surfaces defined by the single device housing (301). In one or more embodiments, the blade (326) and the low-friction dynamic bending laminate stack (328) are positioned between the blade assembly 302 and the translation surfaces defined a device housing to which the blade assembly 302 is attached. The blade (326) supports portions of the blade assembly 302 and flexible display 304 that extend beyond the top edge of the device housing when the blade assembly 302 is transitioned to the extended position. Since this blade (326) needs to be rigid to support those portions of the blade assembly 302 and the flexible display 304, it is not able to bend around the flexible portions of the blade substrate (325) of the blade assembly 302. To prevent gaps or steps from occurring where the blade (326) terminates, in one or more embodiments a low-friction dynamic bending laminate stack (328) spans the remainder of the blade assembly 302 and abuts the transition surfaces defined by the single device housing.

In one or more embodiments, the blade (326) comprises a layer of steel. In one or more embodiments, the blade (326) has a thickness that is greater than the thickness of either the blade substrate (325) of the blade assembly 302 or the flexible substrate (1005) of the flexible display 304. Illustrating by example, in one or more embodiments the blade (326) comprises a layer of steel having a thickness of five hundred microns or 0.5 mils.

In one or more embodiments, the blade (326) comprises a rigid, substantially planar support layer. Illustrating by example, the blade (326) can be manufactured from aluminum, steel, or stainless steel in one or more embodiments. In another embodiment, the blade (326) is manufactured from a rigid thermoplastic sheet. Other materials can be used in manufacturing the blade substrate (325) as well. For example, nitinol can be used to manufacture the blade (326) as well.

In one or more embodiments, the blade (326) is the stiffest layer of the overall assembly. In one or more embodiments the blade (326) is manufactured from stainless steel with a thickness of about five hundred microns. In another embodiment, the blade (326) is manufactured from carbon fiber. Other materials from which the blade (326) can be manufactured will be obvious to those of ordinary skill in the art having the benefit of this disclosure.

In one or more embodiments, the low-friction dynamic bending laminate stack (328) comprises a plurality of layers. When assembled, the low-friction dynamic bending laminate stack (328) adds a layer to the blade assembly 302 that improves the lubricity of the overall assembly to allow for smooth motion of the blade assembly 302 and flexible display 304 across the translation surfaces of a device housing. Moreover, when abutting a blade (326), the low-friction dynamic bending laminate stack (328) prevents features on other layers of the assembly from degrading the ability of the blade assembly 302 and flexible display 304 to translate across those translation surfaces.

In one or more embodiments, the low-friction dynamic bending laminate stack (328) allows for "low-friction" sliding across a stationary surface combined with the ability to cyclically bend and/or roll around a rotor. In one or more embodiments, the low-friction dynamic bending laminate stack (328) interfaces and abuts the blade (326) to improve lubricity.

In one or more embodiments, the uppermost layer of the low-friction dynamic bending laminate stack (328) is a pressure sensitive adhesive layer. This pressure sensitive adhesive layer allows the low-friction dynamic bending laminate stack (328) to adhere to the underside of the blade assembly 302.

Beneath this pressure sensitive adhesive layer is a strain tolerant foam layer in one or more embodiments. Examples of strain tolerant foams suitable for use as the strain tolerant foam layer include silicone, low-density polyethylene, or other materials that provide sufficient thickness so as to allow the low-friction dynamic bending laminate stack (328) to match the thickness of the blade (326) while reducing internal stresses and allowing bending.

Beneath the strain tolerant foam layer is another pressure sensitive adhesive layer in one or more embodiments. This pressure sensitive adhesive layer couples a flexible substrate having a strain relief cutout pattern formed therein. The flexible substrate can be manufactured from metal or plastic or other materials. Illustrating by example, in one or more embodiments the flexible substrate comprises a steel layer with a thickness of about thirty microns. While thin, flexible steel works well in practice, it will be obvious to those of ordinary skill in the art having the benefit of this disclosure that other materials can be used for the flexible substrate as well. For instance, in another embodiment the flexible substrate is manufactured from a thin layer of thermoplastic material.

Another layer of pressure sensitive adhesive then couples the flexible substrate to a low-friction layer in one or more embodiments. In one or more embodiments, the low-friction layer comprises a substrate with Teflon.sup.™ attached thereto. In another embodiment, the low-friction layer comprises a layer of polytetrafluoroethylene, which is a synthetic fluoropolymer of tetrafluoroethylene. This material is best known for its non-stick properties and adds a lubricity to the low-friction dynamic bending laminate stack (328) that allows the overall assembly to slide smoothly. Moreover, the low-friction layer prevents the strain relief cutout pattern in the flexible substrate from snagging on surface imperfections and transitions on the device housing to which the assembly is attached. In short, the low-friction layer greatly improves the lubricity of the overall assembly.

FIGS. 17-22 illustrate the electronic device 101 of FIG. 3 as fully assembled in both the extended position 400 and retracted position 500. Embodiments of the disclosure contemplate that in addition to having distinctly unique utilitarian features, electronic devices configured in accordance with embodiments of the disclosure have distinctly unique ornamental features as well. Many of these ornamental features are visible in FIGS. 17-22.

FIG. 17 illustrates a front elevation view of the electronic device 101 in the extended position 400, while FIG. 18 illustrates a side elevation view of the electronic device 101 in the extended position 400. FIG. 19 then provides a rear elevation view of the electronic device 101 in the extended position 400 as well.

FIG. 20 illustrates a front elevation view of the electronic device 101 in the retracted position 500, while FIG. 21 illustrates a side elevation view of the electronic device 101 in the retracted position 500. FIG. 22 then provides a rear elevation view of the electronic device 101 in the retracted position 500.

As can be seen by comparing these figures, the blade assembly 302 is able to slide around the single device housing 301 such that the blade 326 slides away from the single device housing 301 to change the apparent overall length of the flexible display 304 as viewed from the front of the electronic device 101. The blade assembly 302 can also slide in an opposite direction around the single device housing 301 to the retracted position 500, where similar amounts of the flexible display 304 are visible on the front side of the electronic device 101 and the rear side of the electronic device 101. Graphics, images, user actuation targets, and other indicia can be presented anywhere on the flexible display 304, including on the front side of the electronic device 101, the rear side of the electronic device 101, or the lower end of the electronic device 101.

While much attention to this point has been paid to the unique translation of the blade assembly and flexible display between the extended position and the retracted position, one of the other truly unique features offered by embodiments of the disclosure occur when the blade assembly and flexible display transition to the peek position. Turning now to FIGS. 23-24, illustrated therein is the electronic device 101 in this peek position 700.

As shown in FIG. 23, in one or more embodiments when the blade assembly 302 and flexible display 304 transition to the peek position 700, the backpack 1401 moves toward beyond the retracted position (500) toward the rear-facing image capture devices. When this occurs, an upper edge 2301 of the blade assembly 302 moves below an upper edge 2302 of the single device housing 301. In one or more embodiments, this reveals a front-facing image capture device 701 or imager that situates beneath the blade assembly 302 when the blade assembly 302 is in the retracted position (500).

In one or more embodiments, the translation of the blade assembly 302 and flexible display 304 to the peek position 700 occurs automatically. Illustrating by example, in one or more embodiments when the front-facing image capture device 701 is actuated, the one or more processors (314) of the electronic device 101 cause the blade assembly 302 to translate to the peek position 700, thereby revealing this image capture device 701. (In the explanatory embodiment of FIGS. 23-24, a loudspeaker 702 is also revealed.) Once image capture operations utilizing the image capture device 701 are complete, the one or more processors (314) can cause the blade assembly 302 to transition back to the retracted position, which again covers and occludes the image capture device 701.

In other embodiments, the transition to the peek position 700 is manually initiated through actuation of a button or other user interface control. Illustrating by example, a single press of the button 2303 might cause the blade assembly 302 to transition to the extended position (400), while a double press of the button 2303 causes the blade assembly 302 to return to the retracted position (500). A long press of the button 2303 may cause the blade assembly 302 to transition to the peek position 700 of FIG. 7, and so forth. Other button operation schema will be obvious to those of ordinary skill in the art having the benefit of this disclosure. In other embodiments, delivery of user input to the flexible display 304 in the form of a swipe gesture can be used to cause the transition to the peek position 700 as well.

By positioning the front-facing image capture device 701 beneath the blade assembly 302 and its corresponding opaque blade (326) when in normal operation, embodiments of the disclosure provide a privacy guarantee to users of the electronic device 101. Said differently, by positioning the image capture device 701 beneath the blade assembly 302 and the flexible display 304 when these components are in either the retracted position (500) or the extended position (400), a user of the electronic device 101 is mechanically assured of privacy due to the fact that it is physically impossible for the image capture device 701 to perform image capture operations through the blade (326) of the blade assembly 302.

Accordingly, even if the electronic device 101 is accessed by a hacker or other nefarious actor, the user can be assured that the image capture device 701 cannot capture images or videos while the blade assembly 302 and flexible display 304 are in the retracted position (500), the extended position (400), or in positions therebetween. Only when the blade assembly 302 and the flexible display 304 transition to the peek position 700, thereby revealing the image capture device 701, can the image capture device 701 capture front-facing images or front-facing videos.

Now that various hardware components have been described, attention will be turned to methods of using electronic devices in accordance with one or more embodiments of the disclosure, operating steps performed by electronic devices in accordance with one or more embodiments of the disclosure, and advantages, features, and benefits provided by electronic devices configured in accordance with embodiments of the disclosure. Attention will now be turned to methods for using the electronic devices described above, and more particularly, to automatic movement of the flexible display 304 and blade assembly 302 in response a controller user interface that is to be presented on the flexible display 304 when the electronic device 101 is operating in a control mode of operation controlling content being delivered to a content presentation companion device 102 in accordance with one or more embodiments of the disclosure.

To initially understand why such automatic transition is desirable, it is well to understand how different amounts of the front-facing portion of the flexible display 304 are required for different controller user interface presentations. Turning now to FIGS. 25-29, illustrated therein are some explanatory different controller user interfaces being presented on a flexible display 304 of an electronic device 101 configured in accordance with one or more embodiments of the disclosure. While these explanatory controller user interface presentations are some of the many controller user interface presentations that can be presented on the flexible display 304 of the electronic device 101, and are further well suited to show how the blade assembly 302 of the electronic device 101 may need to translate as a function of the controller user interface presentation to reveal, or conceal, front-facing portions of the flexible display 304, other examples of controller user interface presentations will readily be obvious to those of ordinary skill in the art having the benefit of this disclosure.

Figure 25:
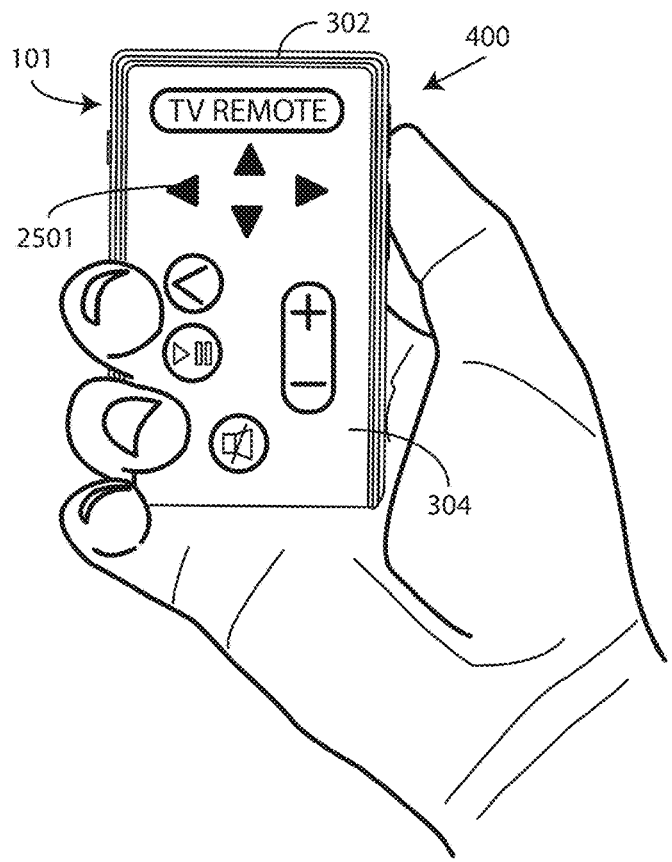
FIG. 25 illustrates the electronic device of FIG. 1 when operating in a remote control mode of operation.

Beginning with FIG. 25, in this illustrative embodiment the controller user interface 2501 presented on the flexible display 304 of the electronic device 101 is a television remote control. The television remote control allows, when the one or more processors (314) of the electronic device 101 are delivering television, movie, video, or other similar content to a content presentation companion device (102), a user to interact with the television remote control to pause, play, advance, or reverse that content. Similarly, the television remote control allows adjustment of the volume of the audio associated with the content, as well as the ability to mute the content presentation companion device (102).

In one or more embodiments, when the controller user interface 2501 being presented on the flexible display 304 of the electronic device 101 is a television remote control, the blade assembly 302 translates to the retracted position 400 so that the front-facing portion of the flexible display 304 is sufficient for presentation of the controller user interface 2501 without unnecessary extra amounts of front-facing portions of the flexible display 304 being present. Advantageously, this maintains the electronic device 101 in the most compact position while still allowing the controller user interface 2501 to be presented in its full form on the front-facing portion of the flexible display 304.

Figure 35:
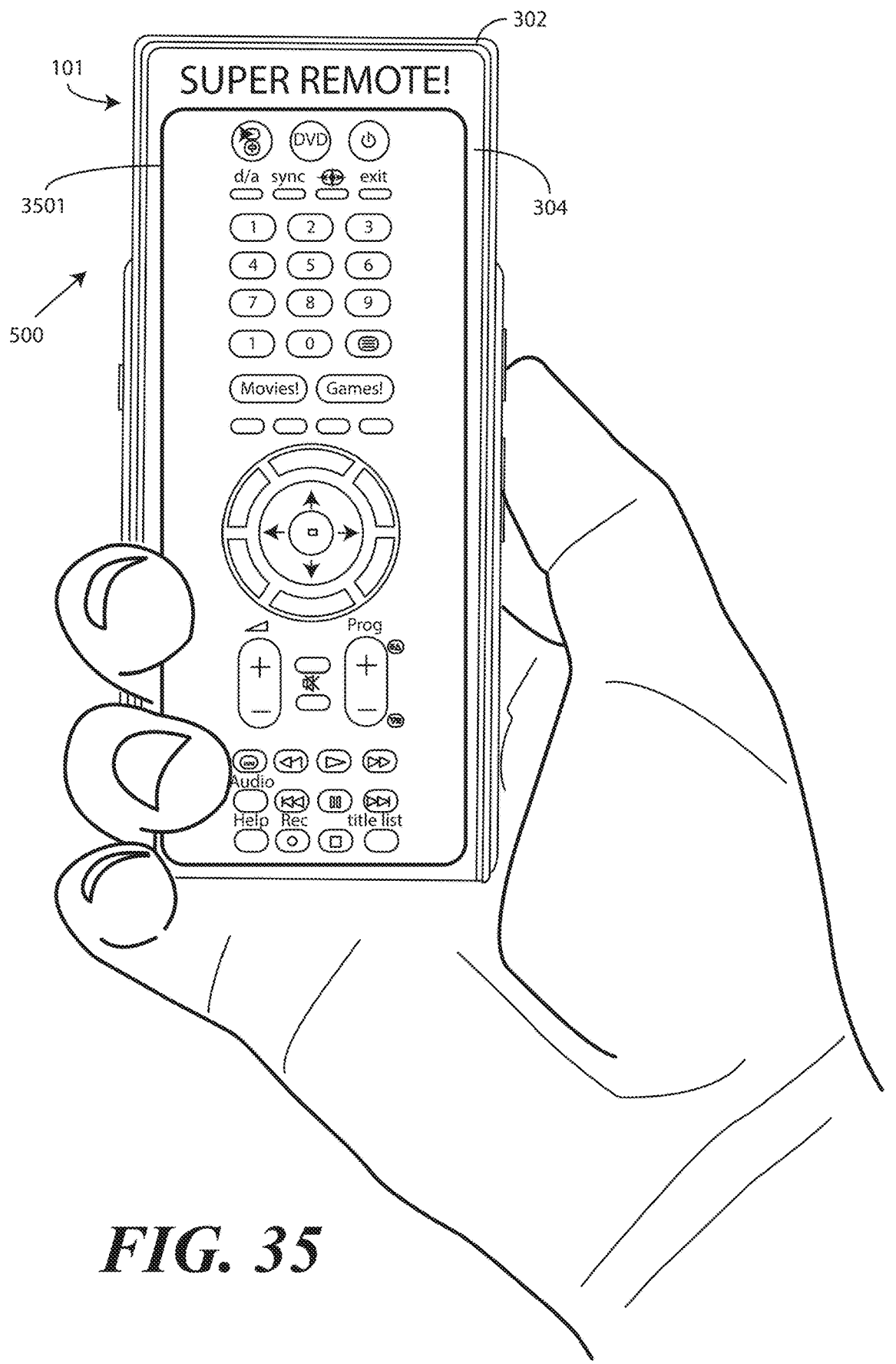
FIG. 35 illustrates the electronic device of FIG. 1 when operating in a super remote control mode of operation.

Embodiments of the disclosure contemplate that remote controls can take different forms. As shown in FIG. 35, the controller user interface 3501 presented on the flexible display 304 of the electronic device 101 can also be a super television remote control. The super television remote control offers more user actuation targets than the more basic remote shown in FIG. 25. In one or more embodiments, when the controller user interface 3501 being presented on the flexible display 304 of the electronic device 101 is a super television remote control, the blade assembly 302 translates to the extended position 500.

Figure 26:
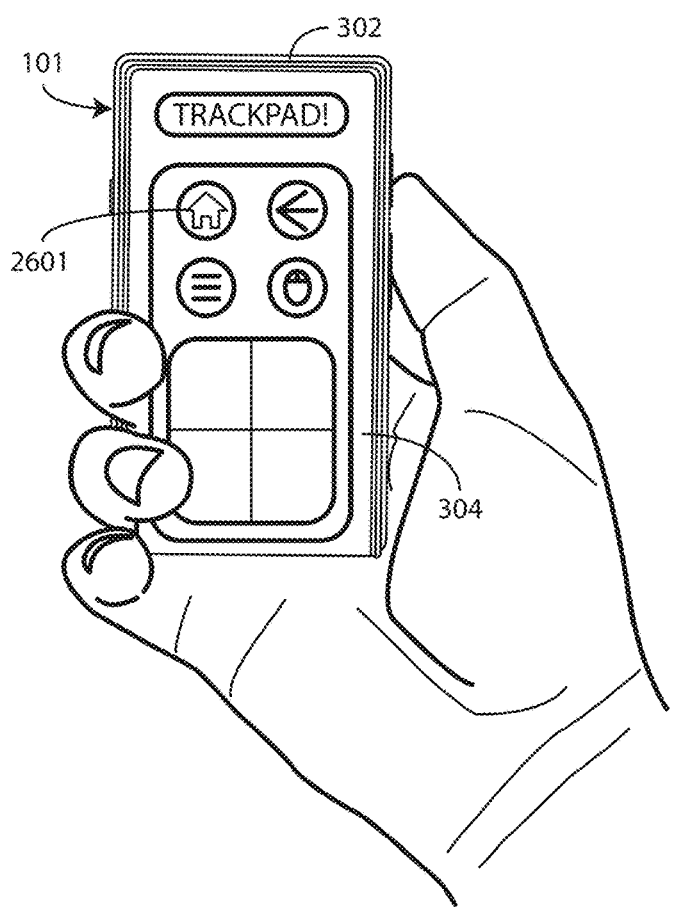
FIG. 26 illustrates the electronic device of FIG. 1 when operating in a trackpad mode of operation.

Turning now to FIG. 26, in this illustrative embodiment the controller user interface 2601 presented on the flexible display 304 of the electronic device 101 is a trackpad. The trackpad allows, when the one or more processors (314) of the electronic device 101 are delivering computer desktop or other similar content to a content presentation companion device (102), a user to interact with the trackpad to move a mouse cursor and perform click operations, double-click operations, and so forth. Similarly, the trackpad allows for a menu to be launched, for an instant return to a home screen to occur, for a back operation to occur, and for another controller user interface to be selected.

In one or more embodiments, when the controller user interface 2601 being presented on the flexible display 304 of the electronic device 101 is a trackpad, the blade assembly 302 translates to a position that is between the retracted position (400) and the extended position (500) so that the front-facing portion of the flexible display 304 is sufficient for presentation of the controller user interface 2601 without unnecessary extra amounts of front-facing portions of the flexible display 304 being present. Thus, the front-facing portion of the flexible display 304 in the embodiment of FIG. 26 has more area than did the front-facing portion of the flexible display (304) in FIG. 25. Advantageously, this maintains the electronic device 101 in the most compact position while still allowing the controller user interface 2601 to be presented in its full form on the front-facing portion of the flexible display 304.

Figure 27:
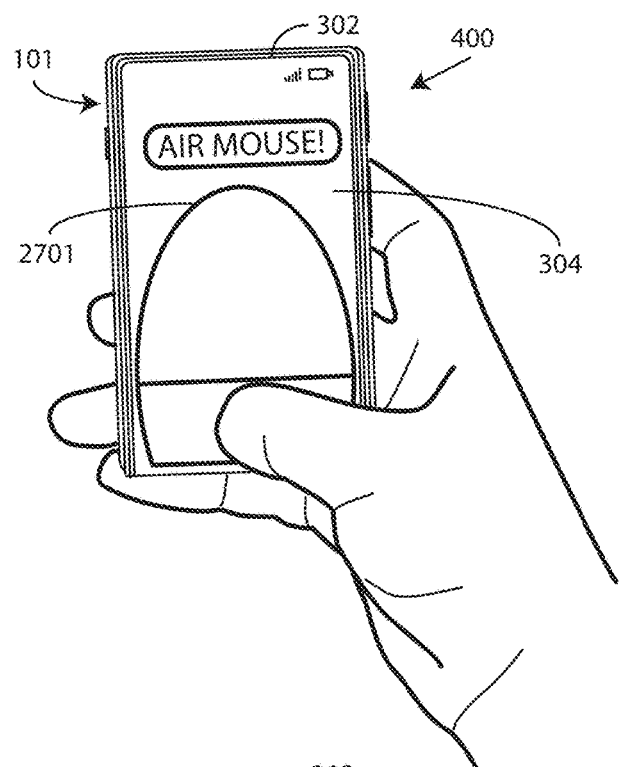
FIG. 27 illustrates the electronic device of FIG. 1 when operating in an air mouse mode of operation.

Turning now to FIG. 27, in this illustrative embodiment the controller user interface 2701 presented on the flexible display 304 of the electronic device 101 is an air mouse. The air mouse allows, when the one or more processors (314) of the electronic device 101 are delivering computer desktop or other similar content to a content presentation companion device (102), mouse controller operations to occur. These mouse controller operations include allowing a user to interact with the controller user interface 2701 to move a mouse cursor and perform click operations, double-click operations, and so forth.

In one or more embodiments, when the controller user interface 2701 being presented on the flexible display 304 of the electronic device 101 is an air mouse, the blade assembly 302 translates to the retracted position 400 so that the front-facing portion of the flexible display 304 is sufficient for presentation of the controller user interface 2701 without unnecessary extra amounts of front-facing portions of the flexible display 304 being present. Thus, the front-facing portion of the flexible display 304 in the embodiment of FIG. 27 has the same area as did the front-facing portion of the flexible display (304) in FIG. 25. Advantageously, this maintains the electronic device 101 in the most compact position while still allowing the controller user interface 2701 to be presented in its full form on the front-facing portion of the flexible display 304.

Figure 28:
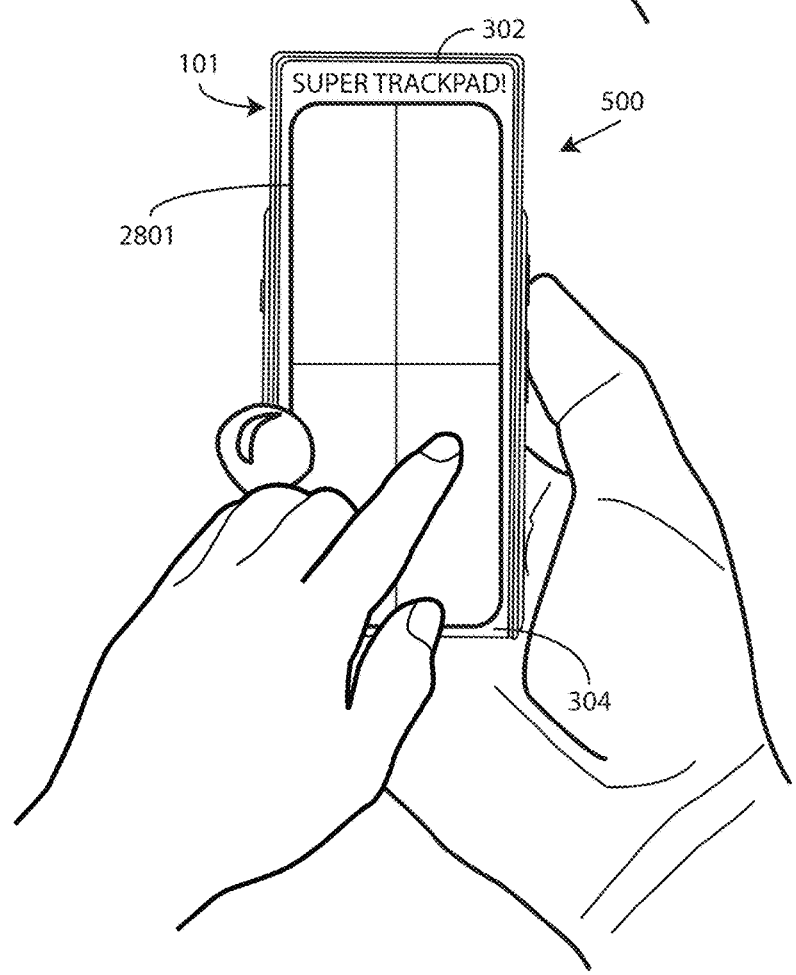
FIG. 28 illustrates the electronic device of FIG. 1 when operating in a super trackpad mode of operation.

Turning now to FIG. 28, in this illustrative embodiment the controller user interface 2801 presented on the flexible display 304 of the electronic device 101 is a super trackpad. As can be seen by comparing FIG. 26 and FIG. 28, the super trackpad offers a vastly larger trackpad region than did the trackpad by both enlarging the trackpad space and removing the control buttons.

The super trackpad allows, when the one or more processors (314) of the electronic device 101 are delivering computer desktop or other similar content to a content presentation companion device (102), conventional trackpad operations to occur. These trackpad operations include allowing a user to interact with the trackpad space to move a mouse cursor and tap the trackpad space to perform click operations, double-click operations, and so forth.

In one or more embodiments, when the controller user interface 2801 being presented on the flexible display 304 of the electronic device 101 is the super trackpad, the blade assembly 302 translates to the extended position 500 so that the front-facing portion of the flexible display 304 is sufficient for presentation of the controller user interface 2901 without having to crop, scale, reduce, or otherwise diminish the controller user interface presentation. Advantageously, this allows the user to enjoy a full-sized super trackpad space without sacrificing the full feature set and usability of the super trackpad.

Figure 29:
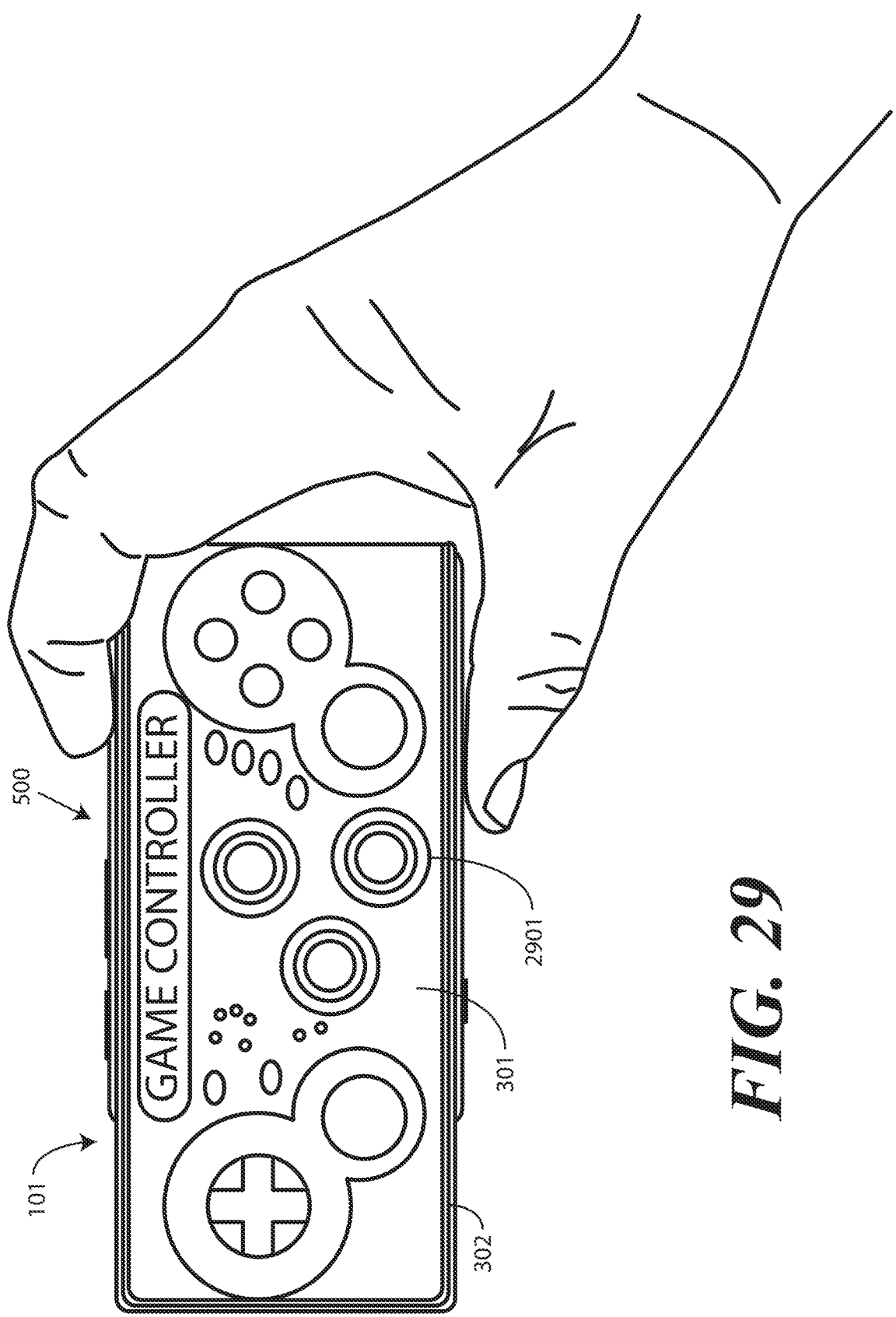
FIG. 29 illustrates the electronic device of FIG. 1 when operating in a game controller mode of operation.

Turning now to FIG. 29, in this illustrative embodiment the controller user interface 2901 presented on the flexible display 304 of the electronic device 101 is a gaming controller. The gaming controller allows, when the one or more processors (314) of the electronic device 101 are delivering gaming content or other similar content to a content presentation companion device (102), a user to play the game. As can be appreciated from the massive number of controls and buttons in this controller user interface 2901, the controller user interface 2901 allows a multitude of gaming operations to occur.

In one or more embodiments, when the controller user interface 2901 being presented on the flexible display 304 of the electronic device 101 is the gaming controller, the blade assembly 302 translates to the extended position 500 so that the front-facing portion of the flexible display 304 is sufficient for presentation of the controller user interface 2901 without having to crop, scale, reduce, or otherwise diminish the controller user interface presentation. Advantageously, this allows the user to enjoy a full-sized gaming controller without sacrificing features or usability.

Figure 30:
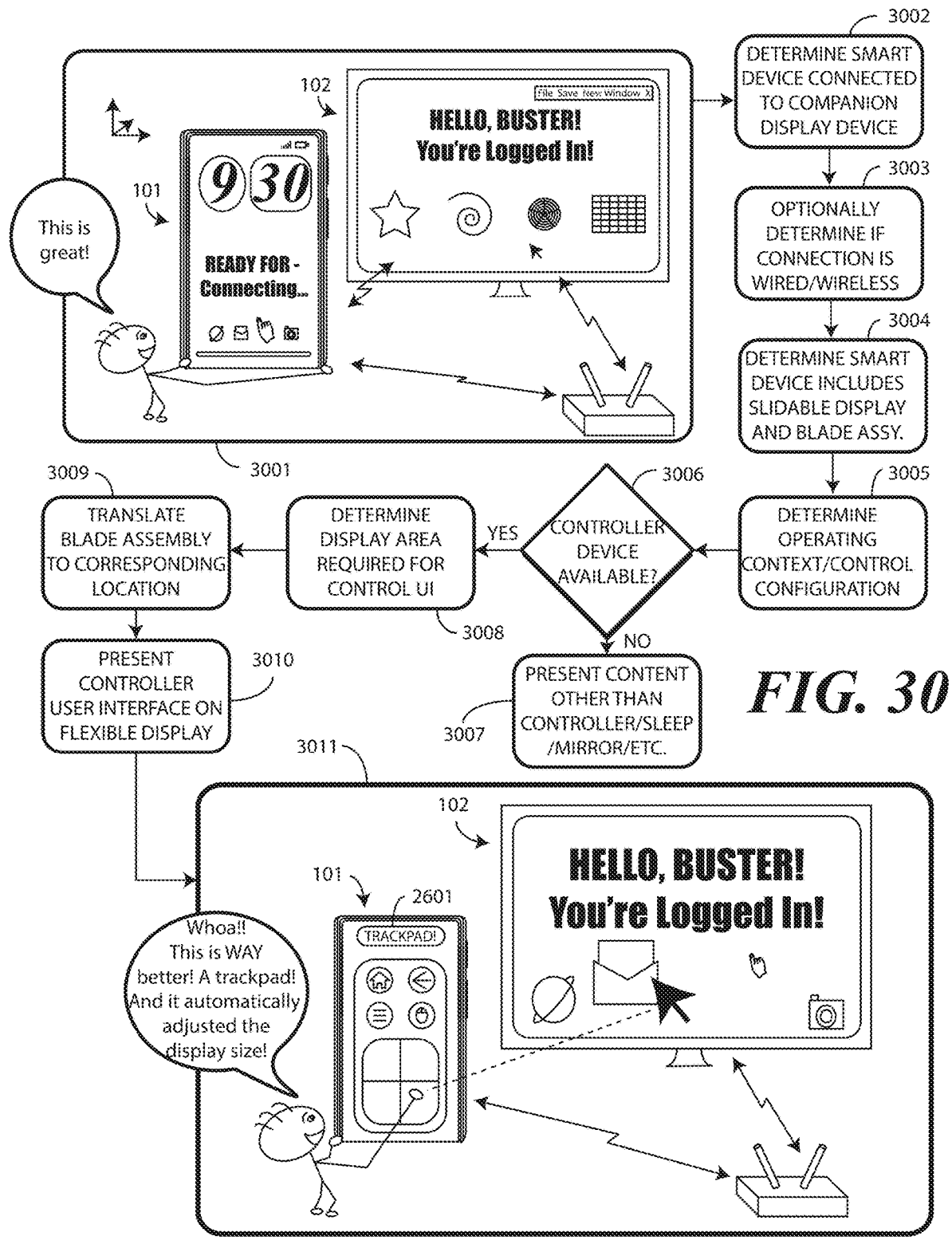
FIG. 30 illustrates one explanatory method in accordance with one or more embodiments of the disclosure.

Turning now to FIG. 30, illustrated therein one or more explanatory method steps illustrating how the electronic device 101 of FIG. 3 and the content presentation companion device 102 can be used as a system. Beginning at step 3001, the electronic device 101 is electronically in communication with the content presentation companion device 102. When the electronic device 101 is electronically in communication with the content presentation companion device 102, this allows the content presentation companion device integration manager (333) of the electronic device 101 to exploit the larger display of the content presentation companion device 102 to present content. Illustrating by example, in one or more embodiments the electronic device 101 can operate in a "desktop" mode by presenting a traditional computer user interface on the display of the content presentation companion device 102. Alternatively, the electronic device 101 may present content such as videos, images, or other multimedia content on the display of the content presentation companion device 102.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 101 and the content presentation companion device 102, the processing power of the electronic device 101 can be leveraged to present content on the display of the content presentation companion device 102. This allows a user to watch television, play video games, work on homework or office work, video call friends and family, or perform other tasks using the one or more processors (314) and the content presentation companion device integration manager (333) of the electronic device 101 combined with the large display of the content presentation companion device 102.

In one or more embodiments, one or more processors (314) of the electronic device 101 first determine that the electronic device 101 is electronically in communication with the content presentation companion device 102 at step 3002. This determination can optionally include determining that the content presentation companion device integration manager (333) is using the display of the content presentation companion device 102 as a primary display for the electronic device 101. In one or more embodiments, the one or more processors (314) of the electronic device 101 use the communication device (316) of the electronic device 101 to detect that the electronic device 101 is electronically in communication with the content presentation companion device 102 at step 3002. At optional step 3003, the one or more processors (314) of the electronic device 101 can determine whether the communication channel with which the electronic device 101 is communicating with the content presentation companion device 102 is wired or wireless.

Step 3004 then comprises determining that the electronic device 101 includes a slidable display. In one or more embodiments, one or more processors (314) of the electronic device 101 determine that the electronic device includes a device housing (301) and a blade assembly (302) supporting a flexible display (304) with that blade assembly (302) being slidable around the device housing (301) between an extended position (500) where the blade assembly (302) extends beyond an edge of the device housing (301), a retracted position (400) where a major surface of the blade assembly (302) abuts a major surface of the device housing (301) without extending beyond the edge of the device housing (301), and optionally a peek position (700) revealing a front-facing imager (701).

At step 3005, the one or more processors (314) of the electronic device 101 determine the operating and control context of the content being delivered to the content presentation companion device 102. Illustrating by example, if the electronic device 101 is streaming a movie to the content presentation companion device 102, the operating context would be a streaming context and the control context would be performing control operations such as pausing the movie, fast forwarding the movie, rewinding the movie, muting the content presentation companion device 102, and so forth. By contrast, when the operating context is that of presenting a desktop computer interface on the display of the content presentation companion device 102, the control context would be performing operations associated with a mouse or trackpad to control a cursor and actuate user actuation targets, and so forth. Decision 3006 determines whether a controller user interface is available for the content. In most all cases, there will be some form of controller user interface available if, at least, to cause whatever content is being presented on the content presentation companion device 102 to stop and change to other content. However, in situations where there is no controller user interface available, step 3007 can comprise presenting other content on the flexible display (304) of the electronic device 101. Step 3007 can also comprise mirroring the content being delivered to the content presentation companion device 102 on the flexible display (304) of the electronic device 101, putting the flexible display (304) of the electronic device 101 in a low-power or sleep mode, and so forth.

Step 3008 determines the amount of area required for the controller user interface to be used with the content being delivered from the electronic device 101 to the content presentation companion device 102. Examples of different sizes were shown and described above with reference to FIGS. 25-29. Techniques for determining the amount of area required to be available on the front-facing portion of the flexible display (304) are shown in FIG. 31.

Figure 31:
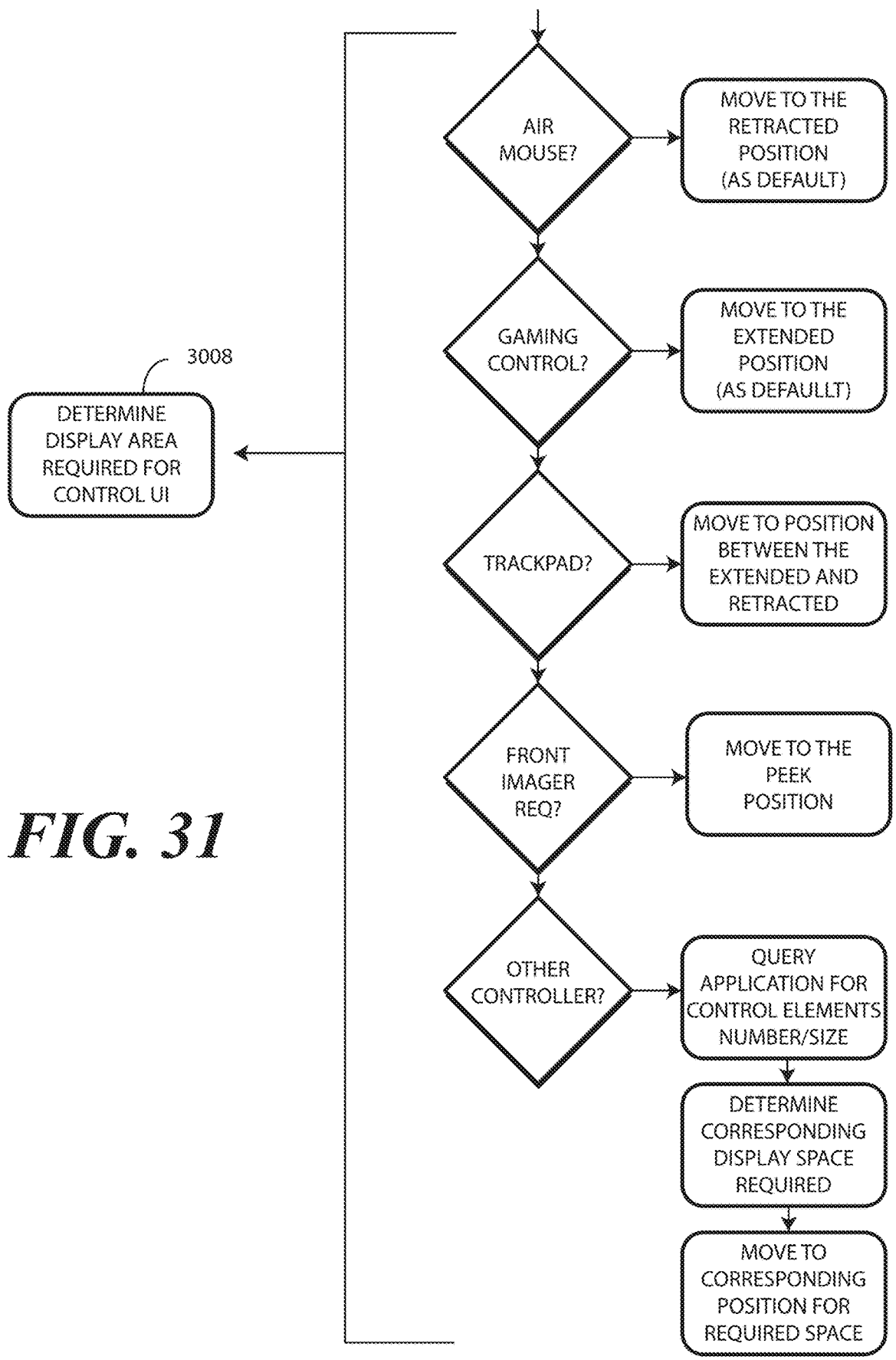
FIG. 31 illustrates one or more method steps in accordance with one or more embodiments of the disclosure.

Turning briefly to FIG. 31, step 3008 can be determined in a variety of ways. Illustrating by example, if the controller user interface is an air mouse, in one or more embodiments this can be presented when the blade assembly (302) is in the retracted position (400). In one or more embodiments, the retracted position (400) comprises the default position for the air mouse, as embodiments of the disclosure contemplate that the user may be able to use menus or control settings to magnify or reduce the size of the air mouse being presented on the front-facing portion of the flexible display (304). The same default position may apply to a television remote control.

If the controller user interface is a gaming controller, in one or more embodiments this can be presented when the blade assembly (302) is in the extended position (500). The same default position may apply to a super trackpad. A trackpad or other intermediately sized controller user interface may require the blade assembly (302) to be between the retracted position (400) and the extended position (500), and so forth.

In one or more embodiments, an application operating on the one or more processors (314) is responsible for transmitting the content to the content presentation companion device (102). Illustrating by example, if the content being presented on the display of the content presentation companion device (102) is a videoconference, a videoconferencing application operating on the one or more processors (314) would be responsible for receiving the videoconference, sending it to the communication device (316) of the electronic device (101), and then sending it to the content presentation companion device (102) for presentation on the display of the content presentation companion device (102). Accordingly, in one or more embodiments step 3008 comprises the one or more processors (314) of the electronic device (101) querying the application to determine the front-facing area required for the controller user interface.

If the controller user interface comprises a videoconferencing user interface, this means that a front-facing imager (701) is likely required. Thus, the position of the blade assembly (302) would need to be the peek position (700). If the application operating on the one or more processors (314) of the electronic device (101) were a video streaming application suitable for streaming movies or television to the content presentation companion device (102), the controller user interface would likely be a television remote control, which means the position of the blade assembly (302) would be the retracted position (400), and so forth. These are examples only, as other positions for other controller user interface will be obvious to those of ordinary skill in the art having the benefit of this disclosure.

Turning now back to FIG. 30, step 3009 then comprises translating the blade assembly (302) of the electronic device 101 to the required position for the controller user interface to be presented. Thus if the controller user interface comprises an air mouse, the position of the blade assembly (302) would be the retracted position (400). If the controller user interface comprises a gaming controller, the position of the blade assembly (302) would be the extended position (500). If the controller user interface was a trackpad, the position of the blade assembly (302) would be between the extended position (500) and the retracted position (400), and so forth.

In one or more embodiments, when the communication device (316) of the electronic device 101 is electronically communicating with the content presentation companion device 102, step 3008 comprises the one or more processors (314) determine a front-facing area of the flexible display (304) required for a controller user interface used to control content being presented on the content presentation companion device while step 3009 comprises the one or more processors (314) causing the blade assembly (302) to transition to a position where a front-facing portion of the flexible display (304) spans the front-facing area. The controller user interface is then presented on the front-facing portion of the flexible display (304) of the electronic device 101 at step 3010. In one or more embodiments, step 3009 occurs only when the communication device (316) of the electronic device 101 is communicating wirelessly with the content presentation companion device 102, as determined at step 3003.

In the illustrative embodiment of FIG. 30, the electronic device 101 is operating in a "desktop" mode by presenting a traditional computer user interface on the display of the content presentation companion device 102. This traditional computer user interface being presented on the display of the content presentation companion device 102 comprises a plurality of user actuation targets. In one or more embodiments, since the flexible display (304) of the electronic device 101 is touch sensitive, the controller user interface presented on the flexible display (304) could be a mirror of what is being presented on the content presentation companion device 102. Where this was the case, the quantity of user actuation targets in the plurality of user actuation targets would determine the front-facing area required for the controller user interface.

However, in this illustrative embodiment, as shown at step 3011, the user has elected, using one or more menus or control settings in the electronic device 101, for the default controller user interface 2601 to be used in the desktop mode to be the trackpad. Accordingly, the blade assembly (302) has been moved to a position between the extended position (500) and the retracted position (400) so that the controller user interface 2601 can be presented.

Figure 32:
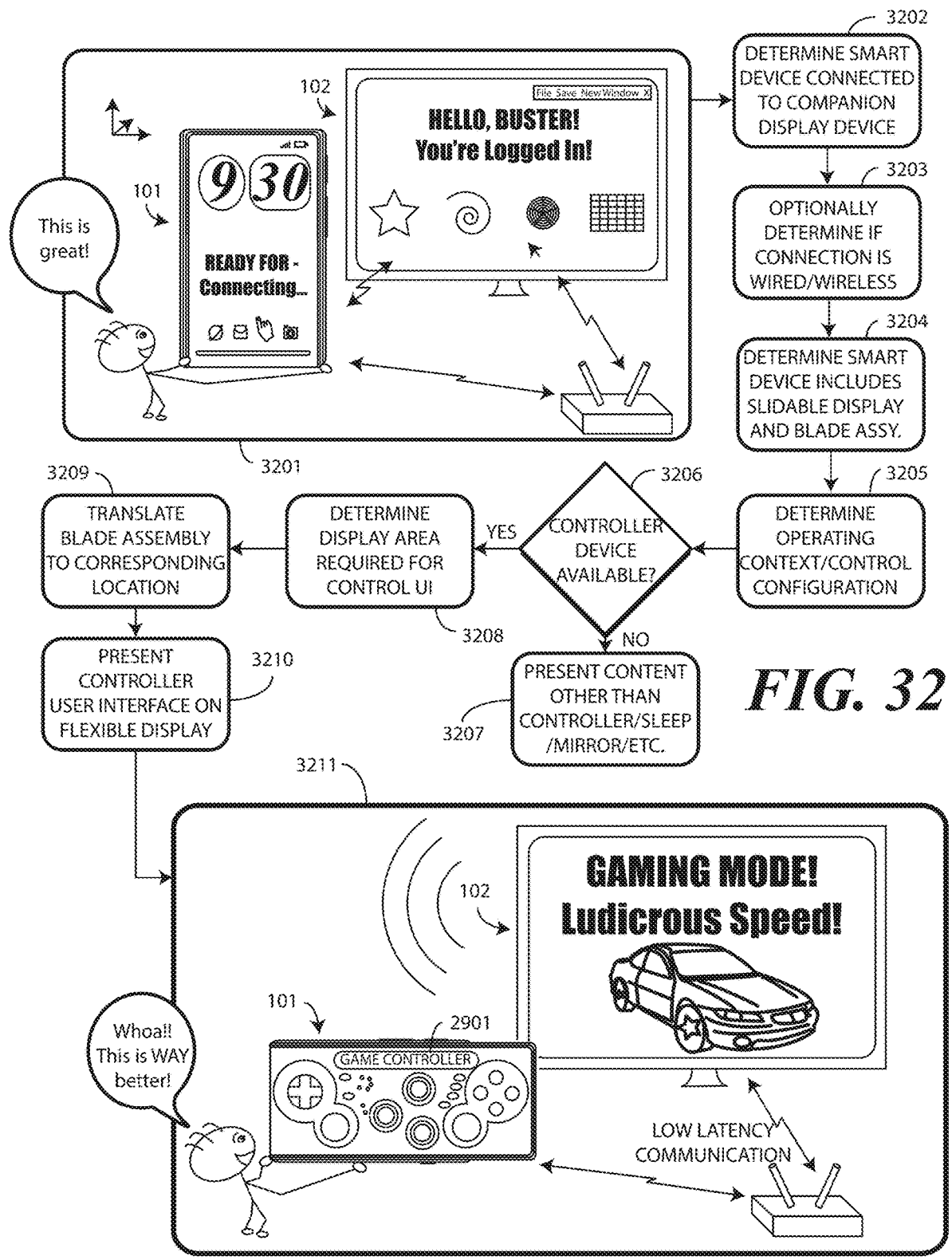
FIG. 32 illustrates another explanatory method in accordance with one or more embodiments of the disclosure.

Turning now to FIG. 32, illustrated therein are alternate method steps showing how an electronic device 101 and content presentation companion device 102 can operate in tandem as a system. Beginning at step 3201, the electronic device 101 is again electronically in communication with the content presentation companion device 102. The content presentation companion device integration manager (333) of the electronic device 101 leverages the larger display of the content presentation companion device 102 to present content.

In contrast to FIG. 30, in this illustrative embodiment a gaming application is operating on the one or more processors (314) of the electronic device 101. The communication device (316) of the electronic device 101 then delivers gaming content to the content presentation companion device 102 for presentation on the larger display of the content presentation companion device 102.

The one or more processors (314) of the electronic device 101 determine that the electronic device 101 is electronically in communication with the content presentation companion device 102 at step 3202. At optional step 3203, the one or more processors (314) of the electronic device 101 can determine whether the communication channel with which the electronic device 101 is communicating with the content presentation companion device 102 is wired or wireless. Step 3204 then comprises determining that the electronic device 101 includes a device housing (301) and a blade assembly (302) supporting a flexible display (304) with that blade assembly (302) being slidable around the device housing (301) between an extended position (500) where the blade assembly (302) extends beyond an edge of the device housing (301), a retracted position (400) where a major surface of the blade assembly (302) abuts a major surface of the device housing (301) without extending beyond the edge of the device housing (301). Step 3204 can optionally determine that the blade assembly (302) is additionally slidable to a peek position (700) revealing a front-facing imager (701).

At step 3205, the one or more processors (314) of the electronic device 101 determine the operating and control context of the content being delivered to the content presentation companion device 102. Additionally, in one or more embodiments step 3205 comprises the one or more processors (314) of the electronic device 101 causing a communication device (316) of the electronic device 101 to present content on the content presentation companion device 102 in electronic communication with the content presentation companion device 102.

In this example, the operating context is that of a gaming mode of operation. So, of course, decision 3206 determines that the gaming controller user interface is available to control the gaming content presented on the display of the content presentation companion device 102. Had it not, step 3207 can comprise presenting content other than a controller user interface on the flexible display (304) of the electronic device 101. Step 3207 can also comprise mirroring the content being delivered to the content presentation companion device 102 on the flexible display (304) of the electronic device 101, putting the flexible display (304) of the electronic device 101 in a low-power or sleep mode, and so forth as previously described.

However, since the operating context is a gaming context, step 3208 comprises the one or more processors (314) of the electronic device determining a front-facing area amount of the flexible display (304) required for presentation of a controller user interface operable to control the content being presented on the content presentation companion device 102. Any of the techniques described above with reference to FIG. 31 could be used, although other techniques will be obvious to those of ordinary skill in the art having the benefit of this disclosure. In this example, since the gaming controller user interface is required to control the gaming content being delivered from the electronic device 101 to the content presentation companion device 102, a maximum amount of front-facing area is required for presentation of the game controller user interface without cropping, scaling, or other reductions.

As such, step 3209 comprises the one or more processors (314) causing a translation mechanism such as display roller mechanism (305) to translate the blade assembly (302) carrying the flexible display (34) to slide around the device housing (301) to sufficiently reveal the front-facing area amount of the flexible display (304) required for presentation of the gaming controller. Said differently, step 3209 comprises causing a translation mechanism such as display roller mechanism (305) to translate the blade assembly (302) carrying the flexible display (34) to slide around the device housing (301) to a position of the blade assembly (302) sufficient to reveal the front-facing area amount determined at step 3208. While this position can be the retracted position (400), the peek position (700), or positions between the retracted position (400) and extended position (500) in various embodiments, in the illustrative embodiment of FIG. 32 the position is the extended position (500). In one or more embodiments, step 3209 occurs only when the communication device (316) of the electronic device 101 is communicating wirelessly with the content presentation companion device 102, as determined at step 3203.

Step 3210 then comprises the one or more processors (314) of the electronic device 101 presenting the controller user interface on the front-facing portion of the flexible display (304) after the flexible display (304) has reached the position. As shown at step 3211, the controller user interface 2901 defining a game controller is being presented on the flexible display (304) of the electronic device 101. Accordingly, the blade assembly (302) has been moved to the extended position (500) so that the controller user interface 2901 can be presented in its full and most glorious form, and without reduction. This full-sized gaming controller, combined with a super-fast network, allows the user to play the game at ludicrous speed to his sheer joy and delight. Moreover, no user interaction was required to cause the blade assembly (302) to move to the extended position (500). Instead, it just happened automatically as if by magic.

Figure 33:
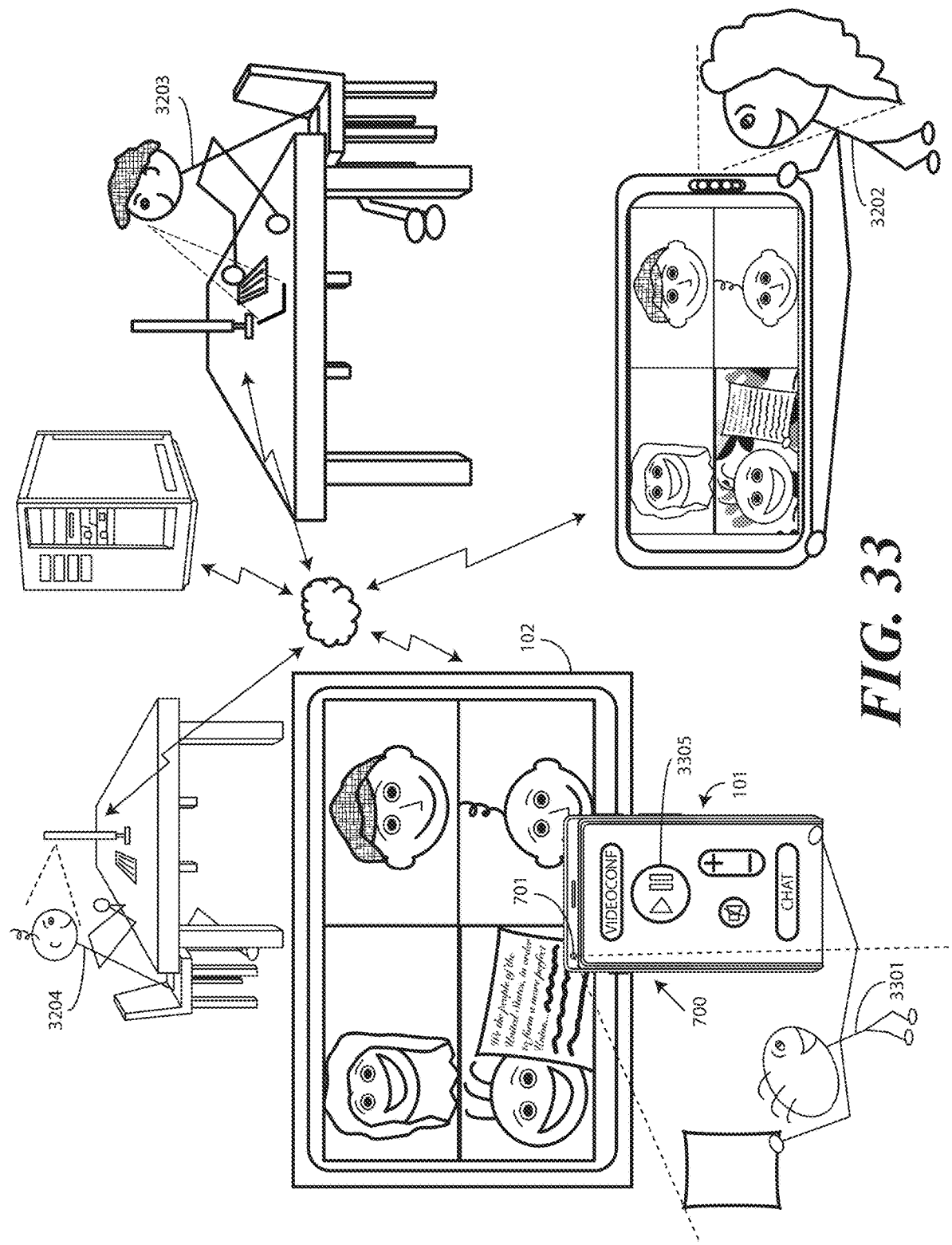
FIG. 33 illustrates another explanatory system in accordance with one or more embodiments of the disclosure.

Turning now to FIG. 33, illustrated therein is still another system in accordance with one or more embodiments of the disclosure. The system of FIG. 33 is actually a videoconference system. As shown, multiple participants each employ their own respective electronic device to engage with the other participants via the videoconference. Participant 3303 and participant 3304 are each using computers to engage in the videoconference. Participant 3302 is using a conventional smartphone. However, participant 3301 is the luckiest of all in that he is using an electronic device 101 configured in accordance with one or more embodiments of the disclosure.

Specifically, the electronic device 101 includes a device housing (301) and a blade assembly (302) carrying a flexible display (304) and configured to translate around the device housing (301) between an extended position (500), a retracted position (400), and a peek position (700). The electronic device 101 includes a communication device (316) in communication with a content presentation companion device 102 operating as a primary display for the electronic device 101.

As shown in FIG. 33 each electronic device is engaged in wired or wireless communication with each other across a network, one example of which is the Internet via the World Wide Web. It should be noted that the network could be a public, private, local area, wide area, or other type of network across which wired or wireless electronic communications can be exchanged.

In this illustrative embodiment, each electronic device is also in communication with a video conferencing system server complex across the network. In one or more embodiments video conferencing system server complex includes components such as a web server, a database server, an audio server, and optionally a video server (the video server may be omitted for audio only conferencing systems) that are operable to facilitate videoconferences between the various electronic devices of the videoconference system.

These components of the video conferencing system server complex can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex performs functions such as maintaining a schedule of videoconferences, maintaining lists of participants, as well as allowing each participant's conferencing system terminal device to engage with the videoconference, and so forth. In one or more embodiments, the video conferencing system server complex also facilitates the transmission of audio and video content during the occurrence of the videoconference.

In one or more embodiments, the video conferencing system server complex functions as an intermediary device to facilitate sharing of audio and/or video content and/or data between the various electronic devices. For example, as can be seen on the display of the conventional smartphone being used by participant 3302, in this example each can see each other participant engaged in the videoconference.

In the illustrative example of FIG. 33, participant 3301 has paired the electronic device 101 with the content presentation companion device 102, which serves as a primary display for the electronic device 101. In FIG. 33, electronic device 101 and the content presentation companion device 102 operate in tandem as a system, with the electronic device 101 providing the processing power while the content presentation companion device 102 serves as an auxiliary display device for the electronic device 101.

As shown in FIG. 33, electronic device 101 is electronically in communication with the content presentation companion device 102. When the electronic device 101 is electronically in communication with the content presentation companion device 102, this allows the electronic device 101 to use the larger display of the content presentation companion device 102 to present content. Illustrating by example, in one or more embodiments the electronic device 101 can operate in a "content redirection" mode by presenting content such as movies, videos, videoconferences, images, and even a traditional computer user interface, on the display of the content presentation companion device 102. The hybrid system being used by participant 3301 functions in a similar manner. This allows participant 3301 to use the display of the content presentation companion device 102 to engage in the videoconference of FIG. 33.

Since the participants are all engaged in a videoconference, each can see conference content in the form of a combined video feed from each other participant presented on the display of each content presentation device, as well as a video feed of themselves. Under ordinary conditions, each participant can hear an audio feed from each other participant as well.

As shown in FIG. 33, the one or more processors (314) of the electronic device 101 have determined a front-facing area amount required to present a controller user interface 3305 on the front-facing portion of the flexible display (304). In this example, the blade assembly (302) is slidable around the device housing (301) to a peek position 700 revealing a front-facing imager 701 that is concealed when the flexible display (304) is between the retracted position (400) and the extended position (500), respectively, inclusive. However, since participant 3301 is engaged in a videoconference, use of the front-facing imager 701 is required to capture images of participant 3301. Accordingly, two things occur: first, the position of the blade assembly (302) sufficient to reveal the front-facing area amount of the flexible display (304) consists of the peek position 700. Second, the controller user interface 3305 presented on the front-facing portion of the flexible display (304) comprises a videoconferencing user interface.

Hearing that he has been assigned with a new task that he does not care for, participant 3301 decides to object in a comical way. Specifically, he plans to declare the task newly assigned to him to be a violation of his rights under the United States Constitution. To make the objection even more demonstrative, participant 3301 decides to perform a demonstration operation by causing the front-facing imager 701 to capture images of himself waving a demonstration object in the form of a copy of the Constitution while the blade assembly (302) is in the peek position 700.

Understanding that Article I, Section 9, precludes passage of Bills of Attainder or ex post facto Laws, participant 3301 then declares the assignment of his new task to be nothing more than a thinly veiled Bill of Attainder and declares the entire proceeding to be both unconstitutional and a violation of his individual rights. Everyone has a good laugh in response.

Figure 34:
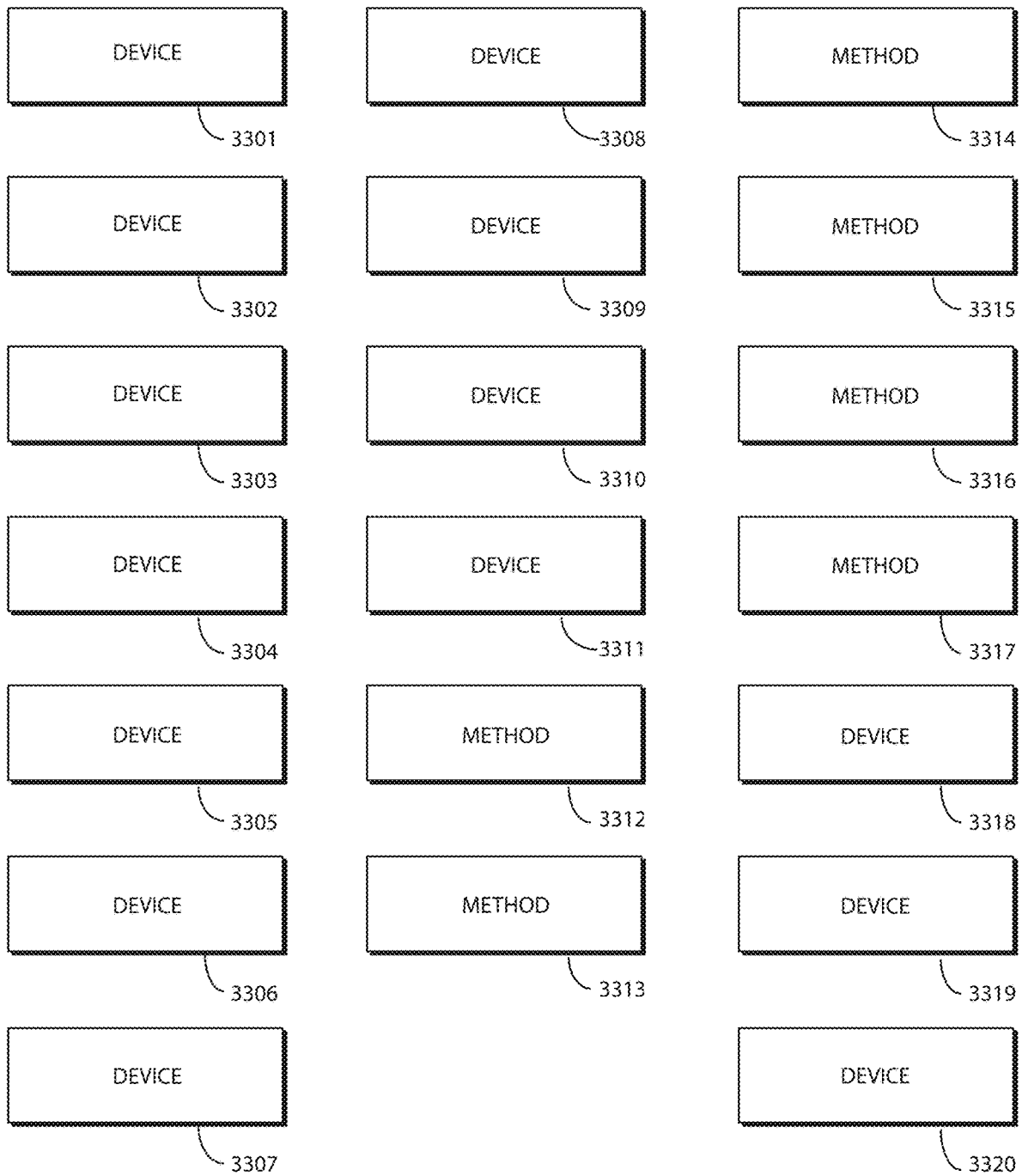
FIG. 34 illustrates various embodiments of the disclosure.

Unfortunately, this does not prevent participant 3301 from having to do the newly assigned task. Participant 3301 therefore begins to contemplate life as a standup comic. Shortly thereafter, participant 3301 quits his job and takes his legal comedy shenanigans on the road. Turning now to FIG. 34, illustrated therein are various embodiments of the disclosure. The embodiments of FIG. 34 are shown as labeled boxes in FIG. 34 due to the fact that the individual components of these embodiments have been illustrated in detail in FIGS. 1-33, which precede FIG. 34. Accordingly, since these items have previously been illustrated and described, their repeated illustration is no longer essential for a proper understanding of these embodiments. Thus, the embodiments are shown as labeled boxes.

At 3401, an electronic device comprises a device housing and a blade assembly supporting a flexible display, the blade assembly slidable around the device housing between an extended position where the blade assembly extends beyond an edge of the device housing and a retracted position where a major surface of the blade assembly abuts a major surface of the device housing without extending beyond the edge of the device housing. At 3401, the electronic device comprises one or more processors and a communication device operable with the one or more processors.

At 3401, the one or more processors, when the communication device is electronically communicating with a content presentation companion device, determine a front-facing area of the flexible display required for a controller user interface used to control content being presented on the content presentation companion device. At 3401, the one or more processors cause the blade assembly to transition to a position where a front-facing portion of the flexible display spans the front-facing area.

At 3402, the controller user interface of 3401 comprises an air mouse. At 3402, the position is the retracted position.

At 3403, the controller user interface of 3401 comprises a gaming controller. At 3401, the position is the extended position.

At 3404, the controller user interface of 3401 comprises a trackpad. At 3404, the position is between the retracted position and the extended position.

At 3405, the blade assembly of 3401 is further slidable around the device housing to a peek position revealing a front-facing imager that is concealed when the blade assembly is in the retracted position, the extended position, or positions between the retracted position and the extended position. At 3406, the controller user interface of 3405 comprises a videoconferencing user interface and the position comprises the peek position.

At 3407, an application operating on the one or more processors of 3401 causes the content to be presented on the content presentation companion device. At 3407, the one or more processors query the application to determine the front-facing area required for the controller user interface.

At 3408, the application of 3407 comprises a video streaming application. At 3408, the position comprises the retracted position.

At 3409, the controller user interface of 3407 comprises a plurality of user actuation targets. At 3409, a quantity of user actuation targets in the plurality of user actuation targets determines the front-facing area required for the controller user interface.

At 3410, the content presentation companion device of 3401 operates as a primary display for the electronic device. At 3411, the one or more processors of 3401 cause the blade assembly to transition to the position where the front-facing portion of the flexible display spans the front-facing area only when the communication device is communicating wirelessly with the content presentation companion device.

At 3412, a method in an electronic device comprises causing, by one or more processors, a communication device to present content on a content presentation companion device in electronic communication with the communication device. At 3412, the method comprises determining, by the one or more processors, a front-facing area amount of a flexible display required for presentation of a controller user interface operable to control the content being presented on the content presentation companion device. At 3412, the method comprises causing, by a translation mechanism, a blade assembly carrying the flexible display to slide around a device housing sufficiently to reveal the front-facing area amount of the flexible display.

At 3413, the blade assembly of 3412 is slidable around the device housing between an extended position where the blade assembly extends beyond an edge of the device housing and a retracted position where a major surface of the blade assembly abuts a major surface of the device housing without extending beyond the edge of the device housing. At 3413, a position of the blade assembly sufficient to reveal the front-facing area amount of the flexible display is between the retracted position and the extended position, inclusive.

At 3414, the blade assembly of 3413 is slidable around the device housing to a peek position revealing a front-facing imager that is concealed when the flexible display is between the retracted position and the extended position, inclusive. At 3414, a position of the blade assembly sufficient to reveal the front-facing area amount of the flexible display consists of the peek position.

At 3415, the controller user interface of 3413 comprises a gaming controller. At 3415, a position of the blade assembly sufficient to reveal the front-facing area amount of the flexible display consists of the extended position.

At 3416, the controller user interface of 3413 comprises an air mouse. At 3416, a position of the blade assembly sufficient to reveal the front-facing area amount of the flexible display consists of the retracted position.

At 3417, the controller user interface of 3413 comprises a trackpad. At 3417, a position of the blade assembly sufficient to reveal the front-facing area amount of the flexible display is between the retracted position and the extended position.

At 3418, an electronic device comprises a device housing and a blade assembly carrying a flexible display and configured to translate around the device housing between an extended position, a retracted position, and a peek position. At 3418, the electronic device comprises one or more processors and a communication device in communication with a content presentation companion device operating as a primary display for the electronic device. At 3418, the one or more processors determine a front-facing area amount required to present a controller user interface on a front-facing portion of the flexible display and cause the blade assembly to transition to a position defined by the front-facing area amount.

At 3419, the one or more processors of 3418 further present the controller user interface on the front-facing portion of the flexible display after the flexible display has reached the position. At 3420, the controller user interface of 3419 comprises one of an air mouse, a trackpad, or a gaming controller.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a device housing;
a blade assembly wrapping around at least two surfaces of the device housing and supporting a flexible display, the blade assembly slidable around the device housing between:
an extended position where the blade assembly extends beyond an edge of the device housing; and
a retracted position where a major surface of the blade assembly abuts a major surface of the device housing without extending beyond the edge of the device housing;
one or more processors; and
a communication device operable with the one or more processors;
wherein the one or more processors, when the communication device is electronically communicating with a content presentation companion device, determine a front-facing area of the flexible display required for a controller user interface used to control content being presented on the content presentation companion device and cause the blade assembly to transition to a position where a front-facing portion of the flexible display spans the front-facing area.

2. The electronic device of claim 1, wherein:
the controller user interface comprises an air mouse; and
the position is the retracted position.

3. The electronic device of claim 1, wherein:
the controller user interface comprises a gaming controller; and
the position is the extended position.

4. The electronic device of claim 1, wherein:
the controller user interface comprises a trackpad; and
the position is between the retracted position and the extended position.

5. The electronic device of claim 1, wherein the blade assembly is further slidable around the device housing to a peek position revealing a front-facing imager that is concealed when the blade assembly is in the retracted position, the extended position, or positions between the retracted position and the extended position.

6. The electronic device of claim 5, wherein:
the controller user interface comprises a videoconferencing user interface; and
the position comprises the peek position.

7. The electronic device of claim 1, wherein:
an application operating on the one or more processors causes the content to be presented on the content presentation companion device; and
the one or more processors query the application to determine the front-facing area required for the controller user interface.

8. The electronic device of claim 7, wherein:
the application comprises a video streaming application; and
the position comprises the retracted position.

9. The electronic device of claim 7, wherein:
the controller user interface comprises a plurality of user actuation targets; and
a quantity of user actuation targets in the plurality of user actuation targets determines the front-facing area required for the controller user interface.

10. The electronic device of claim 1, wherein the content presentation companion device operates as a primary display for the electronic device.

11. The electronic device of claim 1, wherein the one or more processors cause the blade assembly to transition to the position where the front-facing portion of the flexible display spans the front-facing area only when the communication device is communicating wirelessly with the content presentation companion device.

12. A method in an electronic device, the method comprising:
causing, by one or more processors, a communication device to present content on a content presentation companion device in electronic communication with the communication device;
determining, by the one or more processors, a front-facing area amount of a flexible display required for presentation of a controller user interface operable to control the content being presented on the content presentation companion device; and
causing, by a translation mechanism, a blade assembly coupled to two major surfaces of a device housing and wrapping around at least one minor surface of the device housing and carrying the flexible display to slide around the device housing sufficiently to reveal the front-facing area amount of the flexible display.

13. The method of claim 12, wherein:
the blade assembly is slidable around the device housing between an extended position where the blade assembly extends beyond an edge of the device housing and a retracted position where a major surface of the blade assembly abuts a major surface of the device housing without extending beyond the edge of the device housing; and
a position of the blade assembly sufficient to reveal the front-facing area amount of the flexible display is between the retracted position and the extended position, inclusive.

14. The method of claim 13, wherein:
the blade assembly is slidable around the device housing to a peek position revealing a front-facing imager that is concealed when the flexible display is between the retracted position and the extended position, inclusive; and
a position of the blade assembly sufficient to reveal the front-facing area amount of the flexible display consists of the peek position.

15. The method of claim 13, wherein:
the controller user interface comprises a gaming controller; and
a position of the blade assembly sufficient to reveal the front-facing area amount of the flexible display consists of the extended position.

16. The method of claim 13, wherein:
the controller user interface comprises an air mouse; and
a position of the blade assembly sufficient to reveal the front-facing area amount of the flexible display consists of the retracted position.

17. The method of claim 13, wherein:
the controller user interface comprises a trackpad; and
a position of the blade assembly sufficient to reveal the front-facing area amount of the flexible display is between the retracted position and the extended position.

18. An electronic device, comprising:
a single device housing;
a blade assembly carrying a flexible display and configured to translate around the single device housing between an extended position, a retracted position, and a peek position;
one or more processors; and
a communication device in communication with a content presentation companion device operating as a primary display for the electronic device;
the one or more processors determining a front-facing area amount required to present a controller user interface on a front-facing portion of the flexible display and causing the blade assembly to transition to a position defined by the front-facing area amount.

19. The electronic device of claim 18, the one or more processors further presenting the controller user interface on the front-facing portion of the flexible display after the flexible display has reached the position.

20. The electronic device of claim 19, the controller user interface comprising one of an air mouse, a trackpad, or a gaming controller.

* * * * *